(12) United States Patent  
Ando et al.

(10) Patent No.: US 7,224,645 B2
(45) Date of Patent: May 29, 2007

(54) OPTICAL INFORMATION PROCESSING SYSTEM USING OPTICAL ABERRATIONS AND INFORMATION MEDIUM HAVING RECORDING LAYER PROTECTED BY TRANSPARENT LAYER HAVING THICKNESS IRREGULARITY

(75) Inventors: Hideo Ando, Hino (JP); Satoru Kishita, Yokohama (JP); Sumitaka Maruyama, Yokohama (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 0 days.

(21) Appl. No.: 10/847,394

(22) Filed: May 18, 2004

(65) Prior Publication Data

US 2005/0002285 A1   Jan. 6, 2005

Related U.S. Application Data

(62) Division of application No. 09/805,538, filed on Mar. 14, 2001, now Pat. No. 7,142,484.

(51) Int. Cl.
G11B 7/095 (2006.01)

(52) U.S. Cl. .............................. 369/44.23; 369/44.32; 369/53.19

(58) Field of Classification Search ............ 369/44.23, 369/44.32, 53.19
See application file for complete search history.

(56) References Cited

U.S. PATENT DOCUMENTS

| 5,065,253 | A | * | 11/1991 | Ishii ........................... 386/115 |
| 5,243,583 | A | * | 9/1993 | Ohuchida et al. ........ 369/44.12 |
| 5,700,539 | A | | 12/1997 | Hong |
| 5,708,638 | A | | 1/1998 | Braat et al. |
| 5,748,603 | A | * | 5/1998 | Kim et al. .............. 369/112.02 |
| 5,838,502 | A | * | 11/1998 | Park et al. .................. 359/738 |
| 5,920,532 | A | * | 7/1999 | Yagi et al. ............... 369/53.22 |
| 5,959,280 | A | | 9/1999 | Kamatani |
| 6,005,834 | A | | 12/1999 | Maeda et al. |
| 6,108,139 | A | | 8/2000 | Takahashi |
| 6,134,195 | A | | 10/2000 | Kawamura |
| 6,141,304 | A | | 10/2000 | Ogasawara |
| 6,185,167 | B1 | * | 2/2001 | Arai et al. ............... 369/44.23 |
| 6,192,022 | B1 | | 2/2001 | Hendriks et al. |
| 6,221,455 | B1 | | 4/2001 | Yasuda et al. |
| 6,229,600 | B1 | | 5/2001 | Martynov |
| 6,246,648 | B1 | * | 6/2001 | Kuribayashi ............. 369/44.32 |
| 6,246,656 | B1 | * | 6/2001 | Kawakubo et al. .... 369/112.23 |
| 6,249,494 | B1 | | 6/2001 | Ueki |

(Continued)

FOREIGN PATENT DOCUMENTS

EP   0 357 323   3/1990

(Continued)

OTHER PUBLICATIONS

Kiyoshi Osato, et al., "Progress in Optical Disk Recording With Over 20 GB of Capacity," IEEE, 2000, pp. 15-17.

*Primary Examiner*—Gautam R. Patel
(74) *Attorney, Agent, or Firm*—Oblon, Spivak, McClelland, Maier & Neustadt, P.C.

(57) ABSTRACT

A thickness servo system using optical aberrations, wherein a photodetector detects an aberration amount corresponding to thickness irregularity, and a thickness irregularity correction section operates to minimize the detected aberration amount. The thickness irregularity of a transparent layer can also be calculated from the detected aberration amount.

7 Claims, 31 Drawing Sheets

U.S. PATENT DOCUMENTS 6,309,726 B1 * 10/2001 Ono et al. .................. 428/64.1
6,320,699 B1 * 11/2001 Maeda et al. ................ 359/637
6,490,100 B1    12/2002 Sasano et al.
6,493,296 B1 * 12/2002 Fukumoto et al. ........ 369/44.32
6,510,111 B2 * 1/2003 Matsuura .................. 369/44.32
6,525,332 B1 * 2/2003 Chang et al. .......... 250/559.37
6,567,365 B1    5/2003 Hendriks et al.
6,625,103 B1    9/2003 Koike
7,145,846 B2 * 12/2006 Ando ....................... 369/44.26

FOREIGN PATENT DOCUMENTS

| | | |
|---|---|---|
| EP | 0 953 974 | 11/1999 |
| JP | 10-302310 | 11/1998 |
| JP | 11-110769 | 4/1999 |
| JP | 11-195229 | 7/1999 |
| JP | 2000-30299 | 1/2000 |
| JP | 2000-40237 | 2/2000 |
| JP | 2000-076665 | 3/2000 |
| JP | 2001-113494 | 4/2000 |
| JP | 2000-315323 | 11/2000 |
| WO | 99/18466 | 4/1999 |

* cited by examiner

OBJECTIVE LENS OPTICAL SYSTEM+THICKNESS IRREGULARITY
(REFRACTIVE INDEX IRREGULARITY) CORRECTION OPTICAL SYSTEM

OBJECTIVE LENS OPTICAL SYSTEM+THICKNESS IRREGULARITY
(REFRACTIVE INDEX IRREGULARITY) CORRECTION OPTICAL SYSTEM

OBJECTIVE LENS OPTICAL SYSTEM+THICKNESS IRREGULARITY
(REFRACTIVE INDEX IRREGULARITY) CORRECTION OPTICAL SYSTEM

SPOT SIZE OF SUB-BEAM A DECREASES, AND SPOT SIZE OF SUB-BEAM B
INCREASES DUE TO THICKNESS IRREGULARITY

ABERRATION OF SUB-BEAM A=ABERRATION OF SUB-BEAM B
(ABERRATION OF MAIN BEAM M IS ZERO OR MINIMUM)

SPOT SIZE OF SUB-BEAM A INCREASES, AND SPOT SIZE OF SUB-BEAM B
DECREASES DUE TO THICKNESS IRREGULARITY

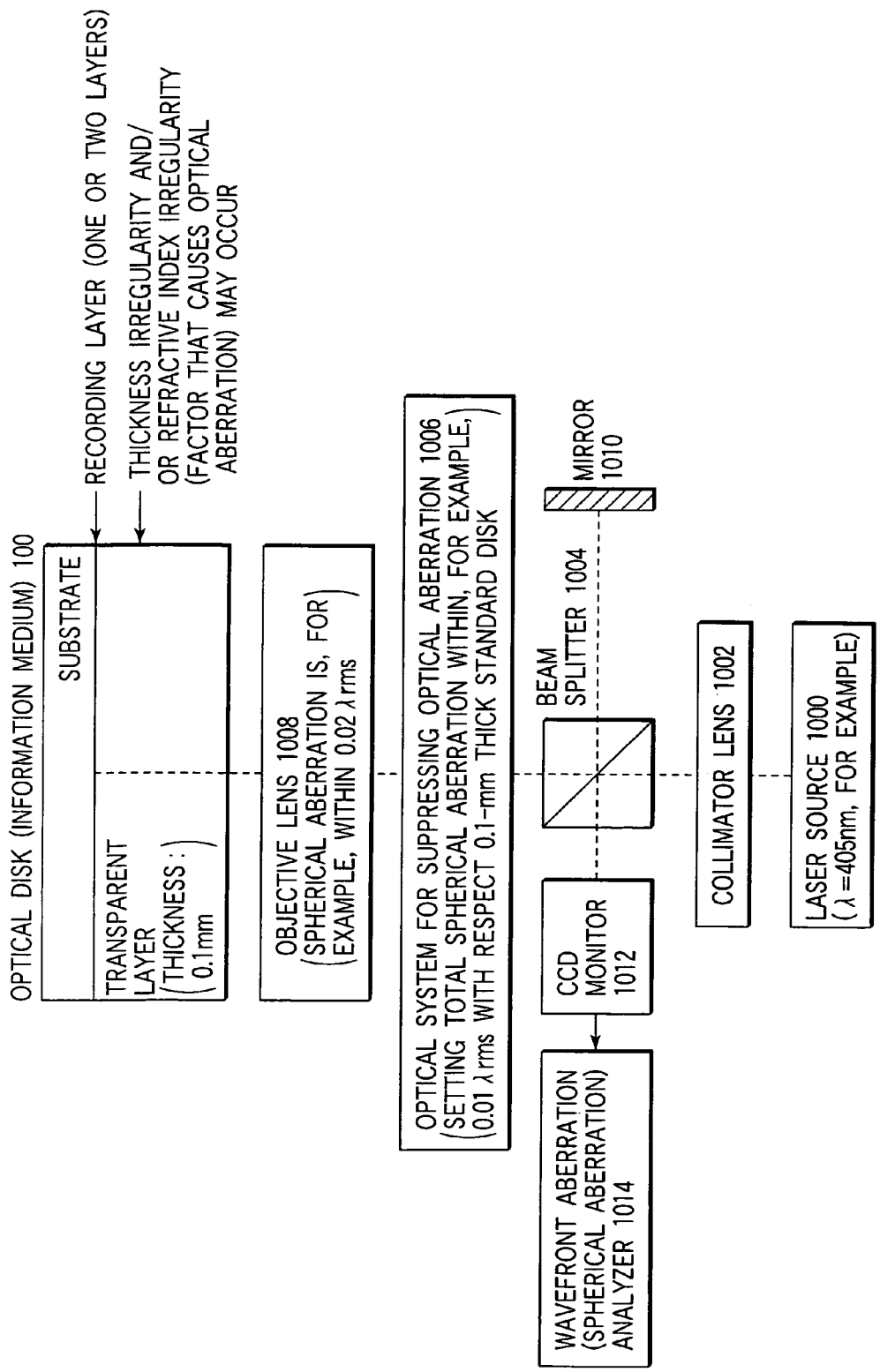
F I G. 20

OPTICAL INFORMATION PROCESSING SYSTEM USING OPTICAL ABERRATIONS AND INFORMATION MEDIUM HAVING RECORDING LAYER PROTECTED BY TRANSPARENT LAYER HAVING THICKNESS IRREGULARITY

CROSS-REFERENCE TO RELATED APPLICATIONS

This application is based upon and claims the benefit of priority from the prior Japanese Patent Application No. 2000-358106, filed Nov. 24, 2000, and from the U.S. patent application Ser. No. 09/805,538, filed Mar. 14, 2001, now U.S. Pat. No. 7,142,484 the entire contents of each of which are incorporated herein by reference.

BACKGROUND OF THE INVENTION

The present invention relates to the following used in a system (apparatus/method) for playing back information recorded on an information medium (optical disk) by using a focused light beam (laser beam) and recording/playing back information on/from an information medium:

(01) aberration state detection of a focused light beam formed on the recording surface of an information medium;

(02) aberration correction control on a focused light beam formed on the recording surface of the information medium;

(03) improvements (rationalization/simplification) in an optical system and processing circuit system in an optical head or information playback apparatus/information recording/playback apparatus having the track deviation detection function of making a focused light beam on the recording surface of an information medium stably trace a recording track and an aberration correction function for the focused light beam;

(04) improvements (rationalization/simplification) in an optical system and processing circuit system in an optical head or information playback apparatus/information recording/playback apparatus having the function of improving the quality of a playback signal from an information medium (performing crosstalk cancellation between adjacent tracks on the information medium) and an aberration correction function for a focused light beam formed on the recording surface of the information medium;

(05) the physical properties (structure, size, characteristics, and the like) of an information medium suited to an increase in density; and

(06) a manufacturing management method associated with information media (e.g., single-sided single-/dual-layer optical disks), which is used to provide an information medium that can guarantee stable recording operation or stable playback operation.

From another viewpoint, the present invention relates to the following as well:

(11) a thickness servo system using optical aberrations;

(12) a system for detecting the thickness irregularity of the transparent protective layer of an information medium by using optical aberrations;

(13) an information medium having a single-sided single-layer information recording layer (read-only layer or read/write layer) protected by a transparent protective layer;

(14) an information medium having a single-sided dual-layer information recording layer (each layer formed as a read-only layer or read/write layer) protected by a transparent protective layer;

(15) an objective lens control method using optical aberrations, and an optical head using this method;

(16) an aberration state detection method and a tilt servo control using this method;

(17) an optical head having an aberration detection optical system and differential push-pull signal processing system, and a servo system using this optical head; and

(18) an optical head having an aberration detection optical system and crosstalk cancellation processing system, and a servo system using this optical head.

Recently, the NA value of the objective lens of an optical head used in an information playback apparatus or information recording/playback apparatus has been increased to reduce the spot size of a focused light beam so as to increase the recording density of an information medium. For example, the NA value of the objective lens of a CD optical head is set to 0.47; the NA value of an early MO drive, 0.55; and the NA value of a present-generation DVD apparatus, 0.6. An NA value of 0.65 or more is being studied in an information playback apparatus or information recording/playback apparatus used for a next-generation DVD.

If thickness irregularity occurs in the transparent layer, the amount of spherical aberration caused in a focused light beam on the recording surface increases approximately in proportion to the fourth power of an NA value. In an information playback apparatus or information recording/playback apparatus with an NA value of 0.65 or more, therefore, a new technique of "a correction function (thickness servo control) for the thickness irregularity of a transparent layer" has been required to correct spherical aberration caused by the thickness irregularity of the transparent layer.

In addition, since the technique of "the transparent layer thickness irregularity correction function (thickness servo)" has not been used in information playback apparatuses and information recording/playback apparatuses, "the residual deviation amount (the upper limit of an allowable residual deviation amount) required for stable operation in transparent layer thickness irregularity correction function (thickness servo)" is completely unknown information in the past servo techniques.

The technique of "the transparent layer thickness irregularity correction function (thickness servo)" has not been used in information playback apparatuses and information recording/playback apparatuses. For this reason, information about "an allowable range of the thickness irregularities of transparent layers which exist before correction" is completely unknown information at present.

In designing a servo circuit for a transparent layer thickness irregularity correction function (thickness servo control), both the "required residual deviation amount" and "the range of the thickness irregularities of transparent layers which exist before correction (the maximum width of transparent layer thickness irregularity in non-defective disks within specifications)" are essential information.

As described above, in the prior art, since the NA value is 0.6 or less, an aspheric single lens is often used as an objective lens used for an optical head in an information playback apparatus/information recording/playback apparatus (optical disk drive). If the NA value is increased to 0.65 or more to increase the recording density in a next-generation DVD, a single-lens structure cannot be used owing to a problem in terms of a manufacturing technique for objective lenses, and an objective lens structure constituted by two or more lenses is required.

With an NA of 0.65 or more, to ensure a positional shift margin between lenses and tilt margin, a transparent layer thinner than that in a conventional DVD, which is 0.6 mm thick, (for example, a 0.1-mm thick layer) is required. If the thickness of a transparent layer is greatly decreased from 0.6 mm in the prior art, the influence of the thickness irregularity of the transparent layer relatively increases. This makes it difficult to use the same manufacturing method (quality control method) as that for an information medium used for a conventional DVD.

For this reason, a next-generation DVD uses the following information medium structure. A substrate (which need not always be transparent) is placed in a direction (on the disk lower surface side) in which recording or playback light is shielded, a reflecting layer or recording layer is formed on the substrate, and a thin (for example, a nominal thickness of 0.1 mm) transparent protective layer is formed on the recording layer.

For an information medium (optical disk) for such a next-generation DVD, methods of forming a transparent layer that exists in a direction in which recording or playback light is transmitted may include, for example:

(A) a method of coating a reflecting or recording layer with a transparent layer by spin coating, blade coating, or the like; and (B) a method of bonding a transparent layer (transparent sheet) formed in advance onto a reflecting layer or recording layer through a transparent adhesive layer.

It is impossible to measure the thickness of a transparent layer in the process of manufacturing an information medium by using either of methods (A) and (B) alone, and hence the thickness of the transparent layer must be measured upon completion of the information medium.

An information medium (optical disk) used for a conventional DVD has a structure in which a reflecting layer or recording layer is directly formed on a transparent substrate with a thickness of 0.6 mm, and the recording surface (reflecting layer or recording layer) is irradiated with a laser beam through the 0.6-mm thick transparent substrate. For this reason, the thickness irregularity of the transparent substrates of information media used for a conventional DVD can be easily managed by mechanically measuring the thickness of each transparent substrate by using a micrometer or the like before a reflecting layer or recording layer is formed in a manufacturing process. However, such a mechanical measurement method is not suited to measuring and managing the above thin (0.1 mm) transparent layer with high precision.

In information media whose compatibility among products must be guaranteed, the transparent layer thickness irregularity range allowed for information media (mass-produced optical disks) is defined in specifications. In defining a transparent layer thickness irregularity allowable range in specifications, however, any method of measuring the thickness of a transparent layer portion has not yet been established.

As a method of measuring the thickness of the transparent layer of a completed medium (optical disk), a method of peeling off part of a transparent layer and measuring a level difference in accordance with the presence/absence of a transparent layer by a turnery step. Since this method is a destructive measurement method for an information medium, the information medium cannot be used after the measurement (destruction of part of the transparent layer).

At present, no nondestructive measurement method is available, which can be used to measure the thickness of the transparent layer in an information medium (optical disk) for a next-generation DVD, and hence a high-precision nondestructive measurement method is required.

In addition, there is no information as to what to do about the characteristics (e.g., the relationship between thickness and refractive index) of the transparent layer of an information medium (optical disk) whose transparent layer has thickness irregularity in an allowable range.

DVD-ROM disks that are currently on the market include single-sided dual-layer disks. According to the specifications for currently available DVD-ROM disks, the thickness of the portion between two reflecting layers is defined to 55±15 μm, and the distance from the surface (incident surface) of a DVD-ROM disk to each recording layer is defined within the range of +53 μm to −50 μm with respect to a reference value of 0.6 mm. The NA value of an optical head used in a currently available DVD is 0.60, and a thickness error range of +53 μm to −50 μm is included in an allowable aberration range in a playback optical system.

As described above, however, the amount of spherical aberration increases in proportion to the fourth power of the NA value of an objective lens. For this reason, if the NA value is increased to 0.65 or more to increase the recording density of an information medium, the amount of spherical aberration sharply increases, and the increased aberration amount falls out of the above allowable aberration range (+53 μm to −50 μm).

To solve this problem, the following two measures must be taken:
 reducing the distance between the two layers to let the amount of spherical aberration fall within the allowable aberration range in the playback optical system; and
 strictly managing the precision of the thickness from the disk surface (incident surface) to each layer, i.e., a reflecting surface or recording surface. In this case, however, the following problems arise:
 If the distance between the two layers is reduced, light reflected by one reflecting layer or recording layer leaks into the photodetector while information is played back from the other reflecting layer or recording layer, resulting in interlayer crosstalk and a deterioration in playback signal.
 If the precision of the thickness from the disk surface to each layer is strictly managed, the manufacturing yield of information media (optical disks) decreases, resulting in an increase in the sales price of information media.

Consider a case where information is optically read from a high-density recording layer under a thin transparent layer (e.g., 0.1 mm thick) having thickness irregularity by using a laser beam of a short wavelength (e.g., 405 nm) focused by an objective lens having a large NA (e.g., 0.85). In this case, two servo operations are required: focusing servo operation of bringing a laser beam to a focus on the recording layer (focusing the beam into a minimum laser spot on the recording layer); and thickness servo operation of correcting an optical aberration caused by the thickness irregularity of the transparent layer (so as to prevent the laser spot size from being increased by an aberration even if the focus is automatically adjusted to a best point by focusing servo operation).

As a method of simultaneously performing focusing servo operation and thickness servo operation, a method of making a focusing servo optical system and thickness servo optical system wobble at different frequencies may be used. In this method, by detecting the envelope of a playback RF signal obtained from an optical disk through wobbling, focusing servo control and thickness servo control are performed (since the wobble frequency of the playback RF signal envelope in focusing servo control differs from that in thickness servo control, frequency separation of servo detection signals in the two servo operations can be performed).

In this method, however, much crosstalk occurs between a detection signal in focusing servo control and a detection signal in thickness servo control, and hence it is impossible to completely separate a focusing servo loop from a thickness servo loop. It is therefore difficult to provide sufficient, stable servo control, resulting in stricter requirement for the thickness irregularity allowable range for transparent layers. In addition, since the upper limit of servo response frequencies is restricted by a wobbling frequency, high-speed servo control is difficult to realize.

As described above, when an optical disk (information medium) tilts with respect to the objective lens due to the influence of warpage and the like in the radial direction and/or circumferential direction of the optical disk, coma occurs in a focused light beam on the recording surface. When this coma occurs, the spot size of the focused light beam on the recording surface increases to cause a deterioration in playback signal from the optical disk (information medium) or instability in recording on the optical disk (information medium) as in the case of the occurrence of spherical aberration.

To solve this problem, an additional tilt servo mechanism for correcting the influence of coma caused by "the tilt of a transparent layer with respect to the objective lens" upon the warpage of a disk (information medium) or the like is introduced (as needed) as well as an additional thickness servo mechanism for correcting the influence of spherical aberration caused by "the thickness irregularity of the transparent layer of a disk (information medium)".

If, however, a thickness servo mechanism and/or tilt servo mechanism is additionally introduced, including their detection optical systems (in addition to the above DPP and/or CTC optical systems and circuit systems), the servo system (detection system and circuit system) is complicated accordingly, resulting in an increase in the cost of an optical head.

BRIEF SUMMARY OF THE INVENTION

The present invention has been made to solve the above problems, and has as its objects (1) to provide a thickness servo system using an optical aberration, or a highly stable, reliable information playback apparatus or information recording/playback apparatus by defining a residual deviation amount required for a thickness irregularity correction function (thickness servo control);

(2) to provide a system for detecting the thickness irregularity of the transparent protective layer of an information medium using an optical aberration, or a transparent layer thickness measurement method which can ensure high stability and high reliability of a thickness irregularity correction function (thickness servo control) in an information playback apparatus or information recording/playback apparatus by limiting the thickness of a transparent layer within a defined range;

(3) to provide an information medium having a single-sided single-layer information recording layer (read-only layer or read/write layer) protected by a transparent protective layer, or an information medium which can ensure high stability and high reliability of a thickness irregularity correction function (thickness servo control) in an information playback apparatus or information recording/playback apparatus by limiting the thickness of a transparent layer within a defined range;

(4) to provide an information medium having a single-sided dual-layer information recording layer (each layer serving as a read-only layer or read/write layer) protected by a transparent protective layer, or to increase the manufacturing yield of information media by guaranteeing stable playback or recording operation of an information medium having a single-sided dual-layer structure even if an objective lens having a large numerical aperture (e.g., NA is 0.65 or more) is used, or relaxing the requirement for the precision of the thickness from the surface of an information medium to each layer, i.e., a reflecting layer or recording layer, thereby decreasing the price of information media;

(5) to provide a lens control method using an optical aberration and an optical head using the method, or a lens control method using a focusing servo loop and thickness servo loop which are completely independent of each other and an optical head using the method;

(6) to provide an aberration state detection method and a tilt servo mechanism using the method, or a coma state detection method and a tilt servo mechanism for suppressing the influences of the warpage and the like of an optical disk (information medium) in the radial direction and/or circumferential direction by using the method;

(7) to provide an optical head having an aberration detection optical system and differential push-pull signal processing system and a servo system (or apparatus) using the optical head, or decrease the cost of an optical head by using one optical system as an aberration detection optical system for thickness servo control and/or tilt servo control and an optical system for tracking servo control using the differential push-pull (DPP) method; and (8) to provide an optical head having an aberration detection optical system and differential push-pull signal processing system and a servo system (or apparatus) using the optical head, or decrease the cost of an optical head by using one optical system as an aberration detection optical system for thickness servo control and/or tilt servo control and an optical system for a crosstalk canceler (CTC).

In order to achieve the above objects, a servo system (or apparatus) according to the present invention defines, for the thickness irregularity of a transparent layer, the characteristics of a thickness irregularity correction function (thickness servo control) (controlling the residual deviation amount in transparent layer thickness irregularity correction to a predetermined value or less) in an information playback apparatus or recording/playback apparatus by using the RMS (Root Mean Square) value of spherical aberration components, defines an allowable residual deviation amount for a thickness irregularity correction function (thickness servo control) by using the Marechal criterion (controls the residual deviation amount in transparent layer thickness irregularity correction to 0.07 $\lambda$rms where $\lambda$ is the wavelength of light in use), or sets an allowable thickness irregularity range for the transparent layer of an information medium from the allowable residual deviation amount for the thickness irregularity correction function (thickness servo control) and servo loop gain G of thickness servo control set in an information playback apparatus or recording/playback apparatus (controls the residual deviation amount in transparent layer thickness irregularity correction to 0.07 λrms×G or less where λ is the wavelength of light in use).

In other words, in order to achieve the above objects, the servo system (or apparatus) according to the present invention activates a transparent layer thickness irregularity correction (thickness servo) function when information is to be played back or recorded from/on an information medium (an optical disk having a single-sided single-layer structure or single-sided dual-layer structure) by using an objective lens whose NA exceeds 0.65, defines the residual deviation amount in thickness irregularity correction (thickness servo control) for an information medium (an optical disk having a single-sided single-layer structure or single-sided dual-layer structure) to 0.07 λrms (or 0.07 λrms×G or less when servo gain G is set for thickness servo control) in order to guarantee stable, reliable playback or recording operation, or defines the precision of the thickness from the surface of an information medium to each layer (one or two layers), i.e., a reflecting layer or recording layer (defines the residual deviation amount in thickness servo control to 0.07 λrms×G or less) in consideration of servo gain G (G is 1 or more; e.g., G=2 to 10000) for thickness irregularity correction (thickness servo control) in order to guarantee stable, reliable thickness irregularity correction (thickness servo control).

<1A> More specifically, a servo system according to the present invention is used to play back information recorded on the recording layer or reflecting layer or recording/playing back on/from the recording layer from the information medium (100) which has the recording layer or reflecting layer covered with the transparent layer that can accompany thickness irregularity or refractive index irregularity, and comprises a light sending system (20–60) for focusing light (LB) of wavelength λ from a light source (10) onto a recording surface of the information medium (100), a detection optical system (30–90A) for detecting the light (LB) of wavelength λ from the information medium (100), and a servo system (thickness servo system) for reducing an optical aberration amount of the light of wavelength λ focused on the recording surface of the information medium (100) by the light sending system (20–60), wherein a residual deviation amount of the optical aberration is kept to not more than 0.07 λrms as a result of operation of the servo system for reducing the optical aberration amount.

<1> Alternatively, a servo system according to the present invention is used to play back information recorded on the recording layer or reflecting layer or recording/playing back on/from the recording layer from the information medium (100) which has the recording layer or reflecting layer covered with the transparent layer that can accompany thickness irregularity or refractive index irregularity, and comprises a light sending system (20–60) for focusing light (LB) of wavelength λ from a light source (10) onto a recording surface of the information medium (100), a detection optical system (30–90A) for detecting the light (LB) of wavelength λ from the information medium (100), and a servo system (thickness servo system) for reducing an optical aberration amount of the light of wavelength λ focused on the recording surface of the information medium (100) by the light sending system (20–60), wherein a residual deviation amount of the optical aberration is kept to not more than 0.07 λrms×G where G is a servo gain for the servo system for reducing the optical aberration amount as a result of operation of the servo system.

<1C> Alternatively, a servo system according to the present invention comprises an objective lens (60) facing a recording layer covered with a transparent layer accompanying thickness irregularity, a laser source (10) for supplying a laser beam to the recording layer through the objective lens (60) and transparent layer, a photodetector (90) for detecting the laser beam reflected by the recording layer through the transparent layer and objective lens (60), and thickness irregularity correction means (50–54) which is placed in a laser beam optical path between the laser source (10) and the recording layer to correct an optical aberration of the objective lens (60) due to the thickness irregularity of the transparent layer, thereby forming a feedback loop in which the photodetector (90) detects an aberration amount corresponding to thickness irregularity, and the thickness irregularity correction means (50–54) operates to minimize the detected aberration amount.

<1D> Alternatively, a servo system according to the present invention comprises an objective lens (60) facing a recording layer covered with a transparent layer accompanying thickness irregularity or refractive index irregularity, a laser source (10) for supplying a laser beam having wavelength λ to the recording layer through the objective lens (60) and transparent layer, a photodetector (90) for detecting the laser beam reflected by the recording layer through the transparent layer and objective lens (60), and thickness irregularity correction means (50–54) which is placed in a laser beam optical path between the laser source (10) and the recording layer to correct an optical aberration of the objective lens (60) due to the thickness irregularity or refractive index irregularity of the transparent layer, wherein in a feedback loop in which the photodetector (90) detects an aberration amount corresponding to thickness irregularity or refractive index irregularity, and the thickness irregularity correction means (50–54) operates to minimize the detected aberration amount, a residual deviation amount as an optical aberration amount left at an operation convergence point of the feedback loop is kept to not more than 0.07 λrms.

<1E> Alternatively, a servo system according to the present invention comprises an objective lens (60) facing a recording layer covered with a transparent layer accompanying thickness irregularity or refractive index irregularity, a laser source (10) for supplying a laser beam having wavelength λ to the recording layer through the objective lens (60) and transparent layer, a photodetector (90) for detecting the laser beam reflected by the recording layer through the transparent layer and objective lens (60), and thickness irregularity correction means (50–54) which is placed in a laser beam optical path between the laser source (10) and the recording layer to correct an optical aberration of the objective lens (60) due to the thickness irregularity or refractive index irregularity of the transparent layer, wherein in a feedback loop having servo gain G larger than 1 (2 to 10,000) in which the photodetector (90) detects an aberration amount corresponding to thickness irregularity or refractive index irregularity, and the thickness irregularity correction means (50–54) operates to minimize the detected aberration amount, a residual deviation amount as an optical aberration amount left at an operation convergence point of the feedback loop is kept to not more than 0.07 λrms×G.

<1F> Alternatively, a servo system according to the present invention comprises an objective lens (60) facing a recording layer covered with a transparent layer accompanying thickness irregularity, a laser source (10) for supplying a laser beam to the recording layer through the objective lens (60) and transparent layer, a hologram element (20A) which is placed between the objective lens (60) and the laser source (10) to generate sub-beams from a laser beam to the recording layer or reflecting layer, a photodetector (90) for detecting the laser beam reflected by the recording layer through the transparent layer and objective lens (60), and thickness irregularity correction means (50–54) which is placed in a laser beam optical path between the laser source (10) and the recording layer to correct an optical aberration of the objective lens (60) due to the thickness irregularity of the transparent layer, thereby forming a feedback loop in which the photodetector (90) detects an aberration amount corresponding to thickness irregularity by detecting changes in spots of the sub-beams on the recording surface, and the thickness irregularity correction means (50–54) operates to minimize the detected aberration amount.

<1G> The servo system according to the present invention can be incorporated in an optical disk apparatus for recording/playing back information on/from an optical disk (100) having a recording layer or reflecting layer covered with the transparent layer.

<1H> Alternatively, the servo system according to the present invention can be incorporated in an optical disk apparatus which records/plays back information on/from an optical disk (100) having a recording layer or reflecting layer covered with the transparent layer, and comprises an optical head including the objective lens, the thickness irregularity correction means (50–54), and the laser source (10).

In order to achieve the above objects, a system (or method) according to the present invention measures the amount of wavefront aberration of light focused on an information medium and reflected by it by using the principle of an interferometer, and measures the thickness irregularity amount of a transparent layer by converting the aberration amount.

<2A> More specifically, a method according to the present invention comprises the steps of:

irradiating the recording layer or reflecting layer of the information medium, covered by a transparent layer that can accompany thickness irregularity (δd), with a focused light beam through the transparent layer (laser source 1000–objective lens 1008);

measuring an aberration amount (Wcrms) of light reflected by the recording layer or reflecting layer (CCD monitor 1012, wavefront aberration analyzer 1014); and obtaining a thickness (reference value of transparent layer thickness 100 μm+δd or 100 μm−δd) of the transparent layer from the measured aberration amount (Wcrms).

<2B> Alternatively, a method according to the present invention comprises the steps of:

setting an inspection target disk (100) having a transparent layer that can accompany thickness irregularity (δd) in an inspection apparatus (FIG. 20) calibrated with a predetermined standard disk (ST202);

measuring an aberration amount (Wcrms) corresponding to wavefront aberration or spherical aberration at a transparent layer of the set target disk (ST208); and converting the measured aberration amount (Wcrms) into thickness irregularity (δd) of the transparent layer of the target disk (ST210, ST212; graph of FIG. 21 or equation (8)).

<2C> Alternatively, a method according to the present invention comprises the steps of:

calibrating an inspection apparatus (FIG. 22) having a thickness servo system for suppressing an influence of transparent layer thickness irregularity on a recording layer or reflecting layer of a disk (ST100);

setting an inspection target disk (100) having a transparent layer that can accompany thickness irregularity (δd) in the calibrated inspection apparatus (FIG. 22) (ST102);

waiting until the thickness servo system is stabilized while receiving reflected light from the recording layer or reflecting layer of the target disk (ST108);

detecting a residual deviation when the thickness servo system is stabilized (ST110); and measuring transparent layer thickness irregularity of the target disk from the detected residual deviation (ST112).

<2D> Alternatively, a method according to the present invention comprises the steps of:

sending a focus light beam which is given an optical aberration (spherical aberration and/or coma) to a recording layer or reflecting layer of an information medium (100) whose recording layer or reflecting layer is covered with a transparent layer (ST308); and detecting a state of occurrence of an aberration of the transparent layer (data corresponding to spherical aberration in ST310 and/or data corresponding to coma in ST312) from a playback signal (residual deviation in thickness servo control and/or ordinate signal in FIGS. 15–18) corresponding to a focused light beam reflected by the recording layer or reflecting layer.

<2E> Alternatively, a method according to the present invention comprises the steps of:

calibrating an inspection apparatus (FIG. 19) having a tilt servo system for suppressing an influence of warpage of a disk by using a predetermined standard disk (ST300);

setting an inspection target disk (100) in the calibrated inspection apparatus (FIG. 19);

waiting until the tilt servo system is stabilized while receiving reflected light from the recording layer or reflecting layer of the target disk (ST308);

acquiring information (data corresponding to coma) corresponding to warpage of the target disk from a detection signal (wobble detection signal) from the tilt servo system (ST312).

In order to achieve the above objects, in an information medium (single-sided single-layer optical disk) according to the present invention, a range determined by a combination of a refractive index and thickness of a transparent layer is specified.

<3A> More specifically, an information medium according to the present invention has a recording layer or reflecting layer protected by a transparent layer which has predetermined thickness d (nominal value of 100 μm) and can accompany irregularity of refractive index n in a predetermined range (1.47 to 1.67) and thickness irregularity in a predetermined range (±δd).

In this case, a relationship between refractive index n and thickness d of the transparent layer is defined in a range surrounded by four points:

(1) n=1.47, d=110 μm;
(2) n=1.67, d=110 μm;
(3) n=1.67, d=190 μm; and
(4) n=1.47, d=90 μm.

<3B> More specifically, an information medium according to the present invention has a recording layer or reflecting layer protected by a transparent layer which has predetermined thickness d (nominal value of 100 µm) and can accompany irregularity of refractive index n in a predetermined range (1.57 to 1.67) and thickness irregularity in a predetermined range (±δd).

In this case, a relationship between refractive index n and thickness d of the transparent layer is defined in a range surrounded by six points:
(1) n=1.57, d=115 µm;
(2) n=1.62, d=110 µm;
(3) n=1.67, d=110 µm;
(4) n=1.67, d=90 µm
(5) n=1.62, d=90 µm; and
(6) n=1.57, d=95 µm.

<3C> More specifically, an information medium according to the present invention has a recording layer or reflecting layer protected by a transparent layer which has predetermined thickness d (nominal value of 100 µm) and can accompany irregularity of refractive index n in a predetermined range (1.42 to 1.72) and thickness irregularity in a predetermined range (±δd).

In this case, a relationship between refractive index n and thickness d of the transparent layer is defined in a range surrounded by six points:
(1) n=1.42, d=186 µm;
(2) n=1.72, d=160 µm;
(3) n=1.72, d=160 µm
(4) n=1.72, d=40 µm
(5) n=1.57, d=40 µm; and
(6) n=1.42, d=66 µm.

<3D> In the information medium according to the present invention, the transparent layer can be formed by polycarbonate, acrylic, or a carton.

<3E> In the information medium according to the present invention, the reference value of the thickness d of the transparent layer can be a nominal value of 100 µm.

<3F> In addition, when the information medium according to the present invention is to be used in an apparatus (FIG. 6, FIG. 13 or 14) including an objective lens (60) for guiding coherent light of a predetermined wavelength (e.g., λ=405 nm) to the recording layer or reflecting layer through the transparent layer, and a thickness servo system (500) for suppressing an influence of an optical aberration of the objective lens (60) due to thickness irregularity or refractive index irregularity in the transparent layer, thickness irregularity δd of the transparent layer is managed to become not more than a value corresponding to $$\{[0.94 \times 8 \cdot n^3]/[0.07 \times (n^2-1) \times (NA)^4]\} \times (G \cdot Wcrms)$$

where n is a refractive index of the transparent layer, NA is a numerical aperture of the objective lens, G is a servo gain of the thickness servo system, and Wcrms (FIG. 21) is a correction function for the optical aberration due to servo operation of the thickness servo system.

<3G> In addition, the information medium according to the present invention is used in an apparatus (FIG. 6, FIG. 13 or 14) configured to irradiate the recording layer or reflecting layer with coherent light whose wavelength λ falls in a range of 650 nm to 400 nm through the transparent layer.

<3H> The apparatus (FIG. 6, FIG. 13 or 14) using the information medium according to the present invention includes an objective lens (60) for guiding the coherent light to the recording layer or reflecting layer through the transparent layer, and numerical aperture NA of the objective lens (60) is selected from a range of 0.6 to 0.9, and more preferably a range of 0.65 to 0.85.

<3I> In addition, the information medium according to the present invention has a recording-layer or reflecting layer protected by a transparent layer which has predetermined thickness d (nominal value of 100 µm) and can accompany irregularity of refractive index n in a predetermined range and thickness irregularity in a predetermined range (±δd), and is to be used in an apparatus (FIG. 6, FIG. 13 or 14) including an objective lens (60) for guiding coherent light of a predetermined wavelength (e.g., λ=405 nm) to the recording layer or reflecting layer through the transparent layer, and a thickness servo system (500) for suppressing an influence of an optical aberration of the objective lens (60) due to thickness irregularity or refractive index irregularity in the transparent layer, thickness irregularity δd of the transparent layer is managed to become not more than a value corresponding to $$\{[0.94 \times 8 \cdot n^3]/[0.07 \times (n^2-1) \times (NA)^4]\} \times (G \cdot Wcrms)$$

where n is a refractive index of the transparent layer, NA is a numerical aperture of the objective lens, G is a servo gain of the thickness servo system, and Wcrms (FIG. 21) is a correction function for the optical aberration due to servo operation of the thickness servo system.

In order to achieve the above objects, in an information medium (single-sided dual-layer optical disk) according to the present invention, a range determined by a combination of a refractive index and thickness of a transparent layer is specified.

<4A> More specifically, the medium according to the present invention has a first recording layer or reflecting layer and a second recording layer or reflecting layer stacked on the first recording layer or reflecting layer through a transparent space layer, and a transparent layer which has predetermined thickness d and can accompany irregularity of refractive index n in a predetermined range and thickness irregularity in a predetermined range is formed on the first recording layer or reflecting layer.

In this case, predetermined thickness d (nominal value of 100 µm) indicates a distance from a surface of the transparent layer to an intermediate portion of the space layer, and a relationship between refractive index n and thickness d of the transparent layer is defined in a range surrounded by four points:
(1) n=1.47, d=115 µm;
(2) n=1.67, d=115 µm;
(3) n=1.67, d=85 µm; and
(4) n=1.47, d=85 µm.

<4B> More specifically, the medium according to the present invention has a first recording layer or reflecting layer and a second recording layer or reflecting layer stacked on the first recording layer or reflecting layer through a transparent space layer, and a transparent layer which has predetermined thickness d and can accompany irregularity of refractive index n in a predetermined range and thickness irregularity in a predetermined range is formed on the first recording layer or reflecting layer.

In this case, predetermined thickness d (nominal value of 100 µm) indicates a distance from a surface of the transparent layer to an intermediate portion of the space layer, and a relationship between refractive index n and thickness d of the transparent layer is defined in a range surrounded by four points:
(1) n=1.57, d=120 µm;
(2) n=1.62, d=115 µm;

(3) n=1.67, d=115 μm;
(4) n=1.67, d=85 μm
(5) n=1.62, d=85 μm; and
(6) n=1.57, d=90 μm.

<4C> More specifically, the medium according to the present invention has a first recording layer or reflecting layer and a second recording layer or reflecting layer stacked on the first recording layer or reflecting layer through a transparent space layer, and a transparent layer which has predetermined thickness d and can accompany irregularity of refractive index n in a predetermined range and thickness irregularity in a predetermined range is formed on the first recording layer or reflecting layer.

In this case, predetermined thickness d (nominal value of 100 μm) indicates a distance from a surface of the transparent layer to an intermediate portion of the space layer, and a relationship between refractive index n and thickness d of the transparent layer is defined in a range surrounded by four points:
(1) n=1.42, d=229 μm;
(2) n=1.57, d=190 μm;
(3) n=1.72, d=190 μm;
(4) n=1.72, d=10 μm
(5) n=1.57, d=10 μm; and
(6) n=1.42, d=49 μm.

<4D> In the information medium according to the present invention, the transparent layer can be formed by polycarbonate, acrylic, or a carton.

<4E> In the information medium according to the present invention, the reference value of the thickness d of the transparent layer can be a nominal value of 100 μm.

<4F> In addition, when the information medium according to the present invention is to be used in an apparatus (FIG. 6, FIG. 13 or 14) including an objective lens (60) for guiding coherent light of a predetermined wavelength (e.g., λ=405 nm) to the first recording layer or reflecting layer or the second recording layer or reflecting layer through the transparent layer, and a thickness servo system (500) for suppressing an influence of an optical aberration of the objective lens (60) due to thickness irregularity or refractive index irregularity in the transparent layer, thickness irregularity δd of the transparent layer is managed to become not more than a value corresponding to $$\{[0.94 \times 8 \cdot n^3]/[0.07 \times (n^2-1) \times (NA)^4]\} \times (G \cdot Wcrms)$$

where n is a refractive index of the transparent layer, NA is a numerical aperture of the objective lens, G is a servo gain of the thickness servo system, and Wcrms (FIG. 21) is a correction function for the optical aberration due to servo operation of the thickness servo system.

<4G> In addition, the information medium according to the present invention is used in an apparatus (FIG. 6, FIG. 13 or 14) configured to irradiate the first recording layer or reflecting layer or the second recording layer or reflecting layer with coherent light whose wavelength λ falls in a range of 650 nm to 400 nm through the transparent layer.

<4H> The apparatus (FIG. 6, FIG. 13 or 14) using the information medium according to the present invention includes an objective lens (60) for guiding the coherent light to the recording layer or reflecting layer through the transparent layer, and numerical aperture NA of the objective lens (60) is selected from a range of 0.6 to 0.9, and more preferably a range of 0.65 to 0.85.

<4I> In addition, the information medium according to the present invention has a first recording layer or reflecting layer protected by a transparent layer which has predetermined thickness d (nominal value of 100 μm) and can accompany irregularity of refractive index n in a predetermined range and thickness irregularity in a predetermined range (±δd), and a second recording layer or reflecting layer stacked on the first recording layer or reflecting layer on an opposite side to the transparent layer through a transparent space layer, and is to be used in an apparatus (FIG. 6, FIG. 13 or 14) including an objective lens (60) for guiding coherent light of a predetermined wavelength (e.g., λ=405 nm) to the first recording layer or reflecting layer or the second recording layer or reflecting layer through the transparent layer, and a thickness servo system (500) for suppressing an influence of an optical aberration of the objective lens (60) due to thickness irregularity or refractive index irregularity in the transparent layer, thickness irregularity δd of the transparent layer is managed to become not more than a value corresponding to $$\{[0.94 \times 8 \cdot n^3]/[0.07 \times (n^2-1) \times (NA)^4]\} \times (G \cdot Wcrms)$$

where n is a refractive index of the transparent layer, NA is a numerical aperture of the objective lens, G is a servo gain of the thickness servo system, and Wcrms (FIG. 21) is a correction function for the optical aberration due to servo operation of the thickness servo system.

<4J> An apparatus (optical head, disk drive, or recorder/player) according to the present invention, which is used to play back information recorded on the recording layer or reflecting layer or recording/playing back on/from the recording layer (100) from the information medium which has the recording layer or reflecting layer covered with the transparent layer that can accompany thickness irregularity or refractive index irregularity, comprises a light sending system (20–60) for focusing light (LB) from a light source (10) onto a recording surface of the information medium (100), a detection optical system (30–90A) for detecting the light (LB) from the information medium (100), and aberration correction means (50, 52) for correcting an optical aberration of the light focused on the recording surface of the information medium (100) by the light sending system (20–60).

When information-recorded on the recording layer or reflecting layer is played back, or information is recorded/played back on/from the recording layer, the aberration correction means (50, 52) corrects the optical aberration.

In order to achieve the above objects, the apparatus according to the present invention is configured to detect an optical aberration amount (spherical aberration amount) and defocusing amount independently and perform correction control on the detected amounts.

<5A> More specifically, an apparatus (optical head, disk drive, or recorder/player) according to the present invention is used to play back information recorded on the information medium (100) or record/play back information on/from the information medium (100), and comprises a light sending system (20–60) for focusing light (LB) from a light source (10) onto the recording surface of the information medium (100), and a detection optical system (30–90A) for detecting light from the information medium (100), wherein a spherical aberration state (FIGS. 8A–8C) and defocusing state of the light focused on the recording surface of the information medium (100) by the light sending system (20–60) are independently detected (FIG. 10).

<5B> In addition, the apparatus according to the present invention can comprise:

an objective lens (60) facing a recording layer or reflecting layer covered with a transparent layer accompanying thickness irregularity;

a laser source (10) for supplying a laser beam to the recording layer or reflecting layer through the objective lens (60) and transparent layer;

a photodetector (90A) for detecting the laser beam reflected by the recording layer or reflecting layer through the transparent layer and objective lens (60);

thickness irregularity correction means (50–54) which is placed in a laser beam optical path between the laser source (10) and the recording layer or reflecting layer to correct spherical aberration of the objective lens (60) due to the thickness irregularity of the transparent layer;

defocusing correction means (60, 62) for correcting defocusing of a beam spot of the laser beam formed on the recording layer or reflecting layer by the objective lens (60);

a focusing servo system (600) for detecting a defocusing amount of the beam spot focused on the recording surface of the information medium (100) by the photodetector (90A), and operating the defocusing correction means (60, 62) so as to reduce the detected defocusing amount; and a thickness servo system (500) which detects a spherical aberration amount corresponding to the thickness irregularity by the photodetector (90A), operates the thickness irregularity correction means (50–54) so as to reduce the detected spherical aberration amount, and has a servo loop independent of a servo loop of the focusing servo system (600).

<5C> The apparatus according to the present invention can further comprise a tracking servo system (400) having a servo loop independent of the servo loop of the thickness servo system (500) and the servo loop of the focusing servo system (600).

In this case, the tracking servo system operates to move the beam spot, whose spherical aberration amount and defocusing amount are respectively suppressed by the operations of the thickness servo system and focusing servo system, on a predetermined position on the recording layer or reflecting layer.

In order to achieve the above objects, the apparatus according to the present invention is configured to detect the state of occurrence of wavefront aberration (spherical aberration) due to the thickness irregularity of the transparent layer of an information medium and the like.

<6A> More specifically, an apparatus (FIG. 20) according to the present invention can comprise:

a light sending system (1002–1008) for focusing light from a light source (1000) onto a recording surface of an information medium (100);

a detection optical system (1004–1012) for detecting light from the information medium (100); and means (1014) for detecting a state of occurrence of wavefront aberration or spherical aberration (FIG. 21) of the light focused on the recording surface of the information medium (100) by the light sending system (1002–1008) from a detection result obtained by the detection optical system (1004–1012).

<6B> An apparatus (optical head, disk drive, or recorder/player) according to the present invention can comprise a light sending system (20–60) for focusing light (LB) from a light source (10) onto a recording surface of an information medium (100) upon giving an optical aberration to the light (LB), and a detection optical system (30–90) for detecting light (LB) from the information medium (100), wherein an optical aberration state (FIGS. 9 and 15 to 18) of the light focused on the recording surface of the information medium (100) by the light sending system (20–60) is detected from a detection result obtained by the detection optical system (30–90) (FIGS. 6, 13, and 14).

<6C> An apparatus (optical head, disk drive, or recorder/player) according to the present invention can comprise a light sending system (20A–60) for focusing light (LB) from a light source (10) onto a recording surface of an information medium (100) upon giving spherical aberration to the light (LB), and a detection optical system (30–90A) for detecting light (LB) from the information medium (100), wherein a spherical aberration state (FIG. 9) of the light focused on the recording surface of the information medium (100) by the light sending system (20A–60) is detected from a detection result obtained by the detection optical system (30–90A) (FIG. 6).

<6D> The size of the focused spot of the light (LB) focused on the recording surface of the information medium used in the apparatus according to the present invention changes in accordance with the amount of spherical aberration (FIGS. 5 and 9), and the spherical aberration state (FIG. 9) includes the relationship between the amount of spherical aberration (the abscissa in FIG. 9) and the size of the focused spot (the ordinate on the right side in FIG. 9) which changes in accordance with the amount of spherical aberration.

<6E> The central intensity of the focused spot of the light (LB) focused on the recording surface of the information medium used in the apparatus according to the present invention changes in accordance with the amount of spherical aberration (FIGS. 5 and 9), and the spherical aberration state (FIG. 9) includes the relationship between the amount of spherical aberration (the abscissa in FIG. 9) and the central intensity of the focused spot (the ordinate on the left side in FIG. 9) which changes in accordance with the amount of spherical aberration.

<6F> Letting $\lambda$ be the wavelength of the light (LB) used in the apparatus according to the present invention, the amount of spherical aberration (the abscissa in FIG. 9) is selected from the range of $0.2\ \lambda$ to $0.8\ \lambda$, preferably the range of $0.3\ \lambda$ to $0.7\ \lambda$, and more preferably the range of $0.4\ \lambda$ to $0.6\ \lambda$ (one of guidelines for range selection is associated with consideration given to the balance between the degree of a decrease in the central intensity of a focused spot with an increase in aberration amount and the rate of change in focused spot size with a change in aberration amount).

<6G> An apparatus (optical head, disk drive, or recorder/player) according to the present invention can comprise a light sending system (20B–60) for focusing light (LB) from a light source (10) onto a recording surface of an information medium (100) upon giving coma to the light (LB), and a detection optical system (30–90B) for detecting light (LB) from the information medium (100), wherein a coma state (FIGS. 15 to 18) of the light focused on the recording surface of the information medium (100) by the light sending system (20B–60) is detected from a detection result obtained by the detection optical system (30–90B) (FIGS. 13 and 14).

<6H> This apparatus according to the present invention can be configured to detect a signal corresponding to a warpage amount (the ordinates in FIGS. 15 to 18) corresponding to the warpage amount (the abscissas in FIGS. 15 to 18) of the information medium (100) from the coma state (FIGS. 15 to 18).

<6I> In addition, this apparatus (optical head, disk drive, or recorder/player) according to the present invention can further comprise:

tilt correction means (72) for adjusting a tilt of the light incident from the light sending system (20B–60) to the recording surface of the information medium (100); and a tilt servo system (700) for operating the tilt correction means (72) to make the light (laser beam passing through the center of the objective lens) vertically strike the recording surface on the basis of the signal corresponding to the warpage amount (the ordinates in FIGS. 15 to 18) (FIGS. 13 and 14).

In order to achieve the above objects, an apparatus according to the present invention is configured to use one optical system as an aberration detection optical system and a DPP (Differential Push-Pull) optical system.

<7A> More specifically, an apparatus (optical head, disk drive, or recorder/player) according to the present invention is used to play back information recorded along a track concentrically or spirally formed on an information medium (100) by using a focused light beam, or record information along a track concentrically or spirally formed on the information medium (100) by using a focused light beam, comprises:

a light source (10), an optical element (hologram element 20A) having a light splitting function for focusing light (LB) from the light source (10) onto a plurality of focusing positions on the recording surface of the information medium (100), a light sending system (30–60) for focusing light (LB) from the optical element (20A) onto a plurality of focusing positions on the recording surface of the information medium (100), and a detection optical system (30–90A) for detecting the light (LB) from the information medium (100), wherein a signal (differential push-pull DPP signal in FIG. 7) corresponding to a relative positional shift (track deviation) between the focused light beam and the track on the recording surface of the information medium (100) is detected from the detection optical system (30–90A).

<7B> Alternatively, an apparatus (optical head, disk drive, or recorder/player) according to the present invention can comprise:

a light source (10) for outputting coherent light (LB);

an optical element (hologram element 20A) having a light splitting function for generating a main beam and a sub-beam from the light (LB);

a light sending system (30–60) for sending the main beam and sub-beam to a recording layer or reflecting layer covered with a transparent layer that can accompany thickness irregularity, and focusing the beams on a recording surface of the recording layer or reflecting layer;

a detection optical system (30–90A) including a main beam detection cell (92) for detecting the main beam reflected by the recording surface, and a sub-beam detection cell (94, 96) for detecting the sub-beam reflected by the recording surface;

thickness irregularity correction means (50–54), placed in an optical path from the light source (10) to the recording surface, for correcting an optical aberration caused by thickness irregularity of the transparent layer;

a thickness servo system (500) for operating the thickness irregularity correction means (50–54) so as to reduce an influence of the optical aberration by the thickness irregularity of the transparent layer on the basis of detection signals from the sub-beam detection cell (94, 96);

position shift correction means (64) for correcting a position shift (track deviation) of the main beam on the recording surface; and a tracking servo system (400) for operating the position shift correction means (64) so as to reduce an influence of the positional shift of the main beam on the basis of a detection signal from the main beam detection cell (92), wherein the tracking servo system (400) operates the positional shift correction means (64) so as to reduce the influence of the positional shift of the main beam by using the detection signal (DPP signal) from the sub-beam detection cell (94, 96), together with the detection signal from the main beam detection cell (92).

<7C> Alternatively, an apparatus (optical head, disk drive, or recorder/player) according to the present invention can comprise:

a light source (10) for outputting coherent light (LB);

an optical element (hologram element 20A) having a light splitting function for generating a 0th-order main beam and +1st-order sub-beam and –1st-order sub-beam from the light (LB);

a light sending system (30–60) for sending the 0th-order main beam, +1st-order sub-beam, –1st-order sub-beam to a recording layer or reflecting layer covered with a transparent layer that can accompany thickness irregularity, and focusing the beams on a recording surface of the recording layer or reflecting layer;

a detection optical system (30–90A) including a main beam detection cell (92) for detecting the 0th-order main beam reflected by the recording surface, a first sub-beam detection cell (94) for detecting the +1st-order sub-beam reflected by the recording surface, and a second sub-beam detection cell (96) for detecting the –1st-order sub-beam reflected by the recording surface;

thickness irregularity correction means (50–54), placed in an optical path from the light source (10) to the recording surface, for correcting an optical aberration caused by thickness irregularity of the transparent layer;

a thickness servo system (500) for operating the thickness irregularity correction means (50–54) so as to reduce an influence of the optical aberration by the thickness irregularity of the transparent layer on the basis of detection signals from the first sub-beam detection cell (94) and second sub-beam detection cell (96);

position shift correction means (64) for correcting a position shift (track deviation) of the main beam on the recording surface; and a tracking servo system (400) for operating the position shift correction means (64) so as to reduce an influence of the positional shift of the main beam on the basis of a detection signal from the main beam detection cell (92), wherein the tracking servo system (400) operates the positional shift correction means (64) so as to reduce the influence of the positional shift of the main beam by using at least one of the detection signals (DPP signals) from the first sub-beam detection cell (94) and second sub-beam detection cell (96), together with the detection signal from the main beam detection cell (92).

In order to achieve the above objects, an apparatus according to the present invention is configured to use one optical system as an aberration detection optical system and a CTC (crosstalk cancel) optical system.

<8A> More specifically, an apparatus (optical head, disk drive, or recorder/player) according to the present invention is used to play back information recorded along a track concentrically or spirally formed on an information medium (100) by using a focused light beam, comprises:

a light source (10), an optical element (hologram element 20A) having a light splitting function for focusing light (LB) from the light source (10) onto a plurality of focusing positions on the recording surface of the information medium (100), a light sending system (30–60) for focusing light (LB) from the optical element (20A) onto a plurality of focusing positions on the recording surface of the information medium (100), and a detection optical system (30–90A) for detecting the light (LB) from the information medium (100), wherein a signal (crosstalk cancel CTC signal in FIG. 7) corresponding to crosstalk between adjacent tracks on the recording surface of the information medium (100) is detected from the detection optical system (30–90A).

<8B> Alternatively, an apparatus (optical head, disk drive, or recorder/player) according to the present invention can comprise:

a light source (10) for outputting coherent light (LB);

an optical element (hologram element 20A) having a light splitting function for generating a main beam and a sub-beam from the light (LB);

a light sending system (30–60) for sending the main beam and sub-beam to a recording layer or reflecting layer covered with a transparent layer that can accompany thickness irregularity, and focusing the beams on a plurality of adjacent tracks formed on a recording surface of the recording layer or reflecting layer;

a detection optical system (30–90A) including a main beam detection cell (92) for detecting the main beam reflected by the recording surface, and a sub-beam detection cell (94, 96) for detecting the sub-beam reflected by the recording surface;

thickness irregularity correction means (50–54), placed in an optical path from the light source (10) to the recording surface, for correcting an optical aberration caused by thickness irregularity of the transparent layer;

a thickness servo system (500) for operating the thickness irregularity correction means (50–54) so as to reduce an influence of the optical aberration by the thickness irregularity of the transparent layer on the basis of detection signals from the sub-beam detection cell (94, 96); and playback means (300) for playing back information recorded on the recording track on the basis of a detection signal from the main beam detection cell (92), wherein the playback means (300) detects a crosstalk cancel signal (CTC signal) corresponding to a crosstalk component between the plurality of adjacent tracks from the sub-beam detection cell (94, 96), and cancels the crosstalk component contained in the detection signal from the main beam detection cell (92) by using the crosstalk cancel signal (CTC signal).

<8C> Alternatively, an apparatus (optical head, disk drive, or recorder/player) according to the present invention can comprise:

a light source (10) for outputting coherent light (LB);

an optical element (hologram element 20A) having a light splitting function for generating a 0th-order main beam and +1st-order sub-beam and −1st-order sub-beam from the light (LB);

a light sending system (30–60) for sending the 0th-order main beam, +1st-order sub-beam, −1st-order sub-beam to a recording layer or reflecting layer covered with a transparent layer that can accompany thickness irregularity, and focusing the beams on a plurality of adjacent tracks formed on a recording surface of the recording layer or reflecting layer;

a detection optical system (30–90A) including a main beam detection cell (92) for detecting the 0th-order main beam reflected by the recording surface, a first sub-beam detection cell (94) for detecting the +1st-order sub-beam reflected by the recording surface, and a second sub-beam detection cell (96) for detecting the −1st-order sub-beam reflected by the recording surface;

thickness irregularity correction means (50–54), placed in an optical path from the light source (10) to the recording surface, for correcting an optical aberration caused by thickness irregularity of the transparent layer;

a thickness servo system (500) for operating the thickness irregularity correction means (50–54) so as to reduce an influence of the optical aberration by the thickness irregularity of the transparent layer on the basis of detection signals from the first sub-beam detection cell (94) and second sub-beam detection cell (96); and playback means (300) for playing back information recorded on the recording track on the basis of a detection signal from the main beam detection cell (92), wherein the playback means (300) detects a crosstalk cancel signal (CTC signal) corresponding to a crosstalk component between the plurality of adjacent tracks from at least one of the first sub-beam detection cell (94) and second sub-beam detection cell (96), and cancels the crosstalk component contained in the detection signal from the main beam detection cell (92) by using the crosstalk cancel signal (CTC signal).

In order to achieve the above objects, an apparatus according to the present invention is configured to use one optical system as an aberration detection optical system, DPP optical system, and CTC (crosstalk cancel) optical system.

<9A> More specifically, an apparatus (optical head, disk drive, or recorder/player) according to the present invention is used to play back information recorded along a track concentrically or spirally formed on an information medium (100) by using a focused light beam, or record information along a track concentrically or spirally formed on the information medium (100) by using a focused light beam, comprises:

a light source (10), an optical element (hologram element 20A) having a light splitting function for focusing light (LB) from the light source (10) onto a plurality of focusing positions on the recording surface of the information medium (100), a light sending system (30–60) for focusing light (LB) from the optical element (20A) onto a plurality of focusing positions on the recording surface of the information medium (100), and a detection optical system (30–90A) for detecting the light (LB) from the information medium (100), wherein a signal (differential push-pull DPP signal in FIG. 7) corresponding to a relative positional shift (track deviation) between the focused light beam and the track on the recording surface of the information medium (100) is detected from the detection optical system (30–90A), and a signal (crosstalk cancel CTC signal in FIG. 7) corresponding to crosstalk between adjacent tracks on the recording surface of the information medium (100) is detected from the detection optical system (30–90A).

In the above arrangement, since a differential push-pull (DPP) signal and crosstalk cancel (CTC) signal are extracted from the thickness servo and tilt servo optical systems and circuit systems, the thickness servo and tilt servo optical systems and circuit systems can be partly used for DPP and CTC operations. With this arrangement, the apparatus arrangement including the DPP and CTC functions can be simplified. This makes it possible to attain reductions in the size and weight of the apparatus and total cost.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 20 is a view for explaining a method of inspecting the thickness irregularity amount of the transparent layer of an information medium by using a wavefront aberration analyzer;

DETAILED DESCRIPTION OF THE INVENTION

Figure 1A:
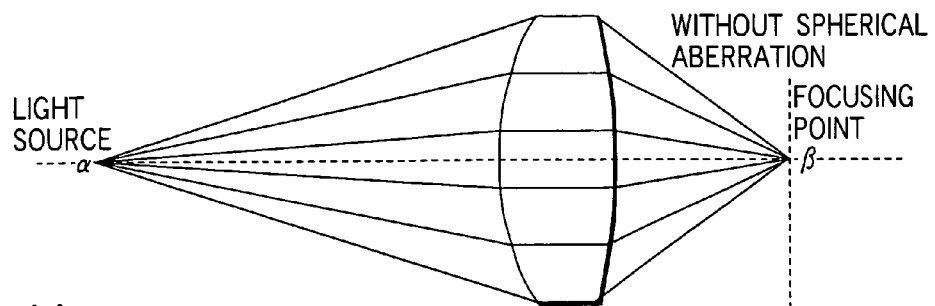
FIGS. 1A to 1D are views for explaining a spherical aberration correction mechanism (without any transparent layer) based on the spherical aberration of a convex lens and a combination of concave and convex lenses.

An information playback apparatus (read-only optical disk drive or optical disk player) for playing back information recorded on an information medium (optical disk) by using focused light (laser beam) or an information recording/playback apparatus (readable/writable optical disk driver or optical disk recorder) for recording/playing back information on/from an information medium generally has, for example, the following functions:

(a) the focus correction function (focusing servo) of matching a reflecting or recording layer position of an information medium to the focusing point position of focused light;

(b) the track deviation correction function (tracking servo) of making focused light trace tracks concentrically or spirally (helically) formed on the reflecting or recording layer of an information medium; and (c) the tilt correction function (tilt servo) of making correction for the tilt of the reflecting or recording layer of an information medium which is caused by warpage of the medium.

The above correction functions (servo mechanisms) are configured to optically detect deviations from ideal values, e.g., a defocus amount and track deviation amount and make corrections to them. Even if such a correction function (servo mechanism) is activated, the ideal state cannot be restored perfectly by correcting a deviation. A deviation amount (e.g., a defocus amount or track diaphragm amount after servo control) from an ideal state after the activation of this correction function (servo mechanism) is called a "residual deviation".

As for the correction functions (servo mechanisms) (a) to (c) described above, specific values to be set as "residual deviation amounts required for the stable operation of the servo systems" are empirically known after much trial and error in the past.

The track deviation correction function (tracking servo) (b) will be further described below.

An information medium (optical disk) loaded into an information playback apparatus (optical disk player) for playing back information by using focused light or an information recording/playback apparatus (optical disk recorder) for recording/playing back information has concentric or spiral (helical) tracks and is configured to have information recorded along the tracks in advance or allow information to be recorded along the tracks.

According to a playback-only information medium (e.g., a DVD-ROM) designed only for playback of information recorded in advance, the information is played back by using changes in the amount of focused light reflected when it passes through a pit array having a minute uneven pattern along a track.

In an information medium capable of recording or rewriting information (DVD-R, DVD-RW, DVD-RAM, or the like), continuous grooves (pre-grooves) are formed along tracks in advance. This information medium is configured to record information by moving focused light along a continuous groove (pre-groove) or a region (land) between adjacent continuous grooves.

The above continuous groove (pre-groove) slightly wobbles, and a reference clock signal in information recording operation is extracted or the rotational speed of the information medium is detected by using a wobble signal from this wobbling pre-groove or land.

To detect the position offset (track deviation) of focused light from a pre-groove or land center, a push-pull method is often used, which detects the diffraction pattern produced when focused light is diffracted by a pre-groove or land portion. In the push-pull method, however, when an information medium tilts due to warpage, an offset occurs in a track deviation detection signal.

To solve this problem, a DPP (Differential Push-Pull) method has been proposed. According to the DPP method, a plurality of focused light beams (three laser beams) are applied onto the recording surface of an information medium such that while the main beam at the middle exists on a pre-groove (or land), the left and right sub-beams are applied onto lands (or pre-grooves), and the offset amount is canceled by taking the differences between a push-pull signal obtained from the main beam and push-pull signals obtained from the respective sub-beams.

If the distance between adjacent tracks (track pitch) is reduced to increase the density of an information medium, a crosstalk phenomenon occurs, in which focused light simultaneously senses pit signals existing on adjacent tracks in playback operation, resulting in a deterioration in a playback signal.

As a method of eliminating the influences of such crosstalk from adjacent tracks, a processing method called a CTC (CrossTalk Canceller) method has been proposed. In the CTC method, a plurality of focused light beams (three laser beams) are applied onto the recording surface of an information medium such that while the main beam at the middle position exists on a track center, the left and right sub-beams are applied onto the left and right adjacent tracks, and crosstalk components contained in a detection signal from the main beam are canceled out by detection signals from the left and right sub-beams.

If dust adheres to the recording surface of the information medium or the surface is damaged, it becomes difficult to play back or record/play back information. For this reason, a transparent layer such as a transparent substrate or transparent protective layer is formed on the recording surface of the information medium which opposes an objective lens for focusing light. If, however, "thickness irregularity" occurs, i.e., the thickness of this transparent layer (the distance from the transparent layer surface opposing the objective lens to the recording layer) deviates from an ideal thickness value (a design median value in the manufacture of media), spherical aberration occurs in focused light on the recording surface. If the information medium tilts due to warpage or the like, coma occurs in focused light on the recording surface owing to the influence of this transparent layer. When either of the aberrations, the spherical aberration and coma, occurs, the spot size of focused light on the recording surface increases, resulting in a deterioration in a playback signal from the information medium or instability in recording on the information medium.

The spot size of focused light applied onto the recording surface of an information medium is proportional to the wavelength and inversely proportional to the NA (Numerical Aperture) value representing the aperture angle of an objective lens for making light converge. Therefore, to reduce the spot size of focused light so as to increase the recording density of an information medium, the NA value of the objective lens must be increased. However, the possibility of occurrence (occurrence possibility) of the coma described above is proportional to the third power of the NA value, and the occurrence possibility of the spherical aberration described above is proportional to the fourth power of the NA value. If, therefore, the NA value is increased to attain a higher density, a large coma/spherical aberration tends to occur with a slight change in the characteristics of the information medium (a change in the thickness of the transparent layer and/or a change in parallelism with respect to the objective lens).

To solve this problem, a thickness irregularity correction (spherical aberration correction) mechanism/control system for the protective layer (transparent substrate or transparent layer) of an information medium or a tilt correction (coma correction) mechanism/control system for an information medium is required.

As described above, demands have also arisen for stable track deviation detection by the differential push-pull (DPP) method and an improvement in the reliability of a playback signal by the crosstalk canceller (CTC) method.

As for an information medium, an existing DVD-ROM disk is standardized as a "single-sided dual-layer disk" with the aim of increasing the recording capacity in single-sided playback. According to this information medium, two reflecting layers are stacked on one surface of a substrate with a given spacing therebetween. In playing back this "single-sided dual-layer disk", the focusing position of playback light is moved in accordance with the upper and lower reflecting layer positions to selectively play back information from the two reflecting layers. The distance between the layers is standardized to a predetermined distance to reduce interlayer crosstalk in playback (a phenomenon in which while information is played back from one reflecting layer, light reflected by the other reflecting layer leaks into the photodetector; this interlayer crosstalk also degrades a playback signal).

Recently, a technique has been developed, which can increase the recording capacity of a recordable/playable information medium in recording/playback operation from a single surface by stacking two recording layers on the medium.

An optical information processing system using optical aberrations and an information medium having a recording layer protected by a transparent layer with thickness irregularity according to an embodiment of the present invention will be described below with reference to the views of the accompanying drawing.

In general, although ideal image formation can be attained near the central axis (optical axis) of a lens, ideal image formation cannot be attained from the viewpoint of the lens as a whole. Deviations from this ideal image formation are called aberrations. The aberrations (optical aberrations) include spherical aberration, coma, astigmatism, curvature of field, distortion, chromatic aberration, and the like. Of these aberrations, several embodiments of the present invention mainly use spherical aberration (wave aberration) and/or coma.

FIGS. 1A to 1D are views for explaining the spherical aberration of a convex lens, and a spherical aberration correction mechanism (in the absence of a transparent layer on the focusing surface) formed by a combination of concave and convex lenses.

If an ideal convex lens without any spherical aberration is used as a focusing optical system, light beams emerging from single point $\alpha$ are ideally focused by the stigmatic convex lens, and all the focused light beams gather at single focusing point $\beta$, as shown in FIG. 1A. Consider a case where such a stigmatic convex lens is formed by a convex lens having two kinds of curved surfaces, as shown in FIG. 1A.

Figure 1B:
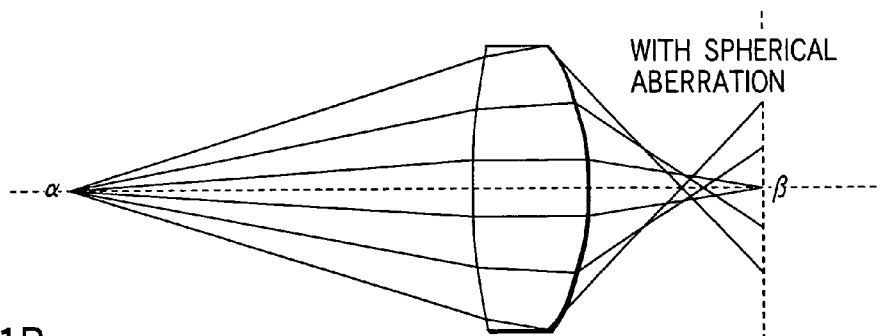

If the convex lens in FIG. 1A is reversed with respect to incident light from light source α, this lens stops functioning as a stigmatic lens. In this case, the angle of light emerging from a peripheral portion of the lens toward the focusing point is larger than that in FIG. 1A, and spherical aberration occurs in the convex lens, as shown in FIG. 1B. With such aberration, even if light beams passing through the center of the convex lens are focused at focusing point β, the focusing points of light beams passing through peripheral portions of the convex lens deviate from focusing point β toward the front (lens side). The degree of deviation of such a focusing point increases as light passing through the convex lens moves away the lens center (i.e., moves toward the lens periphery).

Assume that spherical aberration occurs in the convex lens as shown in FIG. 1B. In this case, even if light beams passing through the lens center are adjusted to be focused at target focusing point β, the focused spot size on the focusing surface including focusing point β is greatly increased by light beams from lens peripheral portions, whose focusing points deviate from the target point. In this case, a small focused spot cannot be obtained on the focusing surface, and the luminous intensity (luminance) of the focused spot per unit area decreases. From the viewpoint of the focusing surface position of light from the convex lens periphery, the focusing point of light from the lens center shifts, resulting in an increase in the focused spot size on the focusing surface position as well.

In the case shown in FIG. 1B, the position of the occurrence of spherical aberration of the convex lens (the position where the focusing point of light from the convex lens periphery deviates) is located closer to the lens than the focusing surface including focusing point β. Such position of the occurrence of spherical aberration can be changed by changing the state of light incident on the convex lens.

Figure 1C:
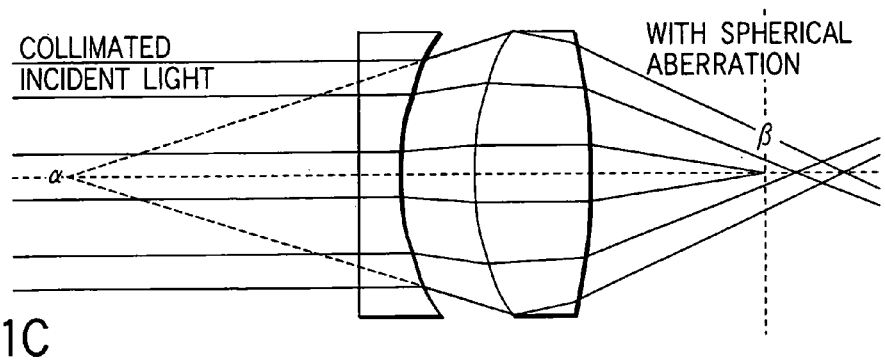

As shown in FIG. 1C, a concave lens is placed closer to the light source side than the convex lens, and collimated light is applied onto the concave lens. Divergent light then emerges from the concave lens toward the convex lens. When the optical system has such an arrangement, divergent light, which looks as if it emerged from point light source α, strikes the convex lens. In this case, even if the convex lens in FIG. 1C is a stigmatic lens like the one shown in FIG. 1A, when divergent light from the peripheral side of the concave lens to the peripheral side of the convex lens diverges more than in the state shown in FIG. 1A, the angle of light emerging from a peripheral portion of the convex lens toward a focusing point becomes smaller than in the case shown in FIG. 1A. As a consequence, spherical aberration is caused by the concave lens.

As shown in FIG. 1C, the position of the occurrence of spherical aberration of the concave lens (the position where the focusing point of light from the lens periphery deviates) is located farther from the convex lens side than the focusing surface. That is, with the concave lens, the spherical aberration of the concave lens occurs in the opposite direction to the spherical aberration of the convex lens. When such spherical aberration of the concave lens (if the spherical aberration of the convex lens also exists, the spherical aberration of the concave lens is stronger than that of the convex lens) occurs, even if light beams passing through the lens center are adjusted to be focused at focusing point β, the focused spot size on the focusing surface including focusing point β is greatly increased by light beams from the lens periphery which deviate from focusing point β. In this case, a small focused spot cannot be obtained on the focusing surface, and the luminous intensity (luminance) of the focused spot per unit area decreases.

As described above, if spherical aberration like the one shown in FIG. 1B or 1C occurs, a small focused spot cannot be obtained on a specific focusing surface no matter how focusing point β (in-focus point) is adjusted. As the focused spot size increases, the luminous intensity (luminance) of a focused spot per unit area decreases.

If the focused spot size cannot be reduced, information pits cannot be recorded at a high density. In addition, crosstalk between adjacent tracks, which are arranged at small intervals and include densely recorded information bit arrays, increases, resulting in difficulty in accurately reading pits. Furthermore, as the luminous intensity (luminance) of a focused spot per unit area decreases, a laser diode having higher power is required to write information bits in the information medium. Moreover, as the luminous intensity (luminance) of a focused spot per unit area decreases, the sensitivity of the photodetector used in information playback operation and the corresponding signal-to-noise ratio must be increased. Under the circumstances, the amount of spherical aberration caused in the optical system as a whole must be minimized (ideally to zero).

The position of the occurrence of spherical aberration of a concave lens (the focal point of light from the lens periphery deviating far from the focusing surface) like the one shown in FIG. 1C can be changed by changing the divergence of divergent light emerging from the concave lens and striking the convex lens.

Figure 1D:
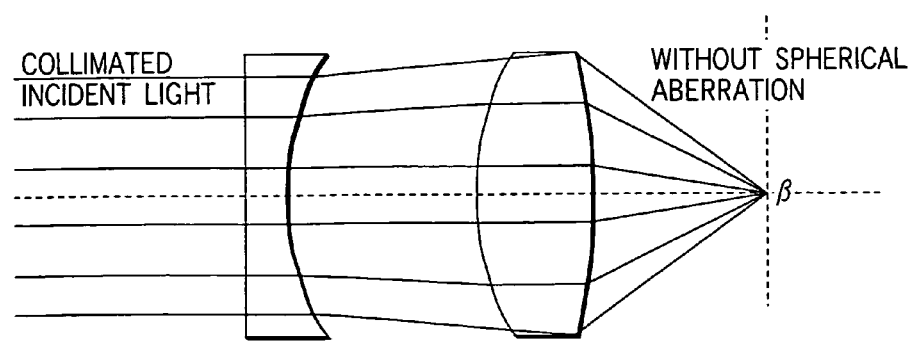

As shown in FIG. 1D, as the degree of divergence of divergent light incident on the convex lens is reduced by separating the concave lens from the convex lens, the angle of light emerging from a peripheral portion of the convex lens toward the focusing surface becomes larger than that in the case shown in FIG. 1C. The resultant state is equivalent to a state without aberration (FIG. 1A). As the degree of divergence of divergent light incident on the convex lens is reduced more by further separating the concave lens from the convex lens, the angle of light emerging from a peripheral portion of the convex lens toward the focusing surface becomes larger than that in the case shown in FIG. 1D. As a consequence, an aberration (spherical aberration of the convex lens) like the one shown in FIG. 1B occurs.

By combining the concave and convex lenses having spherical aberrations with opposite polarities as shown in FIGS. 1C and 1D and properly adjusting the distance between the concave and convex lenses, spherical aberration of the concave or convex lens can be arbitrarily caused. In addition, a stigmatic state like that shown in FIG. 1D can be produced, in which the spherical aberration of the concave lens cancels out the spherical aberration of the convex lens.

The following is clear from FIGS. 1A to 1D. Even if an optical aberration (mainly caused when the focusing point of light from the lens periphery deviates) occurs for some reasons between the focusing surface and the light source (more specifically, the focusing point and the optical system opposing the focusing point) can be canceled out (or suppressed or corrected) by adjusting the relative position of the concave lens which is combined with the convex lens to correct spherical aberration (or adjusting the divergence of divergent light applied onto the convex lens). A high-luminance focused spot whose size is minimized on the focusing surface can be obtained by adjusting the focus of the objective lens to the best focus (in-focus point) under the "stigmatic state" produced by this cancellation of the aberrations.

One of "some reasons" that cause an optical aberration is that a transparent layer having a refractive index different from that of air in which the optical system is placed exists between the focusing surface and the objective lens, and the thickness and/or refractive index n of the transparent layer vary (when the transparent layer has thickness irregularity and/or refractive index irregularity).

Figure 2A:
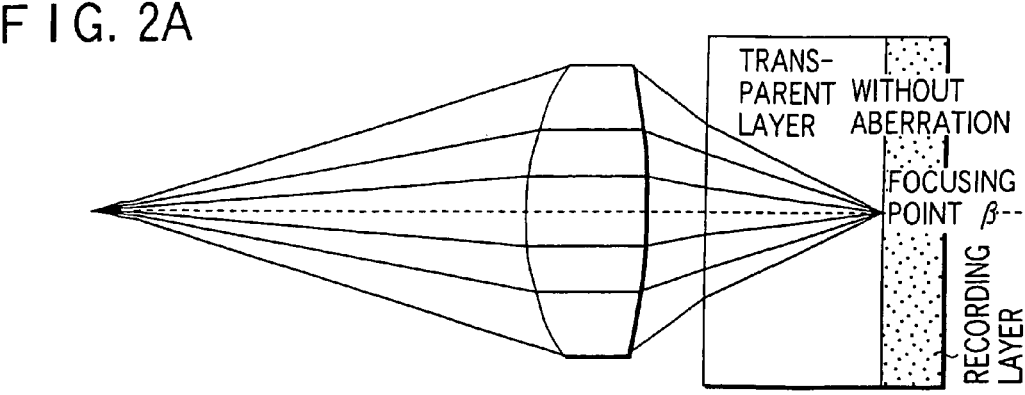
FIGS. 2A to 2C are views for explaining a mechanism of the occurrence of spherical aberration due to the thickness irregularity (and/or refractive index irregularity) of a transparent layer formed on the recording layer of an information medium (optical disk)
Figure 2B:
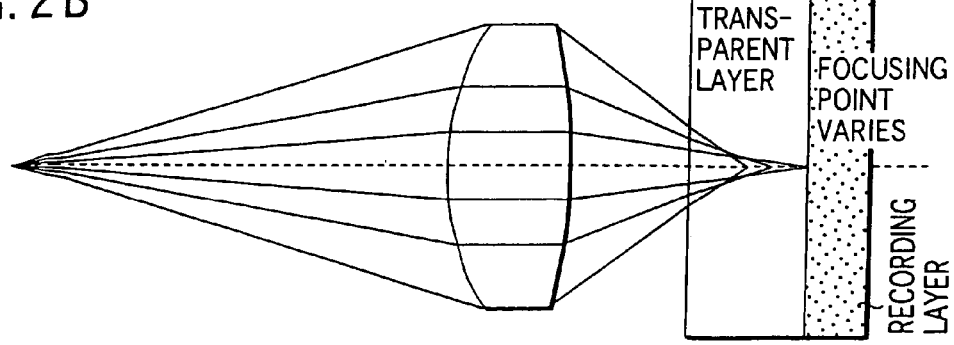
Figure 2C:
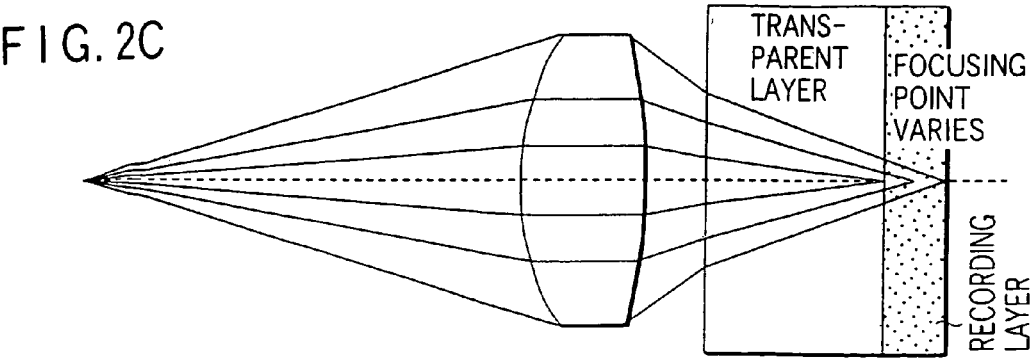

FIGS. 2A to 2C are views for explaining a mechanism for the occurrence of an optical aberration (spherical aberration) due to the thickness irregularity (and/or refractive index irregularity) of the transparent layer formed on the recording layer of the information medium (optical disk).

In the case shown in FIGS. 2A to 2C, a transparent layer having a predetermined reference thickness (e.g., 0.1 mm) which is made of a material having a refractive index n different from that of air (refractive index: 1) is formed on the surface of the recording layer corresponding to a focusing surface. Light from the light source is focused on the recording layer by the convex lens (objective lens) through this transparent layer.

FIG. 2A shows an example of how all light beams from the light source are focused at focusing point β on the surface of the recording layer, i.e., the best focus (in-focus point), without any aberration when the transparent layer has no thickness irregularity or refractive index irregularity.

If only the thickness of the transparent layer varies in the direction in which it becomes smaller than a reference thickness (e.g., 0.1 mm) in the state shown in FIG. 2A, an aberration occurs, in which the focusing points vary toward the objective lens side (similar to the spherical aberration of the convex lens in FIG. 1B), as shown in FIG. 2B. If only the refractive index of the transparent layer varies in the direction in which it becomes lower than a reference level (e.g., 1.62) in the state shown in FIG. 2A, an aberration like that shown in FIG. 2B also occurs.

In contrast to this, if only the thickness of the transparent layer varies in the direction in which it becomes larger than the reference thickness (0.1 mm) in the state shown in FIG. 2A, an aberration occurs, in which the focusing points vary toward the interior of the recording layer, as shown in FIG. 2C. If only the refractive index of the transparent layer varies in the direction in which it becomes higher than the reference level (1.62) in the state shown in FIG. 2A, an aberration like that shown in FIG. 2C occurs.

As is obvious from comparisons between FIGS. 2A and 1A, FIGS. 2B and 1B, and FIGS. 2C and 1C, if there is a factor that causes an optical aberration (spherical aberration) (the thickness irregularity and/or refractive index irregularity of the transparent layer or the like) between the objective lens and the focusing surface (recording layer), the resultant state amounts to a state where spherical aberration (of the convex or concave lens) is caused in the optical system including the objective lens. This indicates that the influence of spherical aberration due to the thickness irregularity and/or refractive index irregularity of the transparent layer can be eliminated by the same method as described with reference to FIGS. 1C and 1D (the method of properly adjusting the relative distance between the concave lens and the convex lens).

If the thickness of the transparent layer varies in the direction in which it becomes smaller than the reference thickness as shown in FIG. 2B (or the refractive index of the transparent layer varies in the direction in which it becomes lower than the reference level), and an aberration similar to spherical aberration of the convex lens like that shown in FIG. 1B occurs, the concave lens is brought near to the convex lens on the optical system side to increase the divergence of divergent light incident on the convex lens periphery (i.e., cause the spherical aberration of the concave lens), as shown in FIG. 1C. This makes it possible to cancel out the aberration (variations in focusing points toward the lens side) like that shown in FIG. 2B and correct this state into a stigmatic state like that shown in FIG. 2A.

In contrast to this, if the thickness of the transparent layer varies in the direction in which it becomes larger than the reference thickness (or the refractive index of the transparent layer varies in the direction in which it becomes higher than the reference level) as shown in FIG. 2C, and an aberration similar to the spherical aberration of the concave lens like that shown in FIG. 1C occurs, the concave lens is moved away from the convex lens on the optical system side to reduce the divergence of divergent light incident on the convex lens periphery (i.e., cause the spherical aberration of the convex lens). This makes it possible to cancel out the aberration (variations in the focusing points into the recording layer) like that shown in FIG. 2C and correct this state into a stigmatic state like that shown in FIG. 2A.

Assume that the focus of the convex lens (objective lens) is fixed (i.e., no defocusing adjustment is performed), and spherical aberration is corrected by adjusting the relative distance between the concave lens and the convex lens (i.e., changing the divergence of divergent light incident on the convex lens). In this case, the in-focus point of the convex lens (objective lens) relative to the focusing surface (the surface of the recording layer) also changes to cause defocusing. The aberration correction optical system, including measures against such defocusing, will be further described below.

Figure 3A:
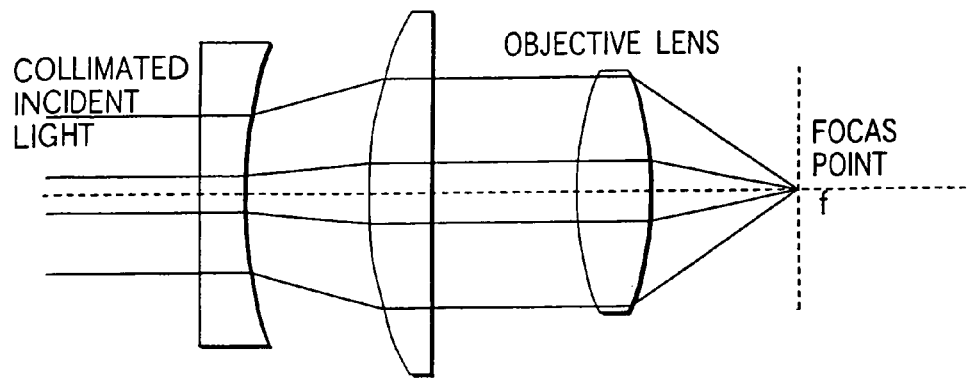
FIGS. 3A to 3C are views for explaining how the state of occurrence of spherical aberration can be adjusted according to the relative positional relationship between a thickness irregularity correction concave lens, thickness irregularity correction convex, and objective lens.
Figure 3B:
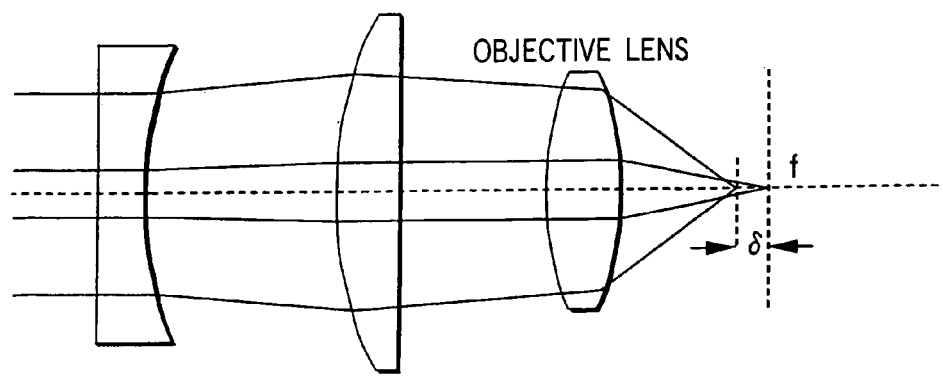
Figure 3C:
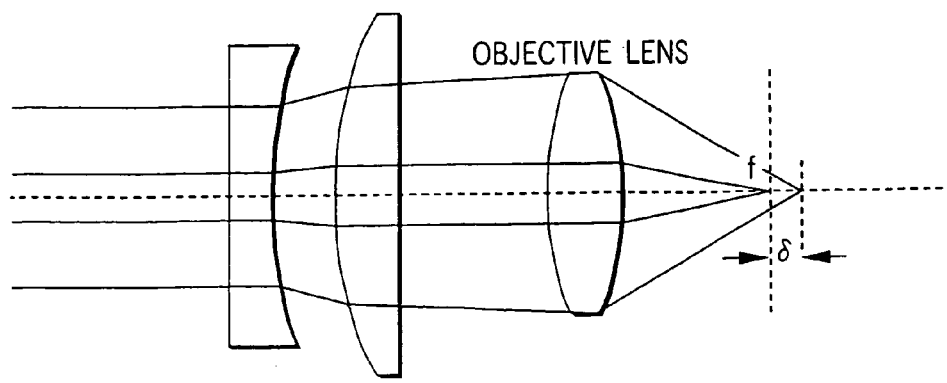

FIGS. 3A to 3C are views for explaining how the occurrence of an optical aberration (spherical aberration) can be adjusted according to the relative positional relationship between a thickness irregularity correction concave lens, a thickness irregularity correction convex lens, and an objective lens (in this case, an illustration of the transparent layer in FIGS. 2A to 2C is omitted).

FIG. 3A shows an example of how collimated light is converted into divergent light by the concave lens, the divergent light is focused by the convex lens, the focused light (parallel light) is incident on the entire pupil of the objective lens, and the entire light incident on the objective lens is focused to focal point f on the focusing surface (recording layer) (without spherical aberration). According to this illustration, an "in-focus state (without defocusing) having no aberration" is assumed, in which the transparent layer has no thickness irregularity (and/or refractive index irregularity) like that shown in FIGS. 2A to 2C, and all light beams concentrate on focal point f on the focusing surface when the light beams incident on the objective lens are parallel. In this state, the aberration correction amount is zero.

FIG. 3A shows a case where in the optical system including the transparent layer (not shown), when light incident on the objective lens is parallel, the light is focused at focal point f. In the optical system which is adjusted such that when light incident on the objective lens is parallel, the light is focused at focal point f, when light incident on the objective lens is not parallel, the in-focus point of this optical system deviates from in-focus position f in the case of parallel incident light. The manner in which the occurrence of an optical aberration (spherical aberration) is adjusted will be described below, in consideration of such a deviation (δ).

Assume that the thickness of the transparent layer varies in the direction it becomes larger than the reference thickness as shown in FIG. 2C. In this case, an aberration occurs on the rear side with respect to the focusing surface including focal point f (in the direction to separate from the objective lens). The occurrence of such an aberration can be suppressed by a method like that shown in FIG. 3B. As shown in FIG. 3B, parallel light incident on the periphery of the right concave lens is changed toward focused light by changing the relative positional relationship between the left concave lens and the middle concave lens. As a consequence, the light beams from the objective lens periphery are focused before the focusing surface (toward the objective lens). With this operation, the occurrence of the aberration like that shown in FIG. 2C (the state where light beams from the objective lens periphery are focused on the rear side with respect to the focusing surface) is canceled out by the thickness correction operation of the optical system like that shown in FIG. 3B (changing light incident on the objective lens periphery toward focused light).

This state amounts to an aberration correction amount required to correct spherical aberration caused when the thickness of the transparent layer varies in the direction in which it increases. FIG. 3B schematically shows an example of how the substantial in-focus point of the optical system deviates from focal point f in the case of no aberration correction amount toward the objective lens by distance δ in accordance with this aberration correction amount (the change of light incident on the objective lens periphery toward focused light).

Assume that the thickness of the transparent layer varies in the direction in which it becomes smaller than the reference thickness as shown in FIG. 2B. In this case, the influence of an aberration is produced before the focusing surface (toward the objective lens). In this case, the focal position of light from the objective lens periphery is located before the focal position of light from the objective lens center. The influence of this aberration can be suppressed by a method like that shown in FIG. 3C. As shown in FIG. 3C, parallel light incident on the periphery of the right concave lens is changed toward divergent light by changing the relative positional relationship between the left concave lens and the middle concave lens. As a consequence, light beams from the objective lens periphery are focused on the rear side with respect to the focusing surface (away from the object lens). With this operation, the influence of an aberration (in which light beams from the objective lens periphery are focused before the focusing surface) like that shown in FIG. 2B is canceled out by the thickness correction operation of the optical system (changing light incident on the objective lens periphery toward divergent light) like that shown in FIG. 3C.

This state amounts to an aberration correction amount required to correct spherical aberration caused when the thickness of the transparent layer varies in the direction in which it decreases. FIG. 3C schematically shows an example of how the substantial in-focus point of the optical system deviates from focal point f in the case of no aberration correction amount in the direction to separate from the objective lens by distance δ in accordance with this aberration correction amount (the change of light incident on the objective lens periphery toward divergent light).

The following is clear from FIGS. 3A to 3C. The transparent layer thickness irregularity correction optical system constituted by a plurality of lenses, described with reference to FIGS. 3A to 3C, can be regarded as an optical system unit (its contents are regarded as a black box) having the function of arbitrarily controlling spherical aberration. If, however, spherical aberration due to transparent layer thickness irregularity like that shown in each of FIGS. 2B and 2C is corrected by an optical system unit like the one shown in FIGS. 3A to 3C, focal point f of the optical system unit deviates.

Under the circumstances, it is required to correct the deviation of focal point f of the optical system as well as spherical aberration caused by the thickness irregularity of the transparent layer. To meet this requirement, the occurrence of spherical aberration and the occurrence of a focal point deviation must be detected by different methods. These methods will be described in detail later with reference to FIGS. 6 to 8C. A problem in the optical system in FIGS. 3A to 3C (detection of spherical aberration and detection of a focal point deviation influence each other) will be described first.

Figure 4A:
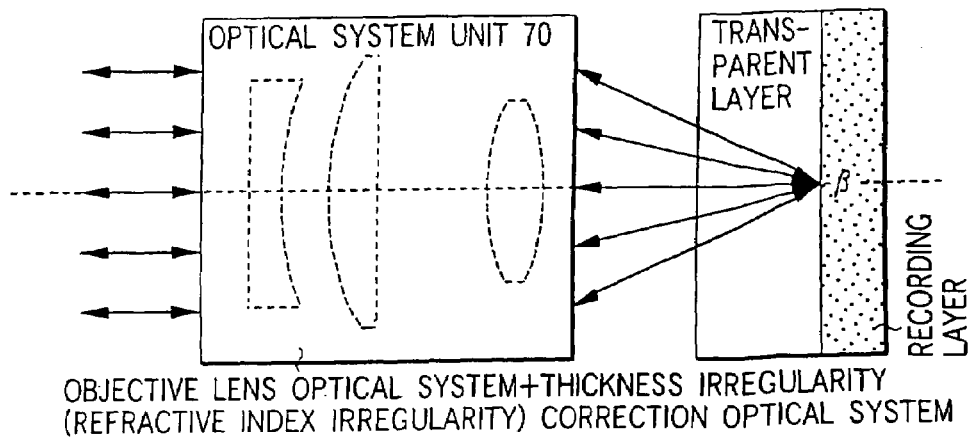
FIGS. 4A to 4C are views for explaining how light which has passed through optical system unit 70, formed as one optical system unit by integrating the thickness irregularity correction concave lens, thickness irregularity correction convex lens, and objective lens into a black box, and is reflected by a recording surface behaves when spherical aberration is caused by the thickness irregularity of a transparent layer formed on the recording layer.
Figure 4B:
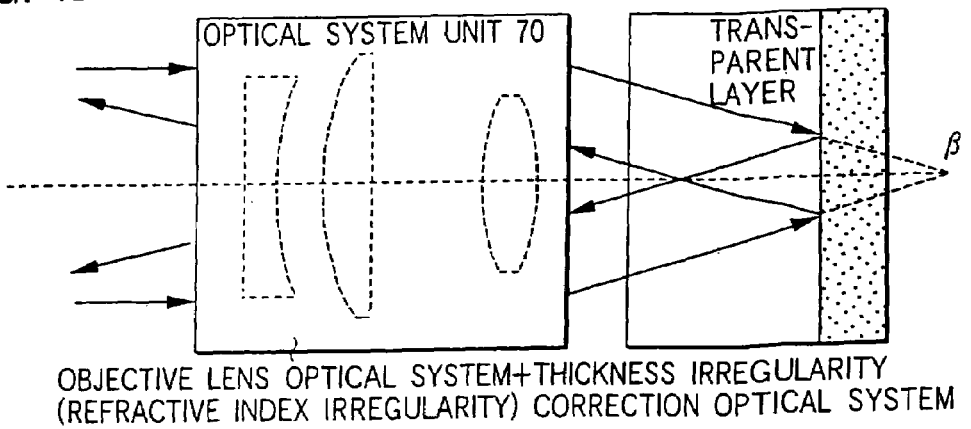
Figure 4C:
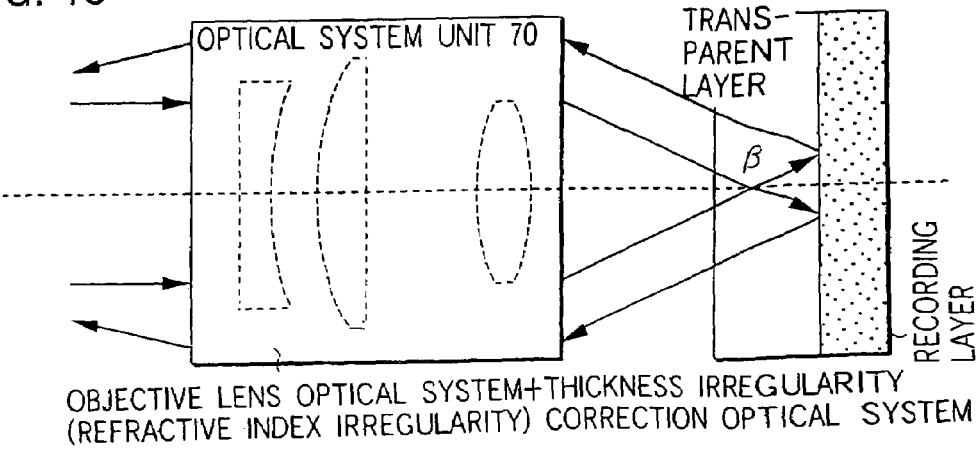

FIGS. 4A to 4C show an example of how light beams reflected by the recording surface and having passed through optical system unit 70 behave when spherical aberration (or a focus deviation) is caused by the thickness irregularity of the transparent layer formed on the recording layer in a case where the thickness irregularity correction concave lens, thickness irregularity correction convex lens, and objective lens shown in FIGS. 3A to 3C are integrated into a black box serving as optical system unit 70. In the arrangement shown in FIGS. 4A to 4C, a light source and defocusing detection optical system (photodetector) (neither is shown) are placed on the opposite side of thickness irregularity correction optical system unit 70 to the information medium (optical disk whose recording layer is protected by a transparent layer).

As shown in FIGS. 3A to 3C, when the distance between the thickness irregularity convex lens and concave lens is changed, the state of light incident on the objective lens changes to divergent light/parallel light/focused light. As the state of light incident on the objective lens changes to divergent light/parallel light/focused light in this manner, the distance from focusing position β, at which light is focused by the objective lens in optical system unit 70 in FIGS. 4A to 4C, and the objective lens changes in accordance with the distance between the thickness irregularity correction convex lens and concave lens. For this reason, when thickness irregularity correction (spherical aberration correction) is performed, focusing position β also changes. This tends to influence focusing servo. A description will be given further with reference to FIGS. 4A to 4C in consideration of this point.

FIG. 4A shows an example of the relationship between input light to and output light from optical system unit 70 in an in-focus state when the medium transparent layer has no thickness irregularity and refractive index irregularity. When parallel light is incident from the light source (not shown) onto optical system unit 70 in FIG. 4A, all light beams from optical system unit 70 are focused at focusing point β on the optical axis. The light reflected at focusing point β is collimated by optical system unit 70 and output to the photodetector (not shown) (e.g., photodetector 90A in FIG. 6 (to be described later)).

FIG. 4B shows an example of the relationship between input light to and output light from optical system unit 70 when an aberration (or a focus deviation) is caused by thickness irregularity (and/or refractive index irregularity in the increasing direction) caused in the medium transparent layer in the increasing direction. When parallel light is incident from the light source (not shown) onto optical system unit 70 in FIG. 4B, light from the objective lens periphery in optical system unit 70 propagates toward focusing point β whose position has deviated to the rear side due to the influence of the aberration (or focus deviation). Since focusing point β is located on the rear side with respect to the recording layer, light from the objective lens periphery in optical system unit 70 is reflected by the surface of the recording layer which is shifted from the optical axis before it reaches focusing point β. The light reflected by the surface of the recording layer and shifted from the optical axis becomes divergent light through optical system unit 70 and is output to the photodetector (not shown).

FIG. 4C shows an example of the relationship between input light to and output light from optical system unit 70 when an aberration (or focus deviation) is caused by thickness irregularity (and/or refractive index irregularity in the decreasing direction) caused in the medium transparent layer in the decreasing direction. When parallel light is incident from the light source (not shown) onto optical system unit 70 in FIG. 4C, light from the objective lens periphery in optical system unit 70 propagates toward focusing point β whose position has deviated to the front side due to the influence of the aberration (or focus deviation). Since focusing point β is located on the front side with respect to the recording layer, light from the objective lens periphery in optical system unit 70 is reflected by the surface of the recording layer which is shifted from the optical axis after it passes through focusing point β. The light reflected by the surface of the recording layer and shifted from the optical axis becomes focused light through optical system unit 70 and is output to the photodetector (not shown).

The following is clear from FIGS. 4A to 4C. When the transparent layer has no thickness irregularity (or focus deviation), parallel reflected light like that shown in FIG. 4A is output from optical system unit 70. If, however, the transparent layer has thickness irregularity in the increasing direction (or a focus deviation occurs toward the rear side of the recording layer), reflected light in the divergence direction is output from optical system unit 70, as shown in FIG. 4B. If the transparent layer has thickness irregularity in the decreasing direction (or a focus deviation occurs toward the lens side), reflected light in the convergence direction is output from optical system unit 70, as shown in FIG. 4C.

Obviously, two types of states of occurrence of spherical aberration (the state of occurrence of spherical aberration in the direction in which the transparent layer becomes thick and the state of occurrence of spherical aberration in the direction in which the transparent layer becomes thin) can be separately detected by separately detecting the divergence and convergence states of reflected light output from optical system unit 70. In contrast to this, two types of focus deviation states (defocusing in the direction in which the focal point deviates to the rear side of the recording layer and defocusing in the direction in which the focal point deviates to the lens side) can be separately detected from the divergence and convergence states of reflected light output from optical system unit 70. In this case, however, the state of occurrence of spherical aberration and focus deviation state are detected on the same principle (the principle based on detection of the divergence and convergence states of reflected light output from optical system unit 70), a servo system (thickness servo system to be described later) for thickness irregularity correction (spherical aberration correction) and focusing servo system mutually influence.

In optical system unit 70 in FIG. 4, which has a lens structure like the one shown in FIGS. 3A to 3C, when thickness irregularity correction (spherical aberration correction) is performed, focusing position β also changes. That is, this structure tends to influence focusing servo. To prevent this influence, the thickness servo system for performing thickness irregularity correction (spherical aberration correction) and focusing servo system must be devised to servo operations independently. A specific example of implementing this will be described later with reference to FIG. 6 and subsequent drawings.

Figure 5A:
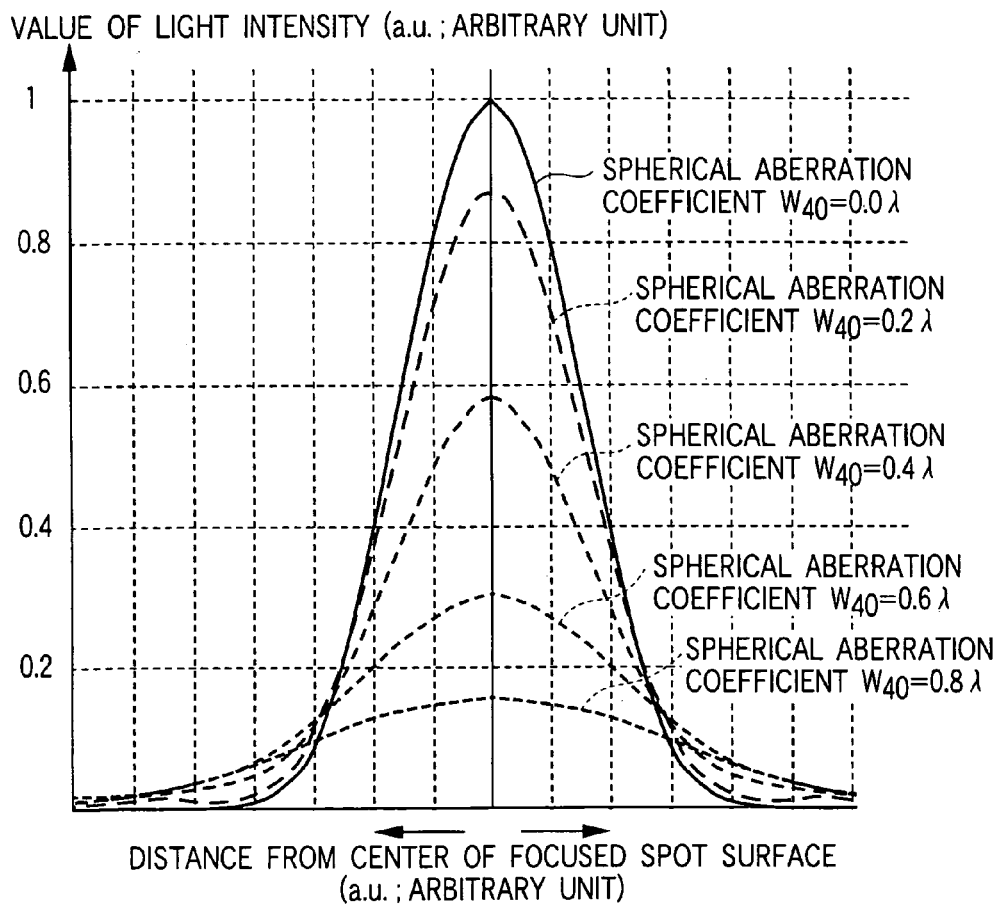
FIGS. 5A and 5B are views for explaining how the intensity distribution of a focused spot formed on a recording surface changes due to spherical aberration when only the spherical aberration is given to the light without any defocusing correction (in-focus/just focus is fixed at an objective lens center in the absence of aberration), and showing how the shape (size/width) of a focused spot changes in accordance with each spherical aberration.
Figure 5B:
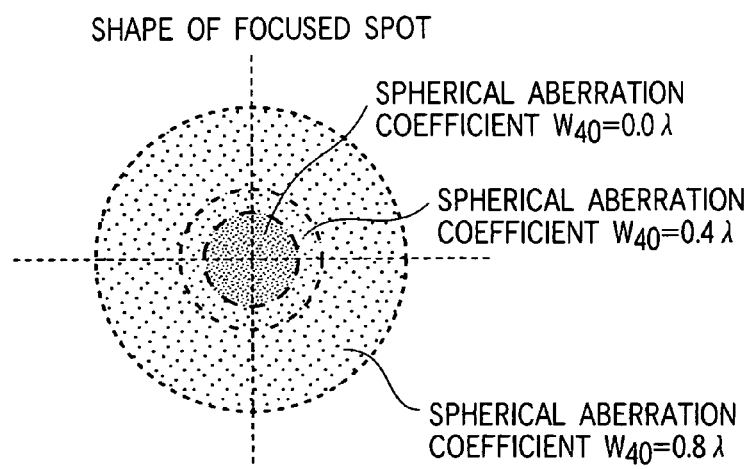

FIGS. 5A and 5B explain how the intensity distribution of a focused spot formed on the recording surface (reflecting surface) changes in accordance with spherical aberration when the spherical aberration is provided without defocusing correction (in-focus/just focus is fixed at the objective lens center in the absence of aberration) and show an example of how the shape (size/width) of a focused spot changes in accordance with each spherical aberration. Since FIGS. 5A and 5B are views schematically showing an example of how the intensity distribution of a focused spot changes in accordance with the amount of spherical aberration, arbitrary units (a.u) are set along the ordinate and abscissa. The amount of spherical aberration is expressed by a spherical aberration coefficient $W_{40}$ using a wavelength λ of light in use.

As shown in FIG. 5A, the light intensity at the focused spot center is maximized with spherical aberration coefficient $W_{40}=0.0$ λ in the absence of aberration. The light intensity at the focused spot center decreases ($W_{40}=0.2$ λ→0.4 λ→0.6 λ→0.8 λ) as the spherical aberration increases.

As the spherical aberration increases ($W_{40}$ 0.0 λ→→0.4 λ→→0.8 λ), the divergence of the focused spot (the width of a halfway or bottom portion of a unimodal curve of light intensity in FIG. 5A; the diameter of the focused spot in FIG. 5B) increases. Since the divergence of this focused spot originates from a cause (aberration) different from defocusing that is another cause for the divergence of the focused spot, the divergence of the focused spot cannot be prevented or suppressed by only focus adjustment of the objective lens. The divergence of the focused spot due to defocusing, by contrast, cannot be prevented or suppressed by only aberration correction.

FIGS. 5A and 5B indicate that the state of occurrence of spherical aberration can be detected, while the focal point of a focused spot is fixed, from information (signal) associated with the light intensity of the focused spot (the peak intensity of the unimodal curve) and/or the divergence of the focused spot (or the widths of the halfway or bottom portion of the unimodal curve), which in turn indicates that the state of occurrence of spherical aberration can be detected separately from a defocusing state. In other words, if focus adjustment functions without discriminating the divergence of a focused spot due to spherical aberration from the divergence of the focused spot due to defocusing, the state of occurrence of spherical aberration may not be properly detected.

To always obtain a focused spot stably focused to a small size on a target recording surface (reflecting surface) even at the occurrence of an aberration that irregularly varies, focus adjustment and aberration correction must be performed independently and cooperatively (or concurrently). That is, in order to perform spherical aberration correction upon detecting the state of occurrence of spherical aberration while performing defocusing correction (operating the focusing servo), the spherical aberration detection system (the thickness servo system and the like) must be operated independently of the focusing servo system.

Figure 6:
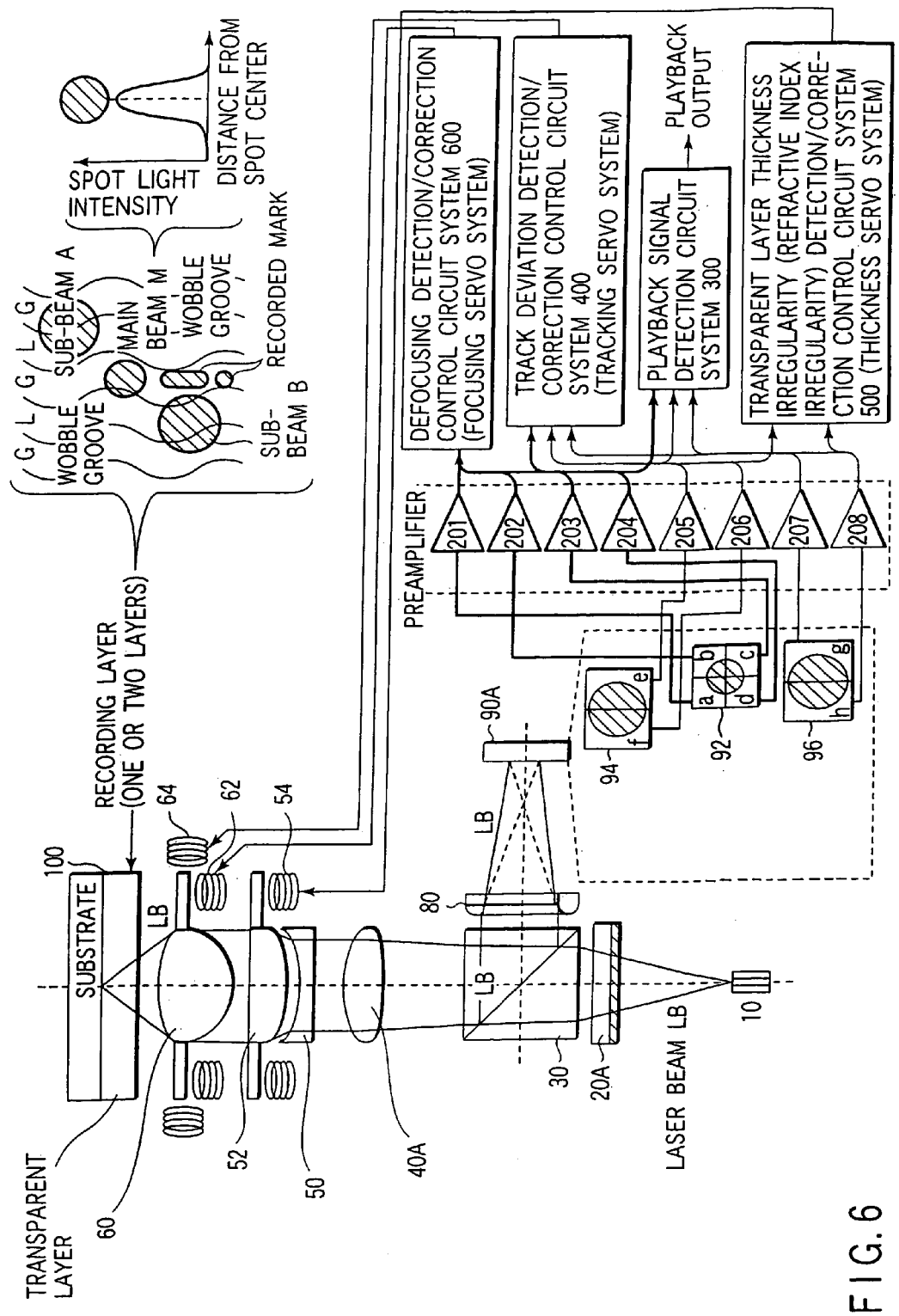
FIG. 6 is a view for explaining the arrangement of an apparatus (the main part of an optical disk drive or recording/playback apparatus) including a means (thickness servo system) for suppressing the influence of spherical aberration caused by the thickness irregularity (and/or refractive index irregularity) of the transparent layer of an information medium, a means (focusing servo system) for minimizing defocusing on the recording surface of the information medium.

FIG. 6 is a view for explaining the arrangement of an apparatus (the main part of an optical disk drive or recording/playback apparatus) including a means (thickness servo system) for suppressing the influence of spherical aberration due to the thickness irregularity (and/or refractive index irregularity) of the transparent layer of an information medium, a means (focusing servo system) for minimizing defocusing on the recording surface of the information medium, and the like. The thickness servo system in this arrangement can be implemented by using the principle of spherical aberration detection described with reference to FIGS. 1A to 5B. The thickness servo system in the arrangement forms a servo loop independent of the focusing servo system. A significant feature of this embodiment is that the servo loop of the thickness servo system is formed independently of the servo loop of the focusing servo system in this manner.

Referring to FIG. 6, laser beam LB (e.g., a blue laser with wavelength $\lambda$=405 nm) from laser source 10 strikes hologram element 20A having a spherical aberration generating hologram formed on its one surface. Laser beam LB is wavefront-split into light beams propagating in three directions (a 0th-order light beam corresponding to main beam M, a +1st-order light beam corresponding to sub-beam A, and a −1st-order light beam corresponding to sub-beam B) by spherical aberration generating hologram element 20A.

Laser beam LB passing through hologram element 20A (including the 0th-, +1st-, and −1st-order light beams propagating in the three directions) is sent to collimator lens 40A through beam splitter 30. Collimator lens 40A collimates laser beam LB from laser source 10 and sends it to thickness irregularity correction concave lens 50. Laser beam LB passing through thickness irregularity correction concave lens 50 is sent to objective lens 60 through thickness irregularity correction convex lens 52. The focused light focused by objective lens 60 is focused on the surface of the recording layer of information medium (playback-only or recording/playback optical disk) 100 through its transparent protective layer.

In this case, numerical aperture NA of objective lens 60 is selected from the range of, e.g., 0.6 to 0.9, and more specifically, from the range of 0.65 to 0.85. For example, objective lens 60 with NA=0.85 is used in this case (when the thickness reference value for the transparent layer of the information medium is 0.1 mm).

Thickness irregularity correction concave lens 50, thickness irregularity correction convex lens 52, and objective lens 60 correspond to the lens group shown in FIGS. 3A to 3C, and can be regarded as components constituting an optical system unit similar to optical system unit 70 described with reference to FIGS. 4A to 4C.

In this optical system unit, thickness irregularity correction convex lens driving coil (and/or thickness irregularity correction concave lens driving coil (not shown)) 54 is provided for the lens group of thickness irregularity correction concave lens 50 and thickness irregularity correction convex lens 52, and defocusing correction driving coil 62 and tracking deviation correction driving coil 64 are provided for objective lens 60. These correction driving coils 54, 62, and 64 constitute part of an actuator (voice coil motor) coupled to a corresponding lens mechanism.

By controlling the direction and amount of current supplied to thickness irregularity correction convex lens driving coil 54, therefore, the distance between thickness irregularity correction concave lens 50 and thickness irregularity correction convex lens 52 (or the positions of lenses 50 and 52 relative to objective lens 60) can be arbitrarily changed. In addition, the distance between objective lens 60 and information medium 100 (or the distance between the recording layer of the information medium and the optical system unit formed by integrating lenses 50, 52, and 60) can be arbitrarily changed by controlling the direction and amount of current supplied to defocusing correction driving coil 62 (this operation is used for focusing servo control). Furthermore, the relative positional relationship between the optical axis (focusing point) of objective lens 60 and a track position on the surface of the recording layer of information medium 100 can be arbitrarily changed by controlling the direction and amount of current supplied to tracking deviation correction driving coil 64 (this operation is used for tracking servo control).

The reflected light beams of the three focused spots (the focused spots of main beam M, sub-beam A, and sub-beam B) focused on the surface of the recording layer of information medium 100 are returned to beam splitter 30 through objective lens 60, thickness irregularity correction lens group (50, 52), and collimator lens 40A. Reflected laser beam LB of the three focused spots returned to beam splitter 30 strikes photodetector 90A through cylindrical lens 80 that causes astigmatism. Reflected laser beam LB is split into three beams on photodetector 90A. These beams are then applied onto main beam M detection four-division cell 92, sub-beam A detection two-division cell 94, and sub-beam B detection two-division cell 96, respectively.

In this embodiment, the three cells (main beam M detection four-division cell 92, sub-beam A detection two-division cell 94, and sub-beam B detection two-division cell 96) constituting photodetector 90A are tilted in accordance with three oblique focused spots focused on the surface of the recording layer of information medium 100.

Photodetection outputs from cells a to d constituting main beam M detection four-division cell 92 are sent to playback signal detection circuit system 300, track deviation detection/correction control circuit system (tracking servo system) 400, and defocusing detection/correction control circuit system (focusing servo system) 600 through preamplifiers 201 to 204. Photodetection outputs from cells e and f constituting sub-beam A detection two-division cell 94 are sent to playback signal detection circuit system 300, track deviation detection/correction control circuit system (tracking servo system) 400, and transparent layer thickness irregularity (and/or refractive index irregularity) detection/correction control system (thickness servo system) 500 for information medium 100 through preamplifiers 205 and 206. Photodetection outputs from cells g and h constituting sub-beam B detection two-division cell 96 are sent to playback signal detection circuit system 300, track deviation detection/correction control circuit system (tracking servo system) 400, and transparent layer thickness irregularity (refractive index irregularity) detection/correction control system (thickness servo system) 500 through preamplifiers 207 and 208.

Playback signal detection circuit system 300 is configured to provide a playback output corresponding to the contents of a recorded mark on information medium 100 mainly on the basis of photodetection outputs from cells a to d constituting main beam M detection four-division cell 92.

Track deviation detection/correction control circuit system (tracking servo system) 400 is configured to drive tracking deviation correction driving coil 64 on the basis of photodetection outputs from cells a to d constituting main beam M detection four-division cell 92, photodetection outputs from cells e and f constituting sub-beam A detection two-division cell 94, and photodetection outputs from cells g and h constituting sub-beam B detection two-division cell 96, thereby allowing main beam M to accurately trace on a recording track (groove track G or land track L) of information medium 100.

Defocusing detection/correction control circuit system (focusing servo system) 600 is configured to drive defocusing correction driving coil 62 on the basis of photodetection outputs from cells a to d constituting main beam M detection four-division cell 92, thereby always brining main beam M to the best focus on the surface of the recording layer of information medium 100, i.e., setting main beam M in a just focus (in-focus) state on a recording tack of information medium 100.

Transparent layer thickness irregularity (refractive index irregularity) detection/correction control circuit system (thickness servo system) 500 is configured to drives thickness irregularity correction convex lens driving coil (and/or thickness irregularity correction concave lens driving coil) 54 on the basis of photodetection outputs from cells e, f, g, and h constituting sub-beam A detection two-division cell 94 and sub-beam B detection two-division cell 96, thereby suppressing or eliminating a phenomenon in which the focused spot size of main beam M increases even if main beam M is controlled by focusing servo system 600 to come into the best focus (due to the influence of spherical aberration originating from medium transparent layer thickness irregularity and/or refractive index irregularity).

If main beam M fells out of focus as a result of transparent layer thickness irregularity correction by the operation of thickness servo system 500, the focus deviation (defocusing) is automatically corrected by the servo operation of focusing servo system 600 having a servo loop independent of thickness servo system 500.

The 0th-order light beam (the light propagating straight without being diffracted by spherical aberration generating hologram element 20A) passing through hologram element 20A in FIG. 6 is focused on the recording surface (reflecting or recording layer) of information medium 100 through the lens group (lenses 50, 52, and 60) of the optical system unit to become main beam M having a small focused spot (e.g., the focused spot represented by $W_{40}=0.0\ \lambda$ in FIG. 5B) to which no aberration is given by hologram element 20A. (Note that the focused spot of main beam M is influenced by aberrations due to the thickness irregularity of the transparent layer of information medium 100 and the like even though no aberration is given by hologram element 20A).

The +1st-order light beam diffracted by spherical aberration generating hologram element 20A is focused on the recording surface of information medium 100 to form sub-beam A. This sub-beam A forms a focused spot with large spherical aberration (e.g., the focused spot represented by $W_{40}=0.4\ \lambda$ in FIG. 5B) owing to the influence of the aberration given by spherical aberration generating hologram element 20A. The −1st-order light beam diffracted by spherical aberration generating hologram element 20A is focused on the recording surface of information medium 100 to form sub-beam B. This sub-beam B forms a focused spot with large spherical aberration (e.g., the focused spot represented by $W_{40}=0.4\ \lambda$ in FIG. 5B) owing to the influence of the aberration given by spherical aberration generating hologram element 20A.

In this case, spherical aberration generating hologram element 20A gives sub-beams A and B, separately in advance, spherical aberration by which a light beam is focused to a position farther from objective lens 60 than the focal point of main beam M (the surface of the recording layer of the information medium) and spherical aberration by which a light beam is focused to a position closer to objective lens 60 than the focal point. That is, −1st-order sub-beam B and +1st-order sub-beam A respectively form focused spots having spherical aberrations with opposite polarities.

Assume that spherical aberrations with opposite polarities are given to sub-beams A and B in advance, and spherical aberration (influencing main beam M, sub-beam A, and sub-beam B all) is caused by the thickness irregularity of the transparent layer of the information medium. In this case, even at a position where main beam M is in focus, the focused spot size of one sub-beam decreases because spherical aberrations cancel out each other, and the focused spot size of the other sub-beam increases because spherical aberrations are added together (see FIGS. 8A and 8C to be described later).

With a decrease in focused spot size, the amplitude of a detection signal from a wobble groove of a recording track increases, and the amplitude of a playback signal from a recorded mark or embossed pit in the form of a recess/projection also increases. That is, there is a correspondence between the magnitude of the size of a focused spot and the magnitude of the amplitude of a detection signal from a wobble groove and/or the magnitude of the amplitude of a playback signal from a recorded mark or embossed pit. Therefore, whether the spot size of sub-beam A is smaller (or larger) than that of sub-beam B on the medium recording surface can be detected by comparing the magnitudes of the amplitudes of detection signals from wobble grooves and/or the magnitudes of the amplitudes of playback signals from recorded marks or embossed pits. This makes it possible to detect the direction of occurrence of an aberration (whether the aberration occurs on the front side near the objective lens as shown in FIG. 2B or on the rear side away from the objective lens as shown in FIG. 2C).

As described above, even if spherical aberration is caused by the thickness irregularity of the medium transparent layer and/or the refractive index irregularity, the influence of the spherical aberration on main beam M (the divergence of the focused spot size of main beam M due to the thickness irregularity of the medium transparent layer and/or the refractive index irregularity regardless of whether the beam is in focus) can be minimized or eliminated by the servo operation of the servo system (thickness servo system) for equalizing the spot sizes of sub-beams A and B as long as the aberration of main beam M is adjusted to zero or a minimum value at the point where the spot sizes of sub-beams A and B become equal to each other on the recording surface of the medium.

With regards to sub-beams A and B, the amount of spherical aberration caused can be detected from the magnitudes of the amplitudes of detection signals from wobble grooves and/or the magnitudes of the amplitudes of playback signals from recorded marks or embossed pits. That is, with regards to sub-beams A and B, the state of occurrence of spherical aberration caused by the transparent layer of the information medium can be detected from the relationship between the magnitudes of the amplitudes of detection signals from wobble grooves and/or the magnitudes of the amplitudes of playback signals from recorded marks or embossed pits.

In brief, since sub-beams A and B exhibit opposite polarities in terms of spherical aberration, and the focused spot sizes of sub-beams A and B change in accordance with the amounts of spherical aberrations caused, the state of occurrence of an aberration (the magnitudes of the thickness irregularity of the medium transparent layer and/or the refractive index irregularity and the increasing/decreasing direction thereof) can be detected from detection results on sub-beams A and B.

Since laser beam LB incident on hologram element 20A is not parallel light, sub-beams A and B on the two sides of main beam M are oblique with respect to the array direction of tracks (groove tracks G and land tracks L) of information medium 100, as shown in FIG. 6. With oblique sub-beams A and B, information on adjacent tracks on the left and right sides of the current track traced by main beam M (information that can be used for tracking servo control, crosstalk cancellation, and the like) can be obtained as well as spherical aberration information (information that can be used for thickness servo control).

Figure 7:
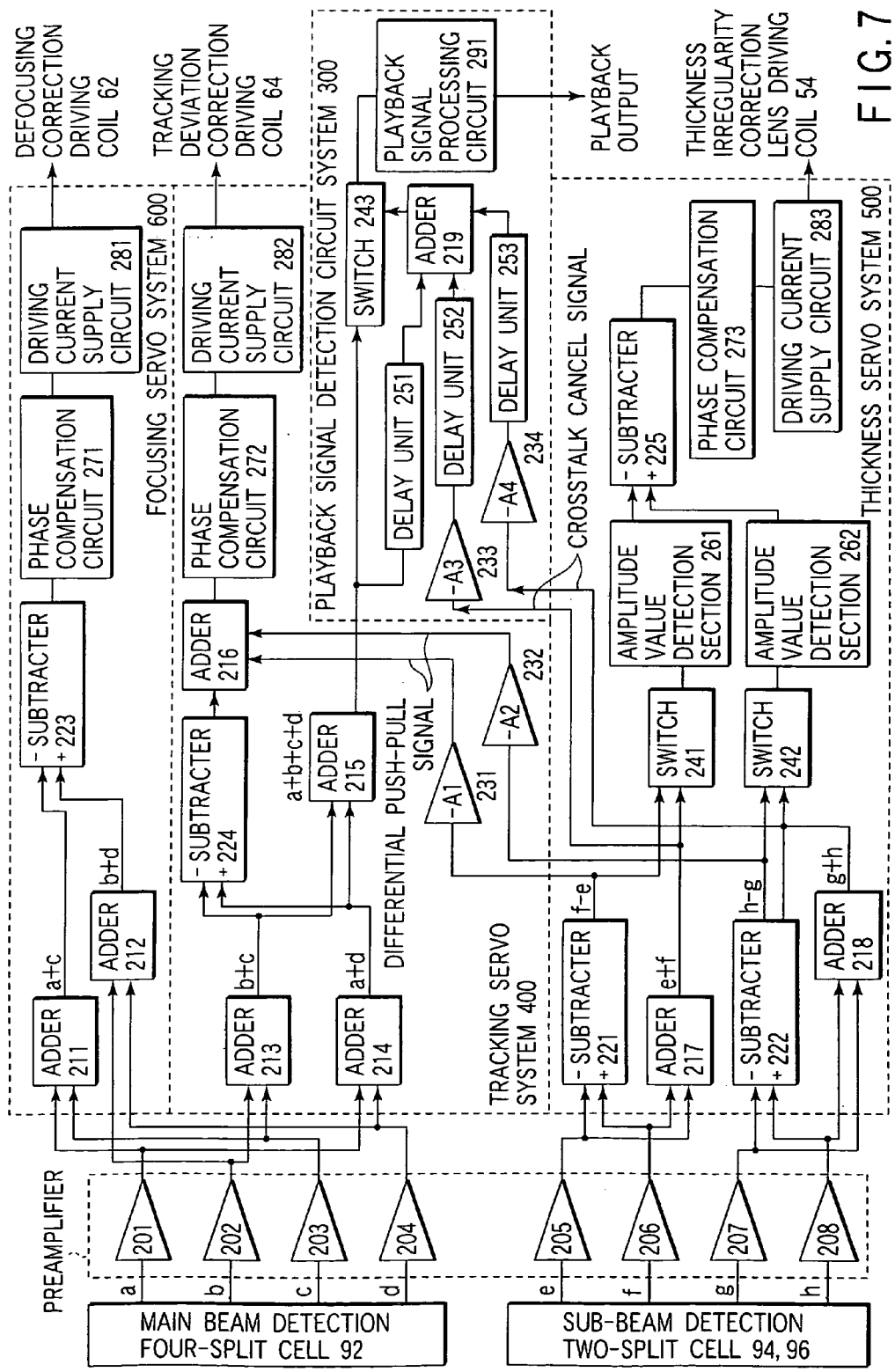
FIG. 7 is a block diagram for explaining a specific example of the internal arrangement of each type of servo system shown in FIG. 6.

FIG. 7 is a block diagram for explaining a specific example of the internal arrangement of each servo system in FIG. 6. The contents of defocusing detection/correction control circuit system (focusing servo system) 600, track deviation detection/correction control circuit system (tracking servo system) 400, medium transparent layer thickness irregularity (and/or refractive index irregularity) detection/correction control system (thickness servo system) 500, and playback signal detection circuit system 300 will be described in detail below.

Defocusing Detection/Correction Control Circuit System (Focusing Servo System) 600

Return light of main beam M to which astigmatism is given by cylindrical lens 80 in FIG. 6 forms a beam spot on cells a to d constituting main beam M detection four-division cell 92. The shape of this beam spot changes as follows.

When the focus of objective lens 60 is set on the surface of the recording layer of the information medium, the light-receiving surfaces of four-division cells a to d are located at positions where a cross-section of a beam from the astigmatism optical system becomes circular. For this reason, in an in-focus state, a circular beam spot is formed on the centers of the light-receiving surfaces of four-division cells a to d. If, however, the focus deviates farther from objective lens 60 than the recording layer of the medium, an elliptic beam spot is formed on the light-receiving surfaces of the four-division cells, which is elongated in the array direction of a pair of cells (e.g., cells a and c) of four-division cells a to d which are located in one diagonal direction. In contrast to this, if the focus deviates to the front side of the surface of the recording layer of the medium, an elliptic beam spot is formed on the light-receiving surfaces of the four-division cells which is elongated in the array direction of a pair of cells (e.g., cells b and d) of four-division cells a to d which are located in the other diagonal direction.

That is, a defocusing amount and direction can be detected by detecting a change in the shape of a beam spot (vertically elongated ellipse—circle—horizontally elongated ellipse) on the light-receiving surfaces of the four-division cells from a photodetection result from main beam M detection four-division cell 92. Focusing servo control can be implemented by using these pieces of information on the defocusing amount and direction. The embodiment shown in FIG. 7 has the following circuit arrangement for implementing this focusing servo control.

A photodetection output from cell a of main beam M detection four-division cell 92 in FIG. 6 is sent to one input terminal of each of adders 211 and 214 through preamplifier 201. A photodetection output from cell b of four-division cell 92 is sent to one input terminal of each of adders 212 and 213 through preamplifier 202. Likewise, a photodetection output from cell c of main beam M detection four-division cell 92 is sent to the other input terminal of each of adders 211 and 213 through preamplifier 203. A photodetection output from cell d of four-division cells 92 is sent to the other input terminal of each of adders 212 and 214 through preamplifier 204.

An output from adder 211 (the sum of outputs from cells a and c placed in one diagonal direction) is sent to the (−) input terminal of subtracter 223, and an output from adder 212 (the sum of outputs from cells b and d placed in the other diagonal direction) is sent to the (+) input terminal of subtracter 223. In this case, in an in-focus state (where a circle main beam spot is formed on cells a to d), the magnitude of output [(b+d)−(a+c)] from subtracter 223 which indicates the difference between output (cell b+cell d) from adder 212 and output (cell a+cell c) from adder 211 is zero (or a minimum value).

If the focus deviates to a position farther from objective lens 60 than the surface of the recording layer of the medium, an elliptic beam spot elongated in the array direction of cells a and c is formed, output (cell a+cell c) from adder 211 becomes larger than output (cell b+cell d) from adder 212. As a consequence, negative output [−(a+c)+(b+d)] corresponding to the focus deviation amount is output from subtracter 223. When this negative output [−(a+c)+(b+d)] is supplied to driving current supply circuit 281 through phase compensation circuit 271 to supply a corresponding driving current from driving current supply circuit 281 to defocusing correction driving coil 62, the position of objective lens 60 is adjusted to reduce output [−(a+c)+(b+d)] from subtracter 223 to zero (or a minimum value). When output [−(a+c)+(b+d)] from subtracter 223 becomes zero (or a minimum value), the focus deviation farther from objective lens 60 than the surface of the recording layer of medium is corrected.

In contrast to this, if the focus deviates to a position closer to objective lens 60 than the surface of the recording layer of the medium, an elliptic beam spot elongated in the array direction of cells b and d is formed, output (cell b+cell d) from adder 212 becomes larger than output (cell a+cell c) from adder 211. As a consequence, positive output [(b+c)−(a+c)] corresponding to the focus deviation amount is output from subtracter 223. When positive output [(b+c)−(a+c)] is supplied to driving current supply circuit 281 through phase compensation circuit 271 to supply a corresponding driving current from driving current supply circuit 281 to defocusing correction driving coil 62, the back-and-forth position of objective lens 60 is adjusted to reduce output [(b+c)−(a+c)] from subtracter 223 to zero (or a minimum value). When output [(b+c)−(a+c)] from subtracter 223 becomes zero (or a minimum value), the focus deviation nearer to objective lens 60 than the surface of the recording layer of medium is corrected.

Focusing servo system 600 for performing above focus deviation correction can be formed independently of tracking servo system 400, thickness servo system 500, tilt servo system 700 (FIGS. 13 and 14), and the like (which will be described later). This is because, according to the embodiment of the present invention, totally different principles can be used as the operation principle of focusing servo control (using astigmatism), the operation principle of tracking servo control (using the push-pull method of differential push-pull method), the operation principle of thickness servo control (using spherical aberration), and the operation principle of tilt servo control (using coma).

Track Deviation Detection/Correction Control Circuit System (Tracking Servo System) 400

The return light of main beam M reflected by the recording layer of information medium 100 form a circular beam spot on cells a to d constituting main beam M detection four-division cell 92 in an in-focus state. The circular beam spot on the four-division cells has a laterally symmetrical reflected light distribution when the focused spot of main beam M is located on a groove center or land center of the recording layer of the medium. This lateral symmetry of the reflected light distribution can be detected by dividing main beam M detection four-division cell 92 into cell a+cell d and cell b+cell c and detecting that the difference between outputs from the two-division cells (a+d and b+c) becomes zero or a minimum value.

Output (a+d) from adder 214 is supplied to the (+) input terminal of subtracter 224, and output (b+c) from adder 213 is supplied to the (−) input terminal of subtracter 224. As a consequence, subtracter 224 outputs the difference (tracking error signal) [(a+d)−(b+c)] between photodetection outputs obtained by splitting the beam spot into two parts, i.e., left and right parts, in the track running direction of groove G or land L. If the driving current to tracking deviation correction driving coil 64 is controlled to reduce this output (tracking error signal) to zero or minimum value, automatic control can be performed to move the center of the focused spot of main beam M onto a groove or land center of the recording layer of the medium. This automatic control will be referred to as tracking servo control based on the push-pull method.

A problem in the push-pull method is that a DC offset tends to appear in tracking signal ([(a+d)−(b+c)]). When this DC offset appears, even if the tracking error signal exhibits zero, the focused beam spot is not located in the center of a track (groove G or land L) of the recording surface of the medium. Causes of this offset include the optical axis deviation of objective lens 60, the tilt (radial tilt) of medium (optical disk) 100 in the radial direction, the unbalanced shape of groove G or land L, and the like.

The above offset should not exist in recording/playback operation using information medium 100 on which high-density recording/playback is performed. Demands have therefore arisen for measures against this offset. As a means for removing this offset (or reducing it to the level at which no significant problem arises), tracking deviation correction using the differential push-pull (DPP) method is available. In the arrangement shown in FIG. 7, part of a differential push-pull signal (DPP signal) used in this DPP method can be extracted from thickness servo system 500 (the detailed circuit arrangement of thickness servo system 500 will be described in detail later).

Tracking error signal ([(a+d)−(b+c)]) from subtracter 224 is input to adder 216. Adder 216 further receives output [(e−f)×A1] obtained by inverting/amplifying a detection output based on sub-beam A (output f−e from subtracter 221) using inverting amplifier 231 having predetermined amplification factor (−A1) and output [(g−h)×A2] obtained by inverting/amplifying a photodetection output based on sub-beam B (output h−g from subtracter 222) using inverting amplifier 232 having predetermined amplification factor (−A2).

As for the oblique arrangement of sub-beams A and B in FIG. 6, output [(e−f)×A1] from inverting amplifier 231 can be used to cancel out the offset on the right side of main beam M in FIG. 6, and output [(g−h)×A2] from inverting amplifier 232 can be used to cancel out the offset on the left side of main beam M in FIG. 6. These cancellation amounts can be arbitrarily adjusted by magnitude A1 of the amplification factor 231 and/or magnitude A2 of the amplification factor of inverting amplifier 232.

The tracking error signal, in which the offsets were canceled out in this manner, is supplied from adder 216 to driving current supply circuit 282 through phase compensation circuit 272. When driving current supply circuit 282 supplies a corresponding driving current to tracking deviation correction driving coil 64, the lateral position of objective lens 60 is adjusted to reduce output ([(a+d)−(b+c)]+[(e−f)×A1]+[(g−h)×A2]) from adder 216 to zero (or a minimum value). When the output from adder 216 becomes zero (or a minimum value), the positional shift (i.e., the tracking deviation) between the center of the focused spot of main beam M on the recording layer of the medium and a groove or land center of the recording layer of the medium is corrected.

The above tracking deviation correction method can also be applied to a medium (playback-only disk) having no wobble track. The following method can also be used to correct a tracking deviation on a medium (recording/playback disk) having wobble tracks like the one shown in FIG. 6.

In medium (recording/playback disk) 100 whose tracks (grooves G or lands L) on the recording surface wobble as shown in FIG. 6, two wobble components can be detected at the left and right portions of the focused spot of main beam M in the traveling direction. The detected left and right wobble components (wobble signal amplitudes) can be extracted from an output (b+c from the four-division cells) from adder 213 and an output (a+d from four-division cells) from adder 214.

If subtracter 224 calculates the difference ((a+d)−(b+c)) between these wobble components (wobble signal amplitudes) and tracking deviation correction driving coil 54 is controlled to reduce the wobble component (wobble signal amplitude) difference to zero or a minimum value, the focused spot of main beam M can be made to always trace the track (groove G or land L) located between the left and right wobble tracks. That is, the circuit arrangement shown in FIG. 7 can cope with tracking servo control using wobble components.

If, for example, objective lens 60 has an optical axis deviation, medium (optical disk) 100 has a radial tilt, and the wobble shape of groove G or land L is unbalanced, the above DC offset occurs in tracking servo control using wobbles. In the circuit arrangement shown in FIG. 7, to eliminate the influence of a DC offset, tracking deviation correction using the differential push-pull (DPP) method can be executed even in tracking servo control using the above wobbles.

Medium Transparent Layer Thickness Irregularity (and/or Refractive Index Irregularity) Detection/Correction Control Circuit System (Thickness Servo System) 500

Even if focusing servo control is activated to form a circular beam spot on the centers of four-division cells a to d (i.e., an in-focus state is set), the focused spot size of main beam M on the surface of the recording layer of the medium cannot be reduced unless spherical aberration caused by the thickness irregularity of the medium transparent layer or the like is corrected. In contrast to this, even if thickness servo for spherical aberration correction is activated, the maintenance of the in-focus state (minimum spot size) of the focused spot of main beam M on the surface of the recording layer of the medium is not guaranteed unless defocusing correction is performed by focusing servo control. Therefore, in order to correct spherical aberration due to the thickness irregularity of the medium transparent layer or the like while maintaining the in-focus state of the main beam, a thickness servo mechanism that can operate in cooperation (independently) with a focusing servo mechanism is required.

The manner in which the shape of a beam spot on four-division cells (vertically elongated ellipse—circle—horizontally elongated ellipse) on the four-division cells due to a focus deviation is maintained even if spherical aberration due to the thickness irregularity of the medium transparent layer occurs. For this reason, a focus deviation (defocusing) can be detected independently of the state of occurrence of spherical aberration. In other words, by using a method different from that for focus deviation detection, the state of occurrence of spherical aberration due to the thickness irregularity of the medium transparent layer can be detected independently of the focus deviation state. Such detection of a state of occurrence of spherical aberration can be implemented by the following arrangement.

A photodetection output from cell e of sub-beam A detection two-division cell 94 in FIG. 6 is sent to one input terminal of adder 217 and the (−) input terminal of subtracter 221 through preamplifier 205. A photodetection output from cell f of sub-beam A detection two-division cell 94 is sent to the other input terminal of adder 217 and the (+) input terminal of subtracter 221 through preamplifier 206. Likewise, photodetection output from cell g of sub-beam B detection two-division cell 96 in FIG. 6 is sent to one input terminal of adder 218 and the (−) input terminal of subtracter 222 through preamplifier 207. A photodetection output from cell h of sub-beam B detection two-division cell 96 is sent to the other input terminal of adder 218 and the (+) input terminal of subtracter 222 through preamplifier 208.

Output (e+f) from adder 217 is sent to one input terminal of switch 241, and output (f−e) from subtracter 221 is sent to the other input of switch 241. Output (f−e) from subtracter 221 is sent to inverting amplifier 231 to be used as part of the above differential push-pull signal. Output (e+f) from adder 217 is sent to inverting amplifier 233 to be used as part of a crosstalk cancel signal (to be described later). Likewise, output (g+h) from adder 218 is sent to one input terminal of switch 242, and output (h−g) from subtracter 222 is sent to the other input terminal of switch 242. Output (h−g) from subtracter 222 is sent to the inverting amplifier 232 to be used as part of the above differential push-pull signal. Output (g+h) from adder 218 is sent to inverting amplifier 234 to be used as part of a crosstalk cancel signal (to be described later).

Switch 241 selects detection sum signal (e+f) or detection difference signal (f−e) of cells e and f of sub-beam A detection two-division cell 94, and sends it to amplitude value detection section 261. Amplitude value detection section 261 detects the amplitude of selected detection sum signal (e+f) or detection difference signal (f−3), and sends it to the (−) input terminal of subtracter 225. Likewise, switch 242 selects detection sum signal (g+h) or detection difference signal (h−g) of cell g and h of sub-beam B detection two-division cell 96, and sends it to amplitude value detection section 262. Amplitude value detection section 262 detects the amplitude of selected detection sum signal (g+h) or detection difference signal (h−g), and sends it to the (+) input terminal of subtracter 225. The output [the amplitude value of sum signal (e+f) or difference signal (f−e)] from amplitude value detection section 261 is sent to the (−) input terminal of subtracter 225, and the output [the amplitude value of sum signal (g+h) or difference signal (h−g)] from amplitude value detection section 262 is sent to the (+) input terminal of subtracter 225.

If sum signal (e+f) is selected by switch 241, a value corresponding to the focused spot size (spot area) of sub-beam A in FIG. 6 is detected by amplitude value detection section 261. Likewise, if sum signal (g+h) is selected by switch 242, a value corresponding to the focused spot size (spot area) of sub-beam B is detected by amplitude value detection section 262.

In this case, subtracter 225 outputs a signal that becomes zero (or minimized) when the focused spot size (spot area) of sub-beam A becomes equal to the focused spot size (spot area) of sub-beam B. The output signal from subtracter 225 is supplied to driving current supply circuit 283 through phase compensation circuit 273. Driving current supply circuit 283 supplies thickness irregularity correction convex lens driving coil 54 in FIG. 6 with a driving current having a polarity and magnitude that make the output signal from subtracter 225 become zero (or minimized). Then, the position of thickness irregularity correction concave lens 50 and/or the position of thickness irregularity correction convex lens 52 in FIG. 6 is adjusted to match the focused spot size (spot area) of sub-beam A to the focused spot size (spot area) of sub-beam B. If the output signal from subtracter 225 becomes zero (or minimized) as a result of this operation, it indicates that the thickness irregularity of the medium transparent layer is corrected. (The principle of this thickness irregularity principle will be described in detail later with reference to FIGS. 8A to 8C.)

It can also be said that thickness irregularity correction by this method uses a change in focused spot size (area or diameter) as spherical aberration is caused by the thickness irregularity of the medium transparent layer (see the abscissa in FIG. 5A).

Consider detection of the focused spot of sub-beam A/B from another viewpoint. That is, subtracter 225 outputs a signal that becomes zero (or minimized) when the detected light amount of focused spot of sub-beam A (spot area× brightness per unit area) becomes equal to the detected light amount focused spot of sub-beam B (spot area×brightness per unit area). The output signal from subtracter 225 is supplied to driving current supply circuit 283 through phase compensation circuit 273. Driving current supply circuit 283 supplies thickness irregularity correction lens driving coil 54 in FIG. 6 with a driving current having a polarity and current which make the output signal from subtracter 225 become zero (or minimized). Then, the position of thickness irregularity correction concave lens 50 and/or the position of thickness irregularity correction convex lens 52 in FIG. 6 is adjusted to match the detected light amount of focused spot of sub-beam A to the detected light amount of focused spot of sub-beam B. If the magnitude of the output signal from subtracter 225 becomes zero (or minimized) as a result of this operation, it indicates that the thickness irregularity of the medium transparent layer is corrected.

It can also be said that thickness irregularity correction by this method uses a change in the brightness (light intensity) of a focused spot as spherical aberration is caused by the thickness irregularity of the medium transparent layer (see the ordinate in FIG. 5A).

Although the above method of correcting the thickness irregularity of the medium transparent layer can also be applied to a medium (playback-only disk) having no wobble tracks, the thickness irregularity of the medium transparent layer can also be corrected by the following method in a medium (recording/playback disk) having wobble tracks as shown in FIG. 6. This method uses that as the focused spot size decreases, a relatively larger wobble component (a change in wobble shape) at this spot can be detected, i.e., as the focused spot size is decreased, a wobble component can be detected with higher sensitivity (or as the spot size increases, sensitivity to a change in wobble shape deteriorates).

More specifically, if switch 241 selects difference signal (f–e), amplitude value detection section 261 detects a wobble component (the push-pull combined value of detection components of cells f and e) detected by the focused spot of sub-beam A in FIG. 6. If switch 242 selects difference signal (h–g), amplitude value detection section 262 detects a wobble component (the push-pull combined value of detection components of cells h and g) detected by the focused spot of sub-beam B.

The magnitude of wobble component (f–e) detected by amplitude value detection section 261 increases as the focused spot size of sub-beam A decreases when the spherical aberration of sub-beam A as a +1st-order light beam to which the spherical aberration is given in advance by hologram element 20A in FIG. 6 and the spherical aberration due to the thickness irregularity of the transparent layer cancel out each other. In contrast to this, the magnitude of wobble component (f–e) detected by amplitude value detection section 261 decreases as the focused spot size of sub-beam A increases when the spherical aberration of sub-beam A as a +1st-order light beam to which the spherical aberration is given in advance and the spherical aberration due to the thickness irregularity of the transparent layer are added together.

The magnitude of wobble component (h–g) detected by amplitude value detection section 262 decreases as the focused spot size of sub-beam B increases when the spherical aberration of sub-beam B as a –1st-order light beam to which the spherical aberration with an opposite polarity to sub-beam A is given by hologram element 20A and the spherical aberration due to the thickness irregularity of the transparent layer are added together. The magnitude of wobble component (h–g) detected by amplitude value detection section 262 increases as the focused spot size of sub-beam A decreases when the spherical aberration of sub-beam B as a –1st-order light beam to which the spherical aberration with an opposite polarity is given in advance and the spherical aberration due to the thickness irregularity of the transparent layer cancel out each other.

As is apparent from the above description, thickness servo control for correcting the thickness irregularity of the transparent layer of a medium can be implemented by making subtracter 225 calculate the difference between the magnitude of wobble component (f–e) detected by amplitude value detection section 261 and the magnitude of wobble component (h–g) detected by amplitude value detection section 262 as in the case where outputs from the adders 217 and 218 are selected by switches 241 and 242.

More specifically, a driving current having a polarity and magnitude which make the output signal from subtracter 225 become zero (or minimized) is supplied to thickness irregularity correction lens driving coil 54 in FIG. 6. The position of thickness irregularity correction concave lens 50 and/or the position of thickness irregularity correction convex lens 52 is adjusted to match the magnitude of wobble component (f–e) detected by sub-beam A detection two-division cell 94 and amplitude value detection section 261 to wobble component (h–g) detected by sub-beam B detection two-division cell 96 and amplitude value detection section 262.

The magnitude of wobble component (f–e) detected by sub-beam A detection two-division cell 94 and amplitude value detection section 261 corresponds to the focused spot size (spot area) of sub-beam A. The magnitude of wobble component (h–g) detected by sub-beam B detection two-division cell 96 and amplitude value detection section 262 corresponds to the focused spot size (spot area) of sub-beam B. If, therefore, the output signal from subtracter 225 becomes zero (or minimized), servo operation is performed in the same manner as in the case where the focused spot size (spot area) of sub-beam A becomes equal to the focused spot size (spot area) of sub-beam B, thereby correcting the thickness irregularity of the medium transparent layer.

As described above, focusing servo control for the detection of defocusing can be implemented by an idea different from that for thickness servo control for the correction of the thickness irregularity of the medium transparent layer. In this focusing servo control, optical system unit 70 like the one shown in FIGS. 4A to 4C is applied to the optical system in FIG. 6. With this focusing servo control, stable focusing and thickness servo operations can be performed independently of each other without causing any significant interference therebetween. In this case, defocusing in focusing servo control can also be detected by the following method.

When thickness irregularity correction concave lens 50, thickness irregularity correction convex lens 52, and objective lens 60 in FIG. 6 are regarded as optical system unit 70 in FIGS. 4A to 4C as a whole, in the optical system in FIG. 6, light having passed through collimator lens 40A is always incident as parallel light onto optical system unit 70. When the focusing position ($\beta$ in FIGS. 4A to 4C) at which light is focused by objective lens 60 coincides with the position of the recording layer of medium 100 (in an in-focus state without defocusing), light passing reflected by this recording layer and passing through optical system unit 70 becomes parallel light regardless of the distance between the thickness irregularity correction convex lens 52 and thickness irregularity correction concave lens 50.

If focusing position $\beta$ at which light is focused by objective lens 60 is located behind the position of the recording layer of the medium (in the direction to separate from the objective lens), light reflected by the recording layer and having passed through optical system unit 70 becomes divergent light. In this state, light always becomes divergent light regardless of the distance between thickness irregularity correction convex lens 52 and thickness irregularity correction concave lens 50. In contrast to this, if focusing position $\beta$ at which light is focused by objective lens 60 is located before the position of the recording layer of the medium (in the direction to approach the object lens), light reflected by the recording layer and having passed through optical system unit 70 becomes convergent light.

The state of light (parallel light, divergent light, or convergent light) reflected by the recording layer of the medium and having passed through optical system unit 70 can be detected by a combination of cylindrical lens 80 and photodetector 90A in FIG. 6 (or defocusing detection section 910 in FIG. 22 (to be described later)). By detecting the state of such reflected light (parallel light, divergent light, or convergent light), a defocusing state (an in-focus state, a state of focus deviation to the distant side, or a state of focus deviation to the near side) can be singly detected. This defocusing state can be stably detected regardless of the state of occurrence of thickness irregularity of the transparent layer (the state of occurrence of spherical aberration) and the distance between thickness irregularity correction convex lens 52 and thickness irregularity correction concave lens 50.

Playback Signal Detection Circuit System 300

Playback signal detection circuit system 300 is a circuit system for outputting the result obtained by reading a recorded mark on the recording layer of the medium using main beam M in FIG. 6 as an electrical signal.

Referring to FIG. 7, adder 215 adds sum output (b+c) of cells b and c of main beam M detection four-division cell 92 and sum output (a+d) of cell a and d of main beam M detection four-division cell 92. As a result, signal (a+b+c+d) corresponding to the detection results of four-division cells a to d is output from adder 215. This signal (a+b+c+d) has not undergone processing of removing crosstalk from adjacent tracks. Signal (a+b+c+d) is input to switch 243. Switch 243 also receives a signal having undergone processing of removing crosstalk from the adjacent tracks. This signal having undergone processing of removing crosstalk can be obtained by the following arrangement.

Adder 219 receives the first delay signal obtained by delaying signal (a+b+c+d) from adder 215, which has not undergone processing of removing crosstalk, by a first predetermined period of time using delay unit 251. Adder 219 also receives the second delay signal (crosstalk cancel signal) obtained by inverting/amplifying sum output (e+f) of cells e and f of sub-beam A detection two-division cell 94 with predetermined amplification factor (−A3) using inverting amplifier 233 and delaying the resultant signal by a second predetermined period of time using delay unit 252. This adder 219 also receives the third delay signal (crosstalk cancel signal) obtained by inverting/amplifying sum output (g+h) of cells g h of sub-beam B detection two-division cell 96 with predetermined amplification factor (−A4) using inverting amplifier 234 and delaying the resultant signal by a third predetermined period of time using delay unit 253.

With the use of photodetector 90A having an arrangement like the one shown in FIG. 6, the timing of detection of a recorded mark with sub-beam A precedes the timing of detection of the recorded mark with main beam M by a period of time corresponding to the positional shift of the beam on the recording surface of the medium. On the other hand, the timing of detection of the recorded mark with sub-beam B delays with respect to the timing of detection of the recorded mark with main beam M by a period of time corresponding to the positional shift of the beam on the recording layer of the medium. That is, the same recorded mark is read with sub-beam A, main beam, and sub-beam B at different times (different timings). Delay units 251 and 253 in FIG. 7 serve to correct these time deviations (timing deviations) to set the detection timings on the same time axis.

When tracking servo control normally functions, the magnitude of crosstalk components from adjacent tracks (tracks on the left and right side of a track which main beam M traces), contained in detection signal (a+b+c+d) with main beam M, differs from the magnitude of the right-side track component contained in detection signal (e+f) with sub-beam A, and also differs from the magnitude of the left-side track component contained in detection signal (g+h) with sub-beam B. For this reason, the crosstalk components from the adjacent tracks, contained in detection signal (a+b+c+d) with main beam M, cannot be completely canceled out (or minimized) by simply subtracting detection signal (e+f) with sub-beam A and detection signal (g+h) with sub-beam B from detection signal (a+b+c+d) with main beam M.

The crosstalk components from the adjacent tracks, contained in detection signal (a+b+c+d) with main beam M, are completely canceled out (or minimized) with synthesis of [−A3×(e+f)] and/or [−A4×(g+h)] by adjusting amplification factor A3 of intermediate wall 223 for detection signal (e+f) with sub-beam A and amplification factor A4 of inverting amplifier 234 for detection signal (g+h) with sub-beam B (in accordance with the state of the actual apparatus).

Switch 243 selects detection signal (a+b+c+d) based on main beam M, from which crosstalk is canceled by delay time adjustment by delay units 251 to 253 and amplification factor adjustment by inverting amplifiers 233 and 234, or detection signal (a+b+c+d) from adder 215, which has not undergone processing of removing crosstalk, and sends it to playback signal processing circuit 291. Playback signal processing circuit 291 demodulates detection signal (a+b+c+d) and performs error correction as needed, thereby providing a playback output corresponding to the contents of information pits recorded on information medium 100.

If the detection result obtained with main beam M contains substantially no crosstalk from adjacent tracks (the influence of crosstalk from the adjacent tracks is at a negligible level), a playback output may be obtained by using detection result (a+b+c+d) from adder 215. If crosstalk from adjacent tracks does not substantially exist (or can be neglected), a better result may be obtained without mixing any crosstalk cancel signal in detection result (a+b+c+d) from adder 215.

Figure 8A:
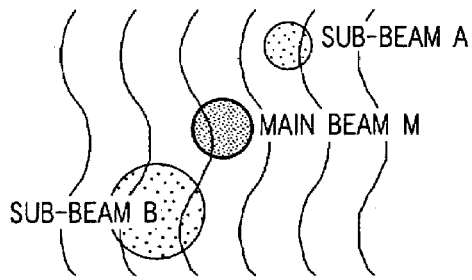
FIGS. 8A to 8C are views for explaining how thickness servo control using spherical aberration is implemented in the arrangement in FIG. 6.
Figure 8B:
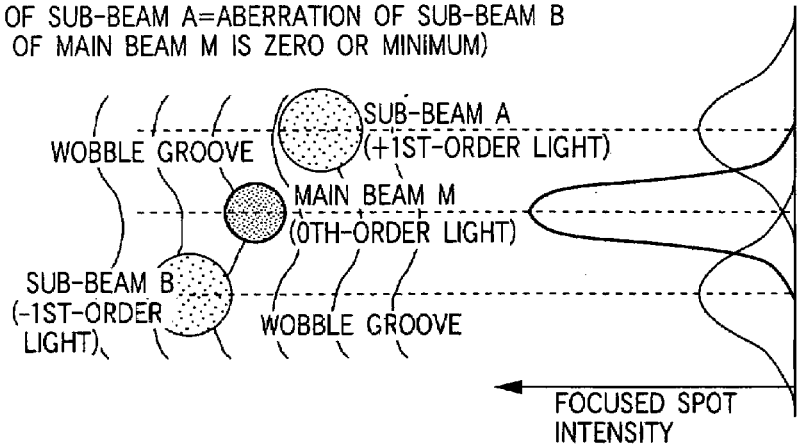
Figure 8C:
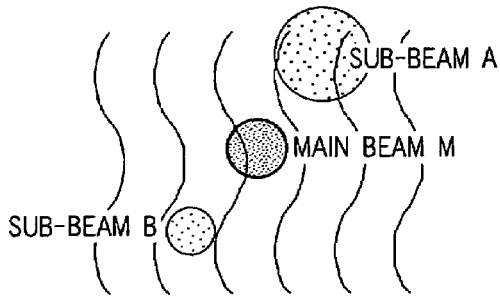

FIGS. 8A to 8C are views for conceptually explaining how thickness servo control using spherical aberration is implemented in the arrangement shown in FIG. 6.

As described above, spherical aberrations with opposite polarities are given to sub-beams A and B in advance by hologram element 20A. Assume that adjustment has been made such that if the medium transparent layer has no thickness irregularity, the spot size of sub-beam A becomes equal to that of sub-beam B (or the brightness of the spot of sub-beam A becomes equal to that of the spot of sub-beam B) (see FIG. 8B).

Assume that spherical aberration (influencing main beam M, sub-beam A, and sub-beam B all) is caused by the thickness irregularity of the medium transparent layer. In this case, even at a position where main beam M is in an in-focus state, the focused spot size of one sub-beam decreases (or the focused spot becomes brighter) due to cancellation of spherical aberrations, whereas the focused spot size of the other sub-beam increases (or the focused spot becomes darker) due to addition of spherical aberrations (see FIG. 5A and FIGS. 8A and 8C).

When the medium transparent layer undergoes thickness irregularity that cancels out the spherical aberration given to sub-beam A in advance, the spot size of sub-beam A becomes smaller than the spot size (FIG. 8B) without transparent layer thickness irregularity (or the spot of sub-beam A becomes brighter than that without transparent layer thickness irregularity), whereas the spot size of sub-beam B becomes larger than that without transparent layer thickness irregularity (or the spot of sub-beam B becomes darker than that without transparent layer thickness irregularity) due to addition of spherical aberrations, as shown in FIG. 8A.

In contrast to this, when the medium transparent layer undergoes thickness irregularity that cancels out the spherical aberration given to sub-beam B in advance, the spot size of sub-beam B becomes smaller than the spot size (FIG. 8B) without transparent layer thickness irregularity (or the spot of sub-beam B becomes brighter than that without transparent layer thickness irregularity), whereas the spot size of sub-beam A becomes larger than that without transparent layer thickness irregularity (or the spot of sub-beam A becomes darker than that without transparent layer thickness irregularity) due to addition of spherical aberrations, as shown in FIG. 8C.

As described above, as the focused spot size decreases, the amplitude of a detection signal from a wobble groove increases, and the amplitude of a playback signal from a recorded mark or embossed pit (a pit in the form of a recess/projection) increases. Therefore, spherical aberration can be detected by comparing the magnitudes of playback signals corresponding to focused spot sizes and detecting which one of the spot sizes of sub-beams A and B is smaller (or larger) on the surface of the recording layer. As shown in FIG. 8B, thickness servo control using spherical aberration can be implemented by adjusting the position of thickness irregularity correction concave lens 50 and/or the position of thickness irregularity correction convex lens 52 in FIG. 6 or the distance therebetween so as to equalize the spot sizes of sub-beams on the surface of the recording layer.

The brighter a focused spot is, the larger an output from a corresponding photodetection cell is. Spherical aberration can therefore be detected by comparing the magnitudes of signals corresponding to the brightness levels of the focused spots of sub-beams A and B and detecting which one of the focused spots of sub-beams A and B is brighter (or darker). Thickness servo control using spherical aberration can be implemented by adjusting the position of thickness irregularity correction concave lens 50 and/or the position of thickness irregularity correction convex lens 52 in FIG. 6 or the distance therebetween so as to equalize the brightnesses of the focused spots of sub-beams A and B.

Since thickness servo control using the above spherical aberration detection method (using two sub-beams A and B) uses a detection principle that is totally different from that for focusing servo control using detection of a change in focused spot shape on four-division cells a to d described above (using main beam M), the two servo systems can be constructed independently and separately.

Summary of Arrangement in FIG. 6 to 8C

The optical head including constituent elements 10 to 90 in FIG. 6 performs defocusing detection by an astigmatism method using cylindrical lens 80. More specifically, this optical head detects a defocusing amount by calculating the difference between two sums (a+c and b+d) of diagonal cells in focusing servo system 600 with respect to the detection light amounts detected among four-division photodetection cells a to d of main beam M detection four-division cell 92 which are irradiated with main beam M.

In addition, the thickness irregularity (thickness error) of the medium transparent layer is detected from the detection light amounts detected by the two-division photodetection cells (e+f and g+h) in two sub-beam detection cells 94 and 96 which are irradiated with the reflected light beams of sub-beams A and B, respectively.

If thickness irregularity (error) occurs in the transparent layer of information medium 100, main beam M has a focused spot intensity distribution (see FIGS. 5A and 5B) including spherical aberration caused by the thickness irregularity of the transparent layer. Although the spherical aberration caused by the thickness irregularity of the transparent layer is added to sub-beams A and B, the spherical aberrations with the opposite polarities are respectively given to sub-beams A and B in advance. For this reason, the spherical aberration amount of one of sub-beams A and B is canceled out by the spherical aberration caused by the thickness irregularity of the transparent layer, while the spherical aberration amount of the other sub-beam is increased by the spherical aberration (see FIGS. 8A and 8C).

Of the amplitudes of playback signals from information medium 100, the amplitude of a playback signal from a sub-beam with smaller spherical aberration is larger. For this reason, by comparing the amplitude values of the two playback signals (from sub-beams A and B) with each other, the thickness irregularity amount (thickness error amount) of the transparent layer and the direction of occurrence of the error (whether the error is in the direction in which the thickness becomes larger or smaller than a reference value) can be detected. In a recording region of information medium 100, the boundary surface between land L and groove G formed with a level difference has a wobble shape (wobble groove). In transparent layer thickness irregularity detection/correction control circuit system 500, therefore, subtracters 221 and 222 calculate the difference between detection signals from preamplifiers 205 and 206 and the difference between detection signals from preamplifiers 207 and 208 to obtain a detection signal difference from the wobble groove, thereby detecting the thickness error amount of the transparent layer.

A pit array in a fine recess/projection (embossed) shape exists in a playback region of information medium 100. When the thickness error amount of the transparent layer is to be detected from this pit array, the playback signal amplitudes calculated by adders 217 and 218 may be compared with each other.

When the distance between thickness irregularity correction concave lens 50 and thickness irregularity correction convex lens 52 is changed by supplying a control current to thickness irregularity correction convex lens driving coil 54 on the basis of the signal detected by the above method, spherical aberration in an opposite direction to the spherical aberration due to the thickness irregularity of the transparent layer is caused on the lens side of the optical head, thereby correcting the aberration caused by the thickness irregularity of the transparent layer.

In addition, part of the arrangement (the optical system and electric circuit system) for detecting the thickness irregularity (thickness error) of the medium transparent layer can be used for track deviation detection based on a crosstalk cancellation and/or differential push-pull method for a playback signal from a recorded mark.

Figure 9:
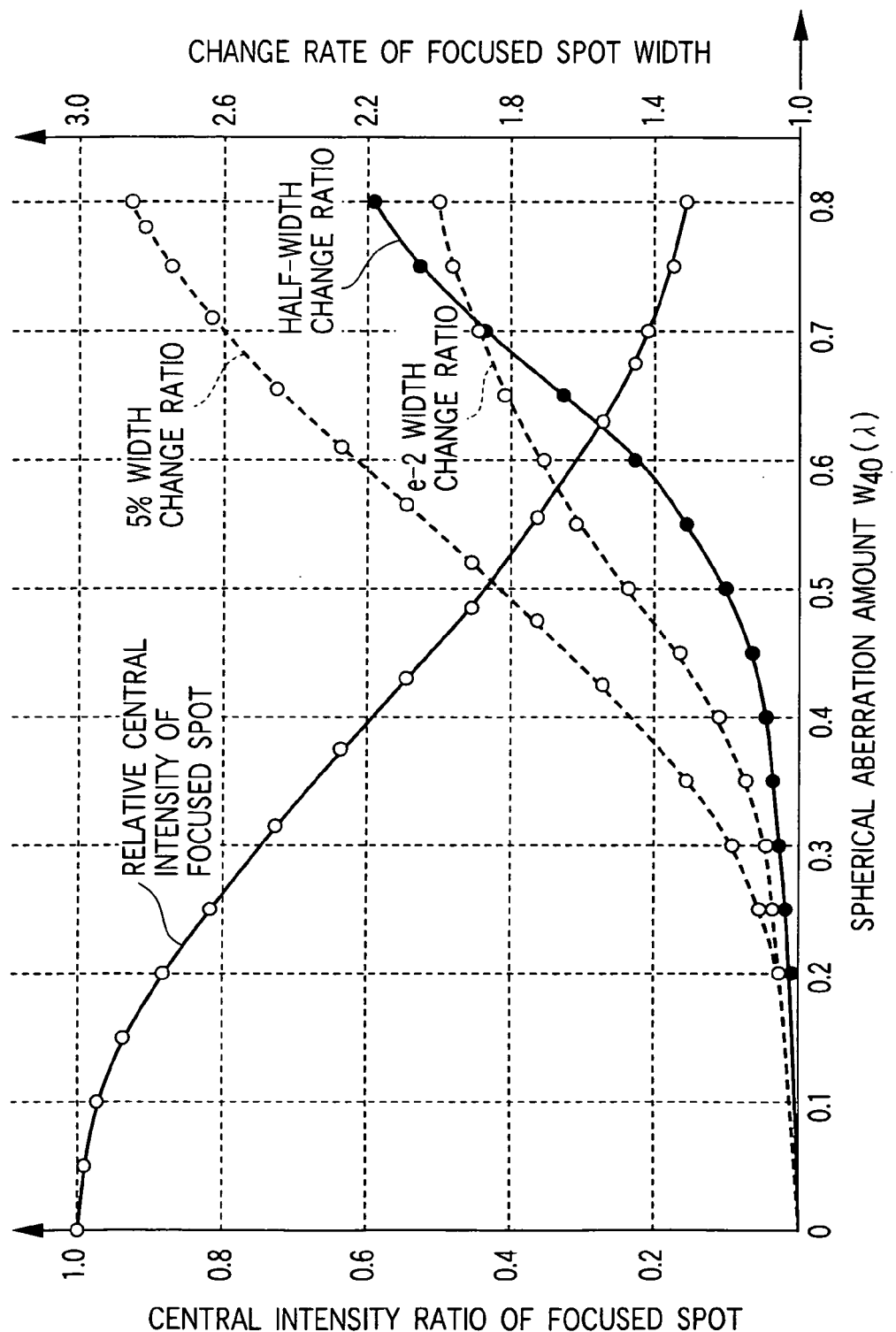
FIG. 9 is a graph for explaining how the characteristics (relative central intensity and spot width) of a focused spot change when only spherical aberration is given to the light without any defocusing correction (in-focus/just focus is fixed at the objective lens center in the absence of aberration)

FIG. 9 is a graph for explaining how the characteristics (relative central intensity and spot width) of a focused spot change when only spherical aberration is given without any defocusing correction (the central portion of the objective lens is fixed to an in-focus/just focus without any aberration).

Referring to FIG. 9, the solid curve ascending to the upper left indicates a change in the relative central intensity of a focused spot with respect to spherical aberration amount $W_{40}(\lambda)$, and the ordinate on the left side indicates the central intensity ratio (a maximum value of 1 at the spot center) of the focused spot.

This solid curve ascending to the upper left indicates the following. When spherical aberration amount $W_{40}(\lambda)$ is zero (no spherical aberration), the relative central intensity of the focused spot has a maximum value of "1", which decreases as spherical aberration amount $W_{40}(\lambda)$ increases. When spherical aberration amount $W_{40}(\lambda)$ falls between 0.2 $\lambda$ and 0.8 $\lambda$, the change rate of the central intensity of the focused spot is high with respect to a change in spherical aberration amount $W_{40}(\lambda)$. That is, when spherical aberration amount $W_{40}(\lambda)$ falls between 0.2 $\lambda$ and 0.8 $\lambda$, the amount of spherical aberration caused can be detected with high sensitivity (the larger the gradient of the curve, the higher the detection sensitivity) from a change in the central intensity of the focused spot. When spherical aberration amount $W_{40}$ ($\lambda$) is 0.2 $\lambda$ or less or 0.8 $\lambda$ or more, since the central intensity of the focused spot does not change much with a change in spherical aberration amount $W_{40}$ ($\lambda$), the detection sensitivity for the amount of spherical aberration caused deteriorates.

Referring to FIG. 9, the dashed curve ascending to the upper right and having a large gradient indicates a change in the 5% width of the focused spot with respect to spherical aberration amount $W_{40}$ ($\lambda$), and the ordinate on the right side indicates the change rate of this focused spot width. In this case, the 5% width of the focused spot means the width of the range of spread of a portion of the spot which has a light intensity of 5% when the central intensity of the focused spot is 100%.

This dashed curve ascending to the upper right indicates the following. The 5% width of the focused spot increases as spherical aberration amount $W_{40}$ ($\lambda$) increases. When spherical aberration amount $W_{40}$ ($\lambda$) falls between 0.3 $\lambda$ and 0.8 $\lambda$, the change rate of the 5% width of the focused spot with a change in spherical aberration amount $W_{40}$ ($\lambda$) is relatively high. When spherical aberration amount $W_{40}$ ($\lambda$) falls between 0.4 $\lambda$ and 0.7 $\lambda$, the change rate of the 5% width of the focused spot with a change in spherical aberration amount $W_{40}$ ($\lambda$) is higher. That is, when spherical aberration amount $W_{40}$ ($\lambda$) falls between 0.4 $\lambda$ and 0.7 $\lambda$, the amount of spherical aberration caused can be detected with high sensitivity from a change in the 5% width of the focused spot. When spherical aberration amount $W_{40}$ ($\lambda$) falls between 0.3 $\lambda$ and 0.4 $\lambda$ or less, the detection sensitivity for the amount of spherical aberration caused deteriorates. On the other hand, when spherical aberration amount $W_{40}$ ($\lambda$) falls between 0.7 $\lambda$ and 0.8 $\lambda$ or more, since the relatively central sensitivity of the focused spot is low, the focused spot becomes dark. This makes it difficult to detect the 5% width of the focused spot with a high S/N ratio, resulting in a deterioration in detection precision.

Referring to FIG. 9, the dashed curve ascending to the upper right and having a small gradient indicates a change in the e−2 width of the focused spot with respect to spherical aberration amount $W_{40}$ ($\lambda$), and the ordinate on the right side indicates the change rate of focused spot width. In this case, the e−2 width of the focused spot means the width of the range of spread of a portion of the spot which has a light intensity corresponding to a value "exp(−2)" (0.135334 . . . ) when the central light intensity of the focused spot is "1". "e" of "e−2 width" indicates an exponential function.

This dashed curve ascending to the upper right indicates the following. The e−2 width of the focused spot increases with an increase in spherical aberration amount $W_{40}$ ($\lambda$). When spherical aberration amount $W_{40}$ ($\lambda$) falls between 0.4 $\lambda$ and 0.6 $\lambda$, the change rate of the e−2 width of the focused spot with a change in spherical aberration amount $W_{40}$ ($\lambda$) is high. That is, when spherical aberration amount $W_{40}$ ($\lambda$) falls between 0.4 $\lambda$ and 0.6 $\lambda$, the amount of spherical aberration caused can be detected with high sensitivity from a change in the e−2 width of the focused spot. When spherical aberration amount $W_{40}$ ($\lambda$) is 0.4 or less, the detection sensitivity for the amount of spherical aberration caused deteriorates. When spherical aberration amount $W_{40}$ ($\lambda$) is 0.6 $\lambda$ or more, since the relative central intensity of the focused spot decreases, the focused spot becomes dark. This makes it difficult to detect the e−2 width of the focused spot with a high S/N ratio, resulting in a deterioration in detection precision.

Referring to FIG. 9, the solid curve ascending to the upper right indicates a change in the half-width of the focused spot with respect to spherical aberration amount $W_{40}$ ($\lambda$), and the ordinate on the right side indicates the change rate of this focused spot width. In this case, the half-width of the focused spot means the width of the range of spread of a portion of the spot which has a light intensity of 50% when the central light intensity of the focused spot is 100%.

This solid curve ascending to the upper right indicates the following. The half-width of the focused spot increases as spherical aberration amount $W_{40}$ ($\lambda$) increases. When spherical aberration amount $W_{40}$ ($\lambda$) falls between 0.5 $\lambda$ and 0.7 $\lambda$, the change rate of the half-width of the focused spot with a change in spherical aberration amount $W_{40}$ ($\lambda$) is high. That is, when spherical aberration amount $W_{40}$ ($\lambda$) falls between 0.5 $\lambda$ and 0.7 $\lambda$, the amount of spherical aberration caused can be detected with high sensitivity from a change in the half-width of the focused spot. When spherical aberration amount $W_{40}$ ($\lambda$) is 0.5 $\lambda$ or less, the detection sensitivity for the amount of spherical aberration caused decreases. When spherical aberration amount $W_{40}$ ($\lambda$) is 0.7 $\lambda$ or more, since the relative central intensity of the focused spot decreases, the focused spot becomes dark. This makes it difficult to detect the half-width of the focused spot with a high S/N ratio, resulting in a deterioration in detection precision.

FIG. 9 includes guidelines about how much spherical aberration is to be given to sub-beams A and B in FIG. 6 or FIGS. 8A to 8C in advance by hologram element 20A in FIG. 6. In other words, FIG. 9 shows specific materials for determination as to spherical aberrations which should be given to sub-beams A and B in advance to ensure the light intensity of a focused spot to a certain degree or more and also ensure the change rate of the central intensity or width of the focused spot with respect to spherical aberration amount $W_{40}$ ($\lambda$) to a certain degree or more.

More specifically, it is conceivable from FIG. 9 that spherical aberration amount $W_{40}$ ($\lambda$) is set to 0.8 $\lambda$ or less to ensure the light intensity of the focused spot to a certain degree or more, and spherical aberration amount $W_{40}$ ($\lambda$) is set between 0.2 $\lambda$ and 0.8 $\lambda$ to ensure the change rate or the central intensity of the focused spot with respect to spherical aberration amount $W_{40}$ ($\lambda$) to a certain degree or more.

Considering the change rate of focused spot width as well, spherical aberration amount $W_{40}$ ($\lambda$) that is preferably given to sub-beams A and B may be selected from the range of 0.3 $\lambda$ to 0.7 $\lambda$. More preferably, spherical aberration amount $W_{40}$ ($\lambda$) may be selected from the range of 0.4 $\lambda$ to 0.6 $\lambda$.

Figure 10:
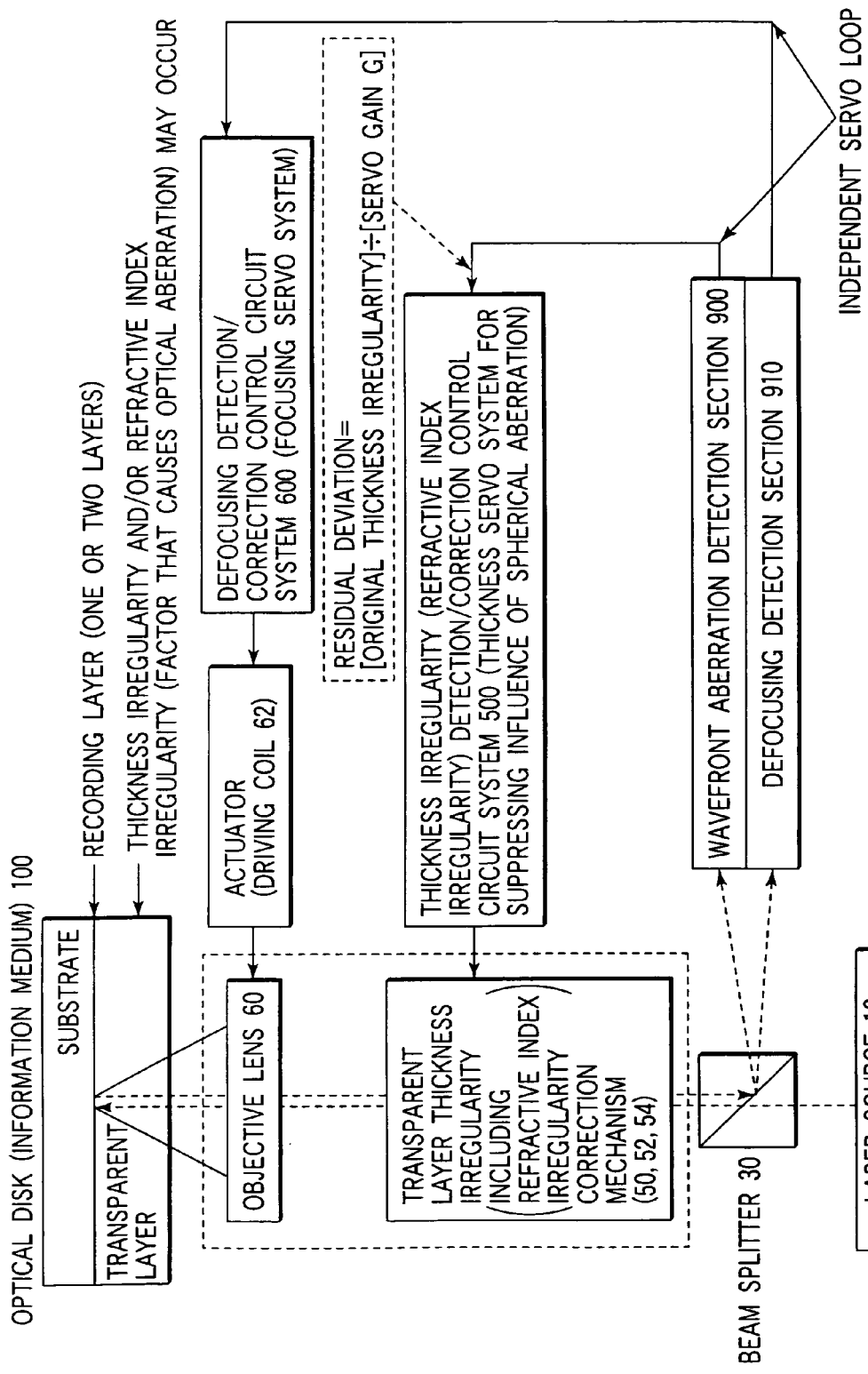
FIG. 10 is a block diagram showing a thickness servo system and focusing servo system which are independent of each other and extracted from the arrangement in FIG. 6.

FIG. 10 is a block diagram showing the thickness servo system and focusing servo system which are independent of each other and extracted from the arrangement shown in FIG. 6.

Referring to FIG. 10, the laser beam output from laser source 10 is sent to objective lens 60 through beam splitter 30 and the thickness irregularity (refractive index irregularity) correction mechanism for the medium transparent layer. In this case, the thickness irregularity is comprised of thickness irregularity correction concave lens 50, thickness irregularity correction convex lens 52, and thickness irregularity correction convex lens driving coil 54 in FIG. 6.

The laser beam focused by the objective lens 60 is sent onto the surface of the recording layer through the transparent protective layer of optical disk (information medium) 100 and reflected by it. The laser beam reflected by the recording layer of the medium is returned to beam splitter 30 through objective lens 60 and the transparent layer thickness irregularity correction mechanism (50, 52, 54), and sent from the beam splitter to wavefront aberration detection section 900 and defocusing detection section 910. In this case, wavefront aberration detection section 900 corresponds to sub-beam detection cells 94 and 96 and their peripheral parts in FIG. 6. Defocusing detection section 910 corresponds to main beam detection cell 92 and its peripheral parts in FIG. 6.

Defocusing detection section 910 detects defocusing by using cylindrical lens 80 and four-division cells a to d (using astigmatism), and sends the detection result to defocusing detection/correction control circuit system 600. Defocusing detection/correction control circuit system 600 performs control to drive the actuator (driving coil 62 in FIG. 6) on the basis of the defocusing detection result so as to set the focused beam from objective lens 60 in an in-focus state on the surface of the recording layer of the medium.

If thickness irregularity and/or refractive index irregularity occurs in the medium transparent layer, spherical aberration (or wavefront aberration) occurs. This spherical aberration (or wavefront aberration) is detected by wavefront aberration detection section 900 that is completely independent of defocusing detection section 910 (refer to the description given with reference to FIGS. 1A to 7 for the method of detecting spherical aberration). A signal corresponding to the spherical aberration (or wavefront aberration) detected by wavefront aberration detection section 900 is sent to transparent layer thickness irregularity detection/correction control circuit system 500. Transparent layer thickness irregularity detection/correction control circuit system 500 drives the actuator (driving coil 54 in FIG. 6) in the transparent layer thickness irregularity correction mechanism (50, 52, 54) so as to minimize the signal corresponding to the detected spherical aberration (or wavefront aberration). As a consequence, the optical internal state (the state of light, e.g., divergent light, parallel light, or convergent light; see FIGS. 3A to 4C) of the transparent layer thickness irregularity correction mechanism (50, 52, 54) is changed to cancel out the thickness irregularity and/or refractive index irregularity of the medium transparent layer.

In this case, when the optical internal state of the transparent layer thickness irregularity correction mechanism (50, 52, 54) is changed, defocusing also occurs. This defocusing is detected independently of spherical aberration (or wavefront aberration) (by using astigmatism) by defocusing detection section 910 that is independent of wavefront aberration detection section 900. For this reason, defocusing accompanying a change in the optical internal state of the transparent layer thickness irregularity correction mechanism (50, 52, 54) can be removed or minimized by focusing servo operation without interfering with servo operation (thickness servo operation) of canceling out the thickness irregularity and/or refractive index irregularity of the medium transparent layer.

After the optical internal state of the transparent layer thickness irregularity correction mechanism (50, 52, 54) is changed to cancel out the thickness irregularity and/or refractive index irregularity of the medium transparent layer, the signal corresponding to the spherical aberration (or wavefront aberration) detected by wavefront aberration detection section 900 converges to a certain minimum value. This minimum value upon convergence is not zero but is a certain finite value. This finite value will be referred to as a "residual deviation". This residual deviation is proportional to the thickness irregularity and/or refractive index irregularity of the medium transparent layer and inversely proportional to servo gain G of the thickness servo system.

Assume that the amount of spherical aberration caused by the refractive index irregularity of the medium transparent layer is much smaller than the amount of spherical aberration caused by the thickness irregularity of the medium transparent layer, i.e., the refractive index irregularity of the medium transparent layer can be substantially neglected. In this case, the residual deviation in the thickness servo system indicates the thickness irregularity of the medium transparent layer. That is, this residual deviation is proportional to the value obtained by dividing the thickness irregularity of the medium transparent layer by servo gain G of the thickness servo system (if a proportional constant is properly selected, then residual deviation=thickness irregularity÷ servo gain G).

FIG. 10 indicates the following. The spherical aberration caused by the thickness irregularity of the medium transparent layer is removed (or suppressed) by thickness servo control, and defocusing is eliminated (suppressed) by focusing servo control independent of this thickness servo control (regardless of the state of occurrence of spherical aberration). In addition, the amount of thickness irregularity caused in the medium transparent layer can also be known from the residual deviation in the thickness servo system from which the spherical aberration due to thickness irregularity and defocusing are eliminated (suppressed).

The arrangement shown in FIG. 10 can be applied to an optical head having a mechanism for compensating for the influence of the thickness irregularity of the transparent protective layer of information medium (optical disk) 100. This optical head has defocusing (focusing) detection section 910 and wavefront aberration (spherical aberration) detection section 900. An optical disk drive having this optical head includes focusing servo system circuit 600 and thickness servo system circuit 500 for suppressing wavefront aberration. That is, the optical disk drive having the arrangement shown in FIG. 10 can perform focusing servo and thickness servo operations independently of each other.

The optical disk drive having the optical head with the arrangement shown in FIG. 10 (or FIG. 19 or 22 to be described later) has a tracking channel from which a sum output or difference output from divided photodetectors are measured. During this signal measurement, tracking error emax.(axial) in a direction about the axis (circumferential direction) between the focal point of a light beam and the recording layer (or reflecting layer) is suppressed within ±0.10 μm. At this time, radial tracking error emax.(radial) is suppressed within ±0.010 μm. Note that the final numerical values of emax.(axial) and emax.(radial) are determined after margin distribution setting for the overall system is performed in consideration of the manufacturability of disks, mechanism precision, and the like.

Letting λ be the wavelength of a beam to be used, spherical aberration eave.max. of the transparent protective layer (including a space layer in a dual-layer disk) is preferably suppressed within 0.015 λrms. This point will be further described below.

The Marechal criterion indicates that the wavefront aberration in a general optical system is preferably set to 0.07 λrms or less. In a rewritable DVD, this wavefront aberration includes two types of wavefront aberrations. The first wavefront aberration is an aberration at the optical head, and the second wavefront aberration is an aberration at the interface (e.g., the transparent protective layer of the disk) between the optical disk and the optical head. Each wavefront aberration has the same value (e.g., 0.033 λrms corresponding to almost a half of 0.07 λrms provided according to the Marechal criterion).

The specifications of rewritable DVDs have the same concept regarding wavefront aberration. Seidel's aberration generally includes two aberration groups. Coma and an oblique incident beam belong to the first group. Spherical aberration, astigmatism, and defocusing belong to the second group. Although aberrations in the same group influence each other, aberrations in different groups do not mutually influence much.

The root mean square (RMS or rms) of a total aberration can be calculated from the square average of the second group. The rms value of wavefront aberration can be divided into 1:2 between the first and second groups (first group=1: second group=2). Therefore, 0.033 λrms can be divided into 0.015 λrms:0.030 λrms. In consideration of the influence of spherical aberration on defocusing, thickness servo control for the suppression of the thickness irregularity (and/or the refractive index irregularity of the transparent protective layer) of the transparent protective layer of the disk is required to realize an aberration of 0.015 λrms or less.

The relationship between the above thickness servo control and aberrations will be further described below.

According to Morio Ogami, "Optical Disk Technique" (1988: Radio Gijutsusha) pp. 54 and 55, the limit value with which stable image formation can be performed in a general optical system is called the Marechal criterion, and known as RMS (root Mean Square) value Wrms of a total wavefront aberration given by $$Wrms \leq 0.07 \ \lambda rms \quad (1)$$

(where λ is the wavelength in use).

In the present invention, a residual deviation amount in thickness correction (thickness servo control) is set on the basis of mathematical expression (1).

As wavefront aberration amounts, defocusing, coma, astigmatism based on the astigmatic difference in a laser source exist in addition to the spherical aberration caused by the thickness irregularity of the transparent layer. As a margin distribution method for aberrations, therefore, a method of dividing the value of mathematical expression (1) into two values according to the allowable aberration of the optical head having coma caused by the gradient of the objective lens and astigmatism based on the astigmatic difference of the laser source and the residual aberration of spherical aberration based on the information medium after thickness correction (thickness servo control) may be used.

In this case, the residual deviation of spherical aberration can also set as $$Wcrms \leq 0.035 \ \lambda rms \quad (2)$$

In addition, the value of mathematical expression (2) can be further divided into two values according to the residual deviation value of spherical aberration and the wavefront aberration caused by defocusing, as follows:

$$Wcrms \leq 0.017 \ \lambda rms \quad (3)$$

In this embodiment of the present invention, the residual deviation amount in thickness correction (thickness servo control) is defined by mathematical expression (1). When recording or playback operation is to be performed with higher stability and reliability, the residual deviation amount defined by mathematical expression (2) or (3) is preferably used.

According to Morio Ogami, "Optical Disk Technique" (1988: Radio Gijutsusha) p. 62, letting n be the refractive index of the transparent layer, and NA be the numerical aperture (NA) of the objective lens, spherical aberration amount $W_{40d}$ with respect to thickness irregularity δd of the transparent layer can be given by $$W_{40d} = [(n^2-1)/8n^3] \cdot (NA)^4 \cdot \delta n \quad (4)$$

Letting d be the thickness of the transparent layer, spherical aberration coefficient $W_{40n}$ with respect to an increase δn in the refractive index of the transparent layer is given by $$W_{40n} = [d(NA)^4/8n^3] \times \{-(n^2-3) \cdot (\delta n/n) + (n^2-6) \cdot (\delta n/n)^2\} \quad (5)$$

In addition, total spherical aberration coefficient $W_{40}$ is given by $$W_{40} = W_{40d} + W_{40n} \quad (6)$$

Furthermore, according to M. Born and E. Wolf, "Principles of Optics II" (TOKAI UNIVERSITY PRESS, 1975), p. 701, the relationship between spherical aberration coefficient $W_{40}$ and rms value Wcrms of the wavefront aberration due to spherical aberration is expressed as $$W_{40} = (0.94/0.07) \ Wcrms \quad (7)$$

In this embodiment of the present invention, the residual deviation in thickness correction (thickness servo control) is defined by the rms value of wavefront aberration represented by mathematical expressions (1) to (3). However, the present invention is not limited to this, and this residual deviation can also be defined by the spherical aberration coefficient ($W_{40}$) given by equation (7). Alternatively, the residual deviation in thickness correction (thickness servo control) may be defined by pseudo remaining thickness error amount δd after thickness correction (thickness servo control) according to mathematical expressions (4) to (6).

More specifically, according to mathematical expressions (4) and (7), residual deviation amount δd in thickness error display can be defined by using $$\delta d = \{[0.94 \times 8n^3]/[0.07 \times (n^2-1) \times (NA)^4]\} \times Wcrms \quad (8)$$

(in this case, $W_{40} = W_{40d}$, assuming that spherical aberration coefficient $W_{40n}$ for increase δn in refractive index).

If the servo gain in thickness correction (thickness servo control) is represented by G, thickness irregularity within the G-fold value of equation (8) is allowed (as a limit for stable image formation in the optical system in use) for the transparent layer of the information medium. In this case, G is a parameter indicating the magnitude of the effect of a correction function for the optical aberration amount caused by the thickness irregularity or refractive index irregularity of the transparent layer. This correction function is represented by Wcrms.

In this case, according to equation (8), the maximum allowable amount of thickness irregularity of the transparent layer of the information medium can be set as follows:

$$\delta d = \{[0.94 \times 8n^3]/[0.07 \times (n^2-1) \times (NA)^4]\} \times (G \cdot Wcrms) \quad (9)$$

In this case, the magnitude of servo gain G has no upper limit as long as stable servo operation can be ensured. In practice, however, the value of G is selectively set to an appropriate value between 2-fold value and 10,000-fold value or between 6 dB and 80 b dB (considering other servo operations as well).

In the above equations, for example, refractive index n of the transparent layer is set as follows. When wavelength λ is 650 nm, the refractive index is set to about 1.55. When wavelength λ is 405 nm, the refractive index is set to about 1.62. In addition, the NA value of the objective lens is set, for example, in the range of 0.6 to 0.9, and more specifically, the range of 0.65 to 0.85 (or NA≧0.65).

If equation (9) is applied to the arrangement shown in FIG. 6 or 10 in which thickness servo control functions, the G-fold value of the residual deviation (Wcrms) of spherical aberration, i.e., the residual deviation in thickness servo control, corresponds to the thickness irregularity (δd) of the medium transparent layer. As long as the maximum value of this thickness irregularity (δd=G·Wcrms) is suppressed below a predetermined standard value (e.g., ±10 μm), normal recording/playback operation can be performed by using this medium (optical disk).

This point will be described in more detail below. When the thickness irregularity (Wcrms) of the medium transparent layer is 0.07 λrms or less (if λ=405 nm, then 0.07 λ=28 nm), normal recording/playback operation can be performed even with servo gain G=1 in thickness servo control. At present, it is, however, difficult to manage the thickness irregularity of medium transparent layers in mass-produced disks to 28 nm or less from the viewpoint of yield and the like.

Assume that servo gain G is about 400 to 500. In this case, even if the thickness irregularity (Wcrms) of the medium transparent layer is allowed up to 0.07 λ×400 to 500=28 λ to 35 λ (if λ=405 nm, then 28 λ=11 μm, and 35 λ=24 μm), normal recording/playback operation can be performed.

Assume that G is about 1,000 to 10,000. In this case, even if the thickness irregularity (Wcrms) of the medium transparent layer is allowed up to 70 λ to 700 λ (if λ=405 nm, then 70 λ=28 μm, and 700 λ=280 μm), normal recording/playback operation can be performed. That is, if a thickness servo system that stably operates with servo gain G=1000 is designed, normal recording/playback operation can be performed even if the thickness irregularity of the medium transparent layer is 28 μm. If a thickness servo system that stably operates with servo gain G=10,000, normal recording/playback operation can be performed even if the thickness irregularity of the medium transparent layer is 280 μm.

Assume that the thickness servo system for an apparatus using a laser with λ=405 nm for recording/playback operation has servo gain G=400 to 500. Since the servo system can cope with thickness irregularity up to 11 μm to 14 μm, it suffices if the allowable value of thickness irregularity of the medium transparent layer used in this apparatus is suppressed to ±10 μm.

As described above, the allowable value of the thickness irregularity of a medium transparent layer (allowable value in management of thickness irregularities of the transparent layers of mass-produced media) can be increased by using the apparatus of the present invention (an optical disk drive having an arrangement like the one shown in FIG. 6 or 10 or the like) having a thickness servo system with large servo gain G. This makes it possible to greatly increase the yield of media and hence decrease the manufacturing cost of media.

Figure 11A:
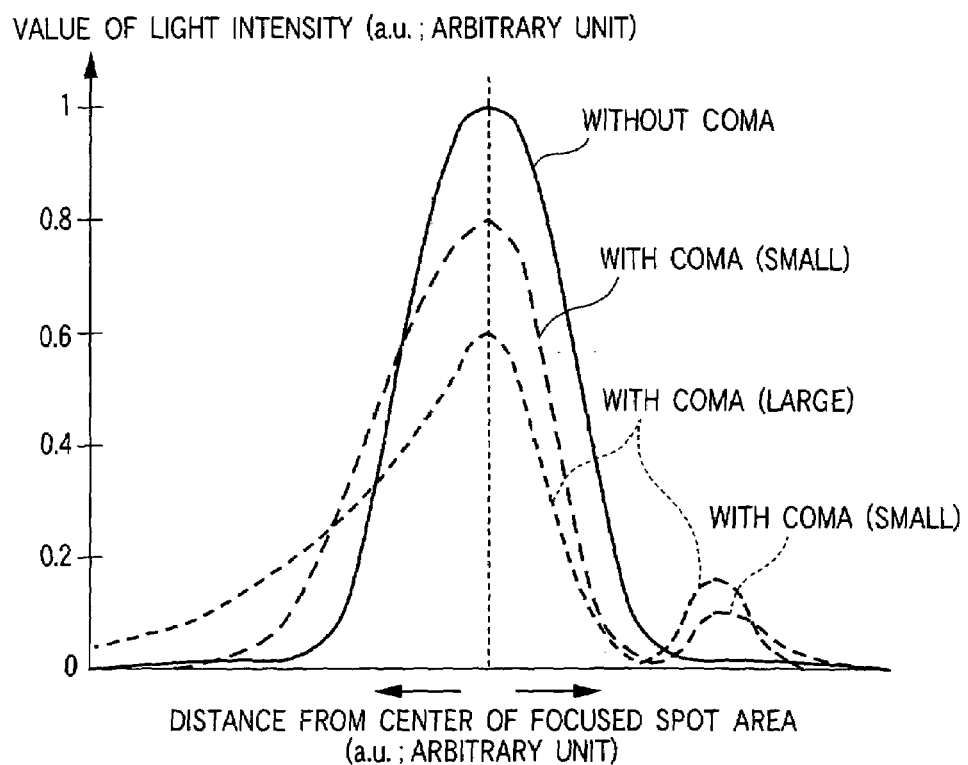
FIGS. 11A and 11B are views for explaining how the intensity distribution of a focused spot formed on a recording surface changes due to coma when only the coma is given to the light without any defocusing correction (in-focus/just focus is fixed at an objective lens center in the absence of aberration), and showing what side lobe is produced beside the focused spot when the coma is given thereto.
Figure 11B:
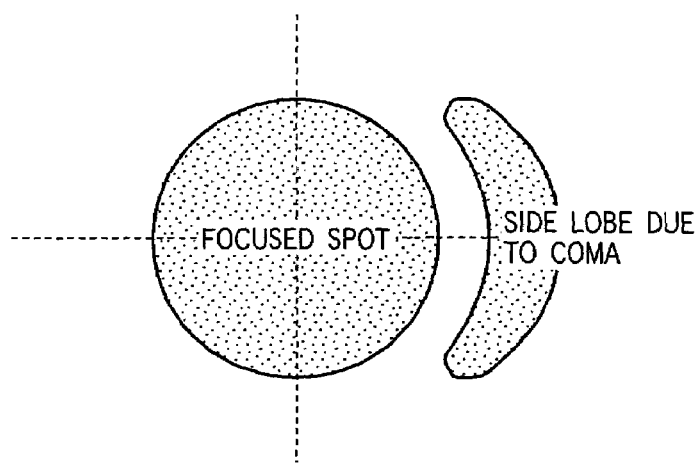

FIGS. 11A and 11B are views for explaining how the intensity distribution of a focused spot on a recording surface changes due to coma when only coma is provided without defocusing correction (the central portion of the objective lens is fixed to an in-focus/just focus position without any aberration), and show a specific example of a side lobe produced near a focused spot when coma is provided.

When no coma is provided, the light intensity distribution of the focused spot of a laser beam on the recording surface of the medium has a unimodal peak (main peak) centered on the center of the spot surface, as indicated by the solid curve (without coma) in FIG. 11A. The width of the unimodal peak in this case is relatively small. In this case, the "width" indicates a width equivalent to the distance from the center of the focused spot surface×2 (more specifically, the 5% width, e−2 width, half-width, or the like described with reference to FIG. 9) when the relative light intensity becomes a predetermined value or less with the central peak of the focused spot being set to "1".

If slight coma is provided, as indicated by the dashed curve (with coma (small)) in FIG. 11A, the central light intensity (main peak) of the center of the focused spot is slightly lower than that without coma, and the width of the main peak slightly increases. In addition, a small sub-peak called a side lobe is produced beside the main peak. As indicated by FIG. 11B, this side lobe due to coma is produced in the form of a banana to be located beside the main peak with a circular spot shape (elliptic or teardrop shape depending on situations) and at a position where it surround part of the main peak.

When larger coma is provided, as indicated by the short dashed curve (with coma (large)) in FIG. 11A, the central light intensity (main peak) of the center of the focused spot surface further decreases as compared with the case of small coma, and the width of the main peak with further increases. In this case, the light intensity of the side lobe (sub-peak) becomes higher than that with small coma.

Assume that an optical head is designed/manufactured such that no side lobe due to the above coma is produced when a laser beam is vertically incident on the surface of the recording layer of a medium (or an objective lens is parallel to the surface of the recording layer of the medium). In this case, if a laser beam is not vertically incident on the surface of the recording layer of the medium (or the objective lens is not parallel to the surface of the recording layer of the medium), a side lobe due to the coma occurs (or increases).

This side lobe due to coma increases as the tilt angle between the normal to the surface of the recording layer of the medium and a laser beam (the tilt angle between the surface of the recording layer of the medium and the objective lens) increases. That is, the state of occurrence of a side lobe corresponding to the magnitude of coma changes depending on the tilt angle between the normal to the surface of the recording layer of the medium and the laser beam. The light intensity and width of the focused spot of a laser beam also change in accordance with a change in this tilt angle.

That is, the parallelism (or tilt) between the surface of the recording layer of the medium and the objective lens can be detected from the state of occurrence of coma on the surface of the recording layer of the medium (a change in the width and/or intensity of a main peak depending on the magnitude of coma, the presence/absence of a side lobe depending on the magnitude of coma, a change in the intensity and/or magnitude of a side lobe, and the like). In other words, the state of occurrence of warpage (or the state of occurrence of a tilt) of the information medium (optical disk) can be known from the state of occurrence of coma on the surface of the recording layer of the medium.

Figure 12A:
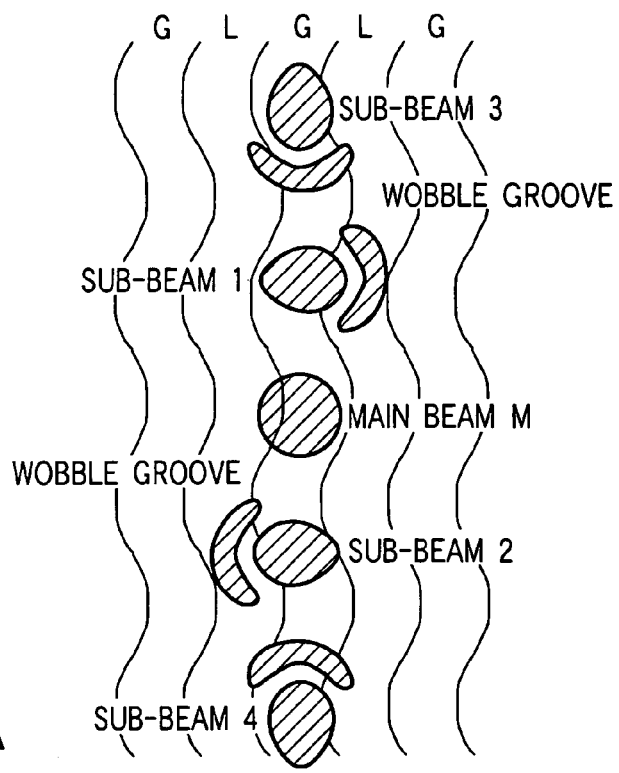
FIGS. 12A and 12B are views for explaining what focused spots main beams located between a plurality of sub-beams accompanying side lobes caused by coma form on the recording surface of a medium, and showing examples of photodetection cells for detecting the states of these focused spots.
Figure 12B:
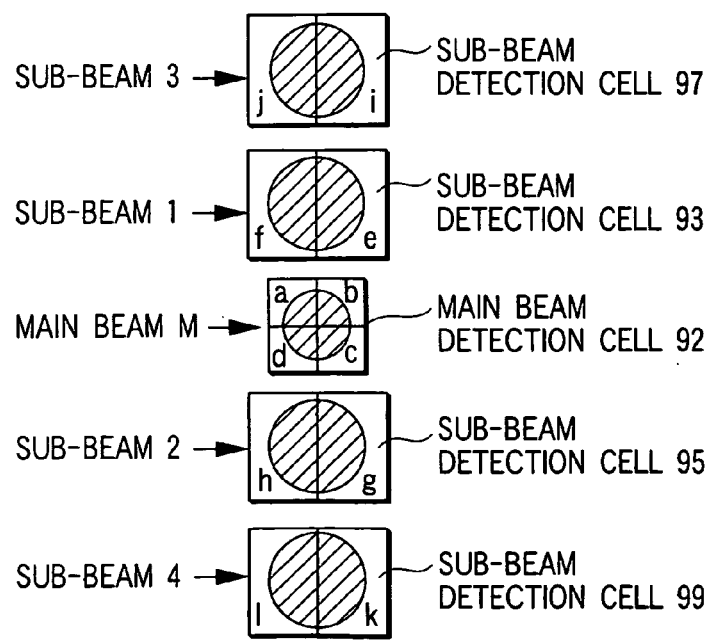

FIGS. 12A and 12B are views for explaining what focused spot is formed on the recording surface of the medium by a main beam located between a plurality of sub-beams with side lobes caused by coma, and also showing an example of a photodetection cell group for detecting the states of these focused spots.

Main beam M at the middle position in FIG. 12A is the 0th-order light component of a laser beam. Sub-beams 1 and 2 on the two sides of main beam M are ±1-order light components extracted from the laser beam by the first hologram element. Sub-beams 3 and 4 located outside sub-beams 1 and 2 so as to sandwich them are other ±1-order light components extracted from the laser beam by the second hologram element. Reference symbol G denotes a wobbling groove track on the optical disk (information medium); and L, a wobbling land track.

Referring to FIG. 12A, a tilt (radial tilt) in the lateral direction (the radial direction of the disk) can be detected on the basis of the states of occurrence of coma at sub-beams 1 and 2 (a change in the width and/or intensity of the central focused spot of each sub-beam depending on the magnitude of coma, a change in the intensity of each side lobe, and the like).

Referring to FIG. 12A, a tilt (tangential tilt) in the vertical direction (the tangential direction of the disk) can be detected on the basis of the states of occurrence of coma for sub-beams 3 and 4 (a change in the width and/or intensity of the central focused spot of each sub-beam depending on the magnitude of coma, a change in the intensity of each side lobe, and the like).

The state of occurrence of an optical aberration (wavefront aberration or spherical aberration) for main beam M in FIG. 12A and a change in light intensity can be detected by main beam detection cell (four-division cells a to d) 92 in FIG. 12B. The state of occurrence of an optical aberration (coma) for each of sub-beams 1 to 4 in FIG. 12A and a change in the light intensity of each sub-beam can be detected by sub-beam detection cells (two-division cells e to l) 93 to 99.

Figure 13:
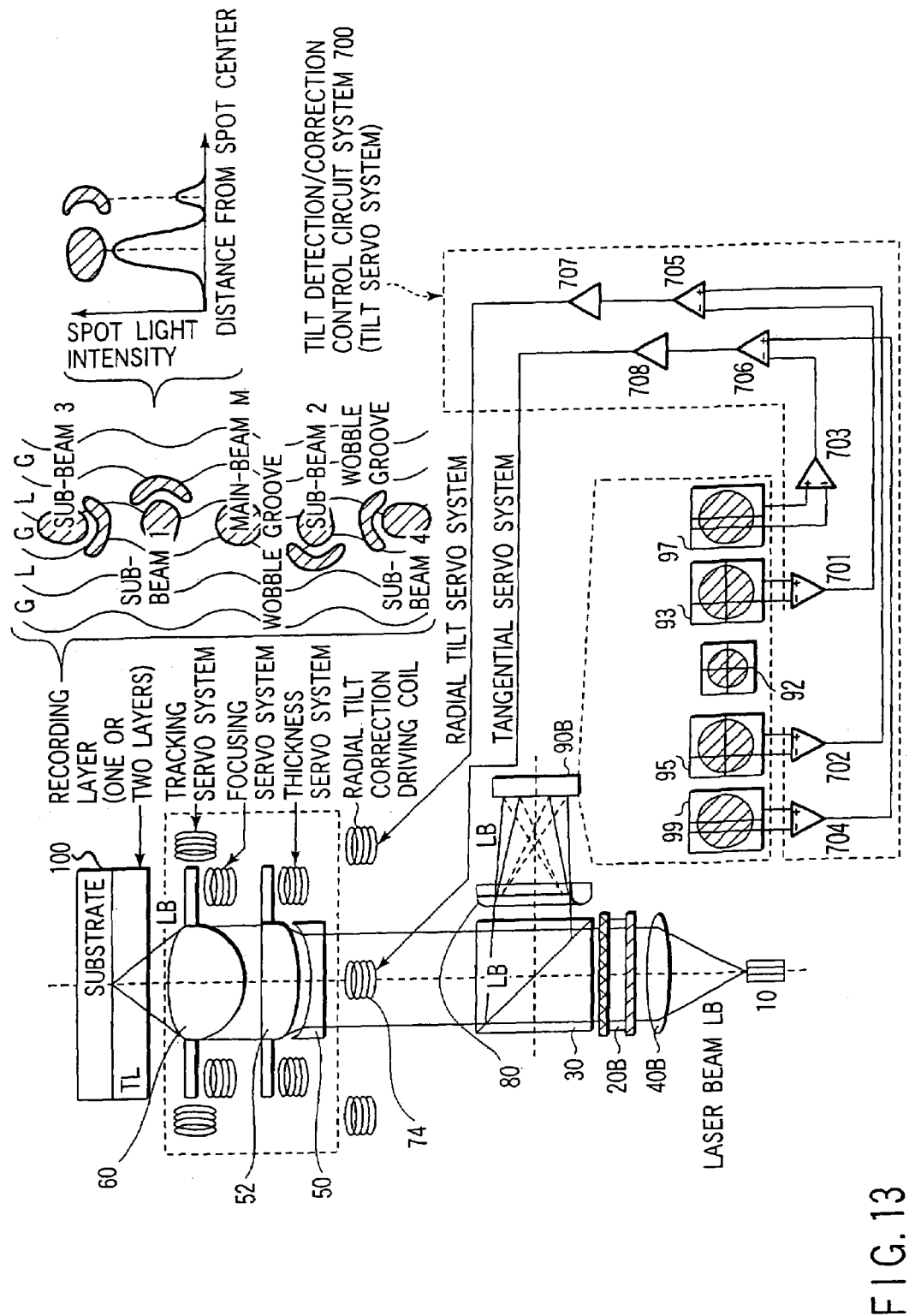
FIG. 13 is a view for explaining the arrangement of an apparatus (the main part of an optical disk or recording/playback apparatus) including a means (tilt servo system) for suppressing the influence of the warpage (the radial tilt in the radial direction of the disk and the tangential tilt in the circumferential direction of the disk) of an information medium (optical disk) by using a plurality of sub-beams accompanying side lobes caused by coma.

FIG. 13 is a view for explaining the arrangement of an apparatus (the main part of an optical disk drive or recording/playback apparatus) having a means (tilt servo system) for suppressing the influence of the warpage (radial tilt in the radial direction of the disk and tangential tilt in the circumferential direction of the disk) of an information medium (optical disk) by using a plurality of sub-beams with side lobes due to coma. The apparatus arrangement shown in FIG. 13 corresponds to the apparatus arrangement in FIG. 6 to which a tilt servo system using coma is added. Therefore, portions associated with coma and tilt servo control will be mainly described below.

The laser beam emitted from laser source 10 formed by a laser diode and the like is collimated by collimator lens 40B. The collimated laser beam is then incident on hologram element 20B. Different holograms are formed on the upper and lower surfaces of hologram element 20B. These holograms serve to give a predetermined optical aberration (coma in this case) to an incident laser beam.

The 0th-order straight light component that is not diffracted by hologram element 20B passes through an optical system having an arrangement similar to that in FIG. 6 and forms the circular focused spot of main beam M on the surface of the recording layer of the medium. In this case, the optical system (50 to 60) in FIG. 13 may have an arrangement similar to that of the optical system (50 to 60) in FIG. 6. The optical system in FIG. 13 further includes an actuator (radial tilt correction driving coil 72 and tangential tilt correction driving coil 74) for tilt servo control. More specifically, the tilt direction and amount of the optical system (50 to 60) in FIG. 13 in the radial direction of the medium (disk) can be arbitrarily changed by changing the amount and direction of current supplied to radial tilt correction driving coil 72. In addition, the tilt direction and amount of the optical system (50 to 60) in FIG. 13 in the circumferential direction of the medium (disk) can be arbitrarily changed by changing the amount and direction of current supplied to tangential tilt correction driving coil 74.

The ±1st-order light components diffracted by the hologram on the upper surface (on the laser source 10 side) of hologram element 20B are given coma in the radial direction of medium (optical disk) 100. As a consequence, as shown in FIG. 13 or 12A, the focused spots of sub-beams 1 and 2 accompanied by side lobes are formed on the surface of the recording layer of the medium on the two sides of the focused spot of main beam M. Aberrations (coma) with opposite polarities are given to these sub-beams 1 and 2 in advance, like sub-beams A and B (FIG. 6), by the hologram on the upper surface of hologram element 20B.

As a result, when a tilt occurs to increase the coma for one beam (e.g., sub-beam 1), the coma for the other beam (sub-beam 2) decreases, whereas when a tilt occurs to decrease the coma for one beam (sub-beam 1), the coma for the other beam (sub-beam 2) increases. When this relationship is applied to the graph of FIG. 11A, the following can be concluded. When a tilt occurs in the radial direction, the side lobe of sub-beam 1 (or sub-beam 2) increases, while the side lobe of sub-beam 2 (or sub-beam 1) decreases.

The ±1st-order light components diffracted by the hologram on the lower surface (on the beam splitter 30 side) of hologram element 20B are given coma in the circumferential direction (tangential direction) of medium (optical disk) 100. As a result, as shown in FIG. 13 or 12A, the focused spots of sub-beams 3 and 4 accompanying side lobes are formed on the surface of the recording layer of the medium outside the focused spots of sub-beams 1 and 2 so as to sandwich them. Aberrations (coma) with opposite polarities are given to outer sub-beams 3 and 4 in advance, like inner sub-beams 1 and 2, by the hologram on the lower surface of hologram element 20B.

As a result, when a tilt occurs to increase the coma for one beam (e.g., sub-beam 3), the coma for the other beam (sub-beam 4) decreases, whereas when a tilt occurs to decrease the coma for one beam (sub-beam 3), the coma of the other beam (sub-beam 4) increases. When this relationship is applied to the graph of FIG. 11A, the following can be concluded. When a tilt occurs in the tangential direction, the side lobe of sub-beam 3 (or sub-beam 4) increases, while the side lobe of sub-beam 4 (or sub-beam 3) decreases.

Increases/decreases in the side lobes of sub-beams 1 and 2 can be detected by the two-division cells of sub-beam 1 detection cell 93 and sub-beam 2 detection cell 95. Likewise, increases/decreases in the side lobes of sub-beams 3 and 4 can be detected by the two-division cells of sub-beam 3 detection cell 97 and sub-beam 4 detection cell 99.

The apparatus in FIG. 13 is adjusted such that the main peak and/or side lobe of sub-beam 1 detected by the two-division cells of sub-beam 1 detection cell 93 becomes equal to the main peak and/or side lobe of sub-beam 2 detected by the two-division cells of sub-beam 2 detection cell 95 when there is no tilt in the radial direction of the medium (disk) (this adjustment is also made in consideration of a phenomenon in which when there is no tilt in the radial direction, no side lobes of sub-beams 1 and 2 are produced or the sizes of side lobes are minimized).

Likewise, the apparatus in FIG. 13 is adjusted such that the main peak and/or side lobe of sub-beam 3 detected by the two-division cells of sub-beam 3 detection cell 97 becomes equal to the main peak and/or side lobe of sub-beam 4 detected by the two-division cells of sub-beam 4 detection cell 99 when there is no tilt in the circumferential direction of the medium (disk) (this adjustment is also made in consideration of a phenomenon in which when there is no tilt in the circumferential direction, no side lobes of sub-beams 3 and 4 are produced or the sizes of side lobes are minimized).

The tilt servo system in the radial direction has the following arrangement. The photodetection outputs obtained by the two-division cells of sub-beam 1 detection cell 93 are input to differential amplifier (subtracter) 701. The photodetection outputs obtained by the two-division cells of sub-beam 2 detection cell 95 are input to differential amplifier (subtracter) 702. The outputs from differential amplifiers 701 and 702 are input to differential amplifier (comparator) 705.

If the state of sub-beam 1 detected by the two-division cells of sub-beam 1 detection cell 93 is identical to the state of sub-beam 2 detected by the two-division cells of sub-beam 2 detection cell 95, the two signals input to differential-amplifier 705 are at the same level. In this case, the output from differential amplifier 705 is zero (or a minimum value).

Since comae with opposite polarities are given to sub-beams 1 and 2 in advance, when a tilt (radial tilt) occurs in the radial direction of the medium (disk), the main peak of one sub-beam decreases, and its side lobe increases, whereas the main peak of the other sub-beam increases, and its side lobe decreases. As a consequence, the levels of the two signals input to differential amplifier 705 change in accordance with the direction and magnitude of the radial tilt that has occurred. As a result, differential amplifier 705 outputs a radial tilt servo control signal having a polarity corresponding to the direction of the radial tilt and a magnitude corresponding to the magnitude of the radial tilt.

When this control signal is current-amplified by amplifier 707 as needed and supplied to radial tilt correction driving coil 72, the optical system (50 to 60) tilts in the direction to decrease the radial tilt that has occurred (the tilt between the optical system and the surface of the recording layer of the disk in the radial direction). This operation is repeated until the output from differential amplifier 705 becomes zero (minimized). The tilt servo system in the radial direction is implemented by this operation.

The tilt servo system in the tangential direction has the following arrangement. The photodetection outputs obtained by the two-division cells of sub-beam 3 detection cell 97 are input to differential amplifier (subtracter) 703. The photodetection outputs obtained by the two-division cells of sub-beam 4 detection cell 99 are input to differential amplifier (subtracter) 704. The outputs from differential amplifiers 703 and 704 are input to differential amplifier (comparator) 706.

If the state of sub-beam 3 detected by the two-division cells of sub-beam 3 detection cell 97 is identical to the state of sub-beam 4 detected by the two-division cells of sub-beam 4 detection cell 99, the two signals input to differential amplifier 706 are at the same level. In this case, the output from differential amplifier 706 is zero (or a minimum value).

Since comae having opposite polarities are given to sub-beams 3 and 4, when a tilt (tangential tilt) occurs in the circumferential direction of the medium (disk), the main peak of one sub-beam decreases, and its side lobe increases. In addition, the main peak of the other sub-beam increases, and its side lobe decreases. As a consequence, the levels of two signals input to differential amplifier 706 change in accordance with the direction and magnitude of the tangential tilt that has occurred. As a result, differential amplifier 706 outputs a tangential servo control signal having a polarity corresponding to the direction of the tangential tilt and corresponding to the magnitude of the tangential tilt.

When this control signal is current-amplified by amplifier 708 as needed and supplied to tangential tilt correction driving coil 74, the optical system (50 to 60) tilts in the direction to decrease the tangential tilt that has occurred (the tilt between the optical system and the surface of the recording layer of the disk in the tangential direction). This operation is repeated until the output from differential amplifier 706 becomes zero (minimized). The tilt servo system in the tangential direction is implemented by this operation.

Tilt detection/correction control circuit system (tilt servo system) 700 in FIG. 13 is comprised of a first circuit group (701, 702, 705, 707) constituting the above radial tilt servo system and a second circuit group (703, 704, 706, 708) constituting the tangential tilt servo system.

Figure 14:
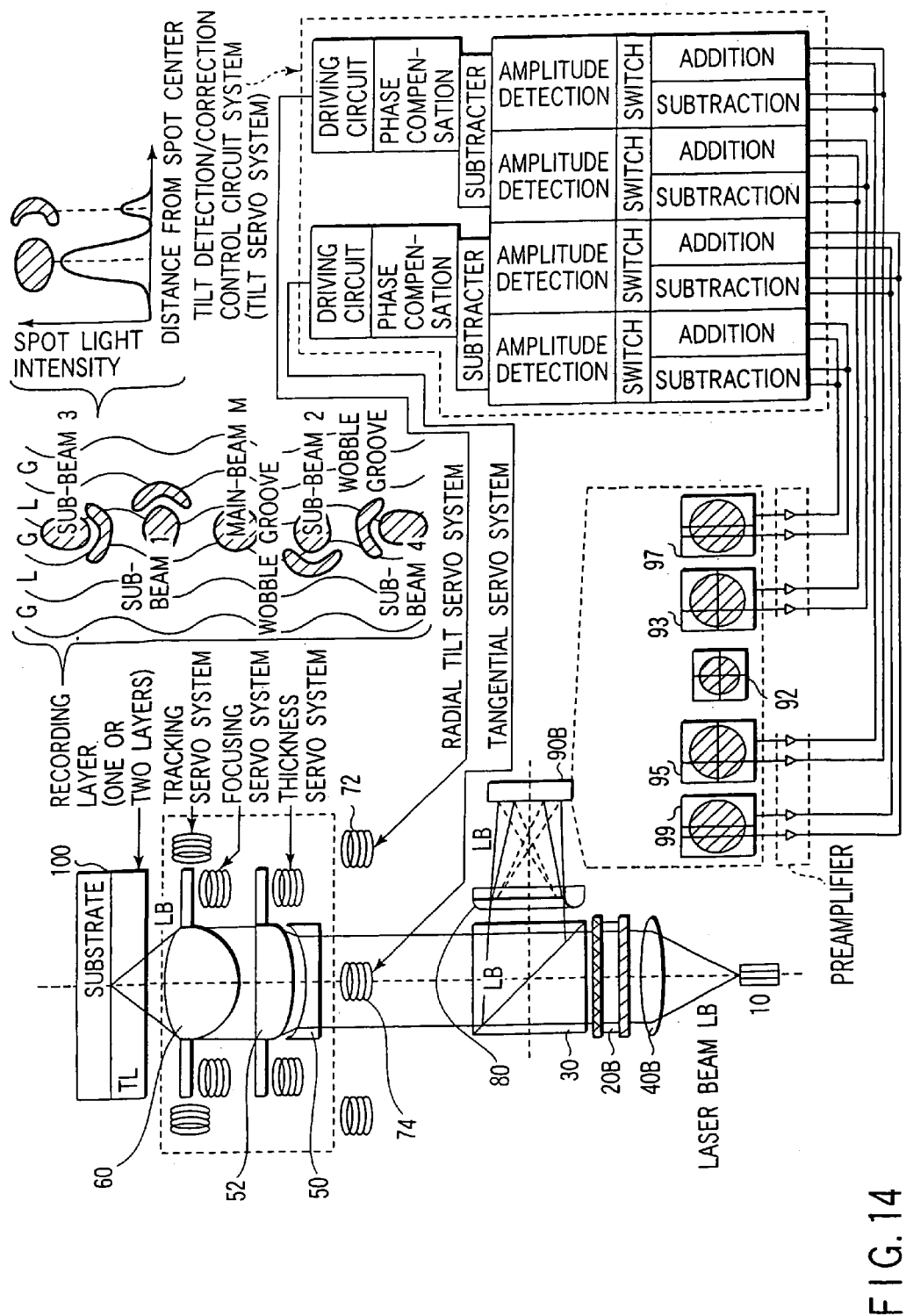
FIG. 14 is a view showing a case where each of a radial tilt servo system and tangential tilt servo is formed in the same manner as the thickness servo system shown in FIG. 7.

FIG. 14 shows an example of how each of the radial tilt servo system and tangential tilt servo system in FIG. 13 is formed to have an arrangement similar to that of the thickness servo system in FIG. 7.

Two-division cell outputs from sub-beam 1 detection cell 93 and two-division cell outputs from sub-beam 2 detection cell 95 are supplied to a first circuit block group having an arrangement similar to that of the internal circuit (217, 218, 221, 222, 241, 242, 261, 262, 225, 273, 283) of the thickness servo system in FIG. 7. The connection relationship between the respective blocks constituting the first circuit block group may be the same as that in an internal circuit (217, 218, 221, 222, 241, 242, 261, 262, 225, 273, 283) corresponding to the thickness servo system in FIG. 7. An output from the first circuit block group is supplied as a control output for the radial tilt servo system to radial tilt correction driving coil 72.

Likewise, two-division cell outputs from sub-beam 3 detection cell 97 and two-division cell outputs from sub-beam 4 detection cell 99 are supplied to a second circuit block group having an arrangement similar to that of the internal circuit (217, 218, 221, 222, 241, 242, 261, 262, 225, 273, 283) of the thickness servo system in FIG. 7. The connection relationship between the respective blocks constituting the second circuit block group may be the same as that in an internal circuit (217, 218, 221, 222, 241, 242, 261, 262, 225, 273, 283) corresponding to the thickness servo system in FIG. 7. An output from the second circuit block group is supplied as a control output for the tangential tilt servo system to tangential tilt correction driving coil 74.

Tilt detection/correction control circuit system (tilt servo system) 700 in FIG. 14 is constituted by the first circuit block group of the radial tilt servo system and the second circuit block group of the tangential tilt servo system.

In the embodiment shown in FIG. 6, since a nonparallel laser beam before collimation is input to hologram element 20A, the focused spots of sub-beam A, main beam M, and sub-beam B are arrayed obliquely. In contrast to this, in the embodiment shown in FIG. 14 (or FIG. 13 described above), since a collimated laser beam is input to hologram element 20B, the focused spots of sub-beam 3, sub-beam 1, main beam M, sub-beam 2, and sub-beam 4 are arrayed straight. For this reason, the array of beam detection cell groups 92 to 99 constituting photodetector 90B is straight in correspondence with the array of the focused spots of sub-beam 3, sub-beam 1, main beam M, sub-beam 2, and sub-beam 4.

With this straight array, thickness servo control using spherical aberration described with reference to FIGS. 8A to 8C can be implemented as well as the above radial tilt servo control and/or tangential tilt servo control. As sub-beams used for this thickness servo control, sub-beams 1 and 2 (or sub-beams 3 and 4) can be used in the arrangement shown in FIG. 14 (or FIG. 13). In this case, photodetection outputs corresponding to sub-beams 1 and 2 (or sub-beams 3 and 4) may be supplied to thickness servo system 500.

If, for example, sub-beams 1 and 2 are applied to the arrangement in FIG. 7, thickness servo control (transparent layer thickness irregularity correction operation) functions such that the focused spot area of sub-beam 1 (the focused spot area of the main peak+side lobe area) and the focused spot area of sub-beam 2 (the focused spot area of the main peak+side lobe area) to which spherical aberrations with opposite polarities are given in advance become equal to each other.

Considering a state where the side lobe of each sub-beam is eliminated as a result of tilt servo control (i.e., correction is performed to make the objective lens and the surface of the recording layer of the medium become parallel to each other), thickness servo operation in the arrangement shown in FIG. 14 (or FIG. 13) is substantially the same as that in the arrangement shown in FIG. 6.

In the arrangement shown in FIG. 13 (or FIG. 14 to be described later), collimator lens 40B between laser source 10 and hologram element 20B may be configured to move between beam splitter 30 and the thickness irregularity correction lens system, as shown in FIG. 6. In this case, since a laser beam incident from laser source 10 onto hologram element 20B is nonparallel, the focused spots formed on the surface of the recording layer of the medium do not form a straight array as shown in FIG. 13 (or FIG. 14 or 12), but form an oblique array with respect to the track running direction as shown in FIG. 6 (or FIG. 8) (the degree to which the oblique array tilts depends on the design of each product).

If photodetection outputs corresponding to sub-beams 1 and 2 (or sub-beams 3 and 4) arrayed obliquely in this manner are applied to the arrangement in FIG. 7, thickness servo system 500 can be formed. In addition, a differential push-pull signal used by tracking servo system 400 can be obtained from these sub-beam detection outputs, and a crosstalk cancel signal used by playback signal detection circuit system 300 can be obtained.

Coma detection characteristics based on a coma detection method (used in tilt servo control) will be described next with reference to FIGS. 15 to 18. In this case, wavelength λ in use in a playback optical system is set to 405 nm, the NA value of the objective lens is set to 0.70, and refractive index n of the medium transparent layer is set to 1.67 (or 1.62). In addition, for an playback-only information medium, a playback signal from an embossed pit array in a fine recess/projection (embossed) shape is used, and the track pitch is set to 0.32 μm. For a recordable/playable information medium, land/groove recording is a prerequisite. In this medium, the level difference between each land and each groove is set to λ/8n (or λ/6n); the duty ratio between each land and each groove, 50%; the wobble amplitude, ±10 nm; and the thickness of the medium transparent layer, 0.6 mm.

Figure 15:
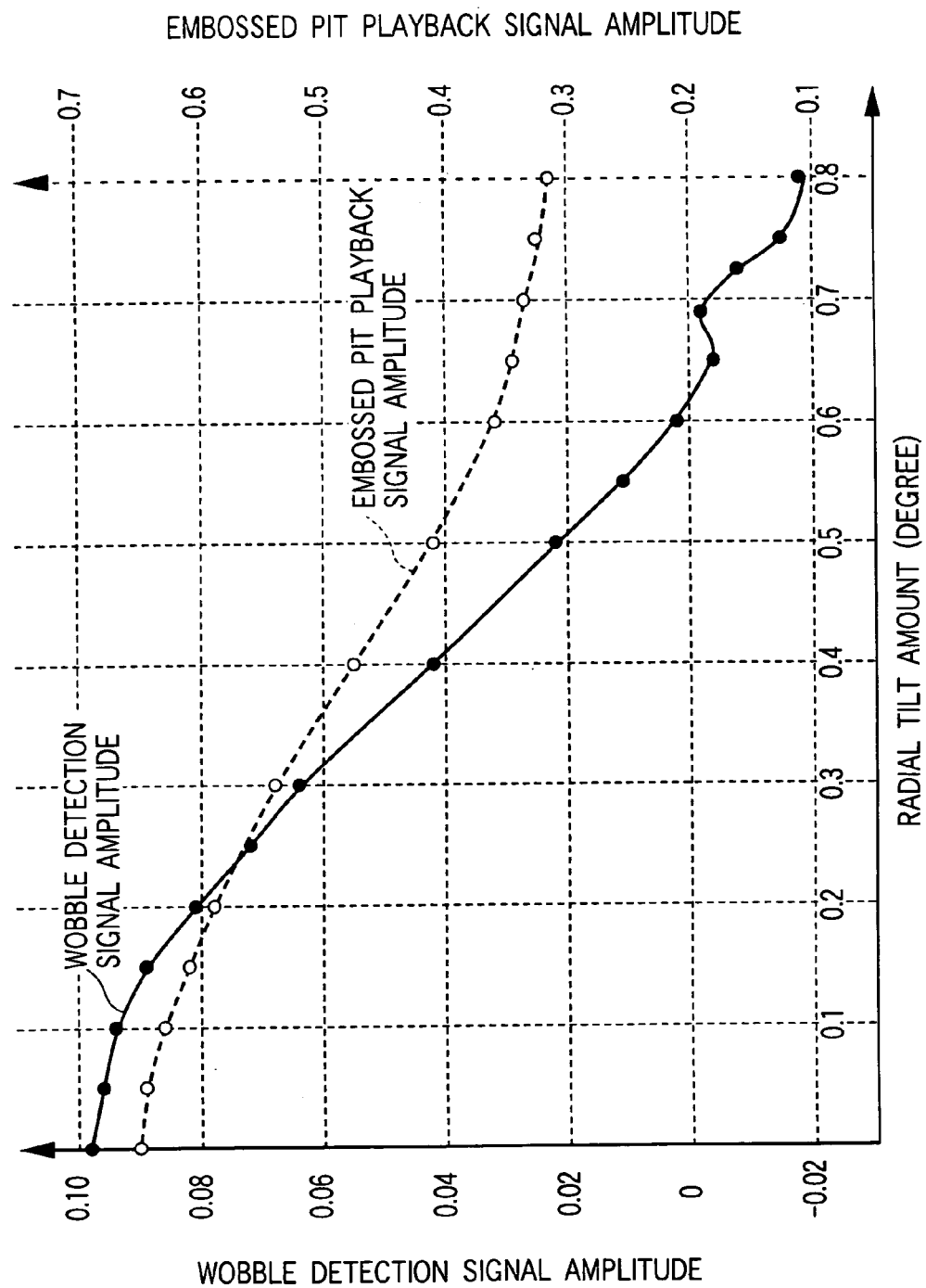
FIG. 15 is a graph showing an example of the relationship between the degree of warpage (radial tilt amount) of an information medium (optical disk) in the radial direction and the wobble detection signal amplitude or embossed pit playback signal amplitude.

FIG. 15 is a graph showing an example of the relationship between the degree of warpage (radial tilt amount) of an information medium (optical disk) in the radial direction and the wobble detection signal amplitude or embossed pit playback signal amplitude. Referring to FIG. 15, the solid curve descending to the lower right indicates the wobble detection signal amplitude (recording/playback disk), and the ordinate on the left side indicates its magnitude. The dashed line descending to the lower right indicates the embossed pit playback signal amplitude (playback-only disk), and the ordinate on the right side indicates its magnitude.

FIG. 15 shows an example of how the "detection signal amplitude from a wobble groove" and "embossed pit playback signal amplitude" which are obtained from sub-beams (1, 2) change with respect to the tilt amount (radial tilt amount) of information medium (disk) 100 in the radial direction in a case wherein no aberration (coma) is given to the sub-beams (1, 2).

As described above, as the focused spot size decreases, the detection signal amplitude from a wobble groove of a recording track increases (in a recording/playback disk), and the playback signal amplitude from a recorded mark or embossed pit in the form of a recess/projection increases (in a playback-only disk). This phenomenon is also shown in FIG. 15. That is, as the tilt amount increases, the focused spot shape becomes elliptic and the spot size increases in the elongating direction. Therefore, as the tilt amount increases, the "detection signal amplitude from the wobble groove" and embossed pit playback signal amplitude" decrease. (The direction in which the radial tilt amount increases in FIG. 15 may be regarded as the direction in which the focused spot size increases).

The example shown in FIG. 15 indicates the following. In either recording/playback disk or playback-only disk, as the tilt amount increases, the focused spot size increases, resulting in a reduction in corresponding detection signal. The degree of change in detection signal with a change in tilt amount varies depending on the magnitude of the tilt amount. In some range of changes in tilt amount (0.1° or less or 0.7° or more), the detection signal does not change much even with a change in tilt amount. In the other range of changes in tilt amount (about 0.2° to 0.6°), the detection signal changes with high sensitivity with a change in tilt amount.

To efficiently detect a change in tilt amount from a change in the above detection signal ("detection signal amplitude from wobble groove" and/or "embossed pit playback signal amplitude"), a portion exhibiting a high rate of change in detection signal with a change in tilt amount (a large gradient portion of the solid or dashed curve in FIG. 15) is preferably used. In the case shown in FIG. 15, to use a portion exhibiting a high rage of change in detection signal with a change in tilt amount, coma may be given to sub-beams (1, 2) in advance by using hologram element 20B in FIG. 13 or 14 such that signal detection is performed near 0.4° (the range of about ±0.3° with respect to 0.3° to 0.5° from a broad point of view).

Assume that a coma of about 0.3° to 0.5° (more specifically, about 0.4°) is given to sub-beams (1, 2) in advance by using hologram element 20B in FIG. 13 or 14. In this case, when the parallelism between the objective lens and the recording surface of the disk deteriorates, a relatively large tilt amount is detected accordingly. As a consequence, a control current of a magnitude and direction corresponding to this detected tilt amount is supplied from tilt servo system 700 to radial tilt correction driving coil 72, thereby performing servo operation to restore the parallelism between the objective lens and the recording surface of the disk.

Tilt servo system 700 in FIG. 13 or 14 which performs such radial tilt servo operation may be designed to perform normal information recording or playback even with, for example, a maximum tilt of ±0.7° in the radial direction of information medium (disk) 100.

Figure 16:
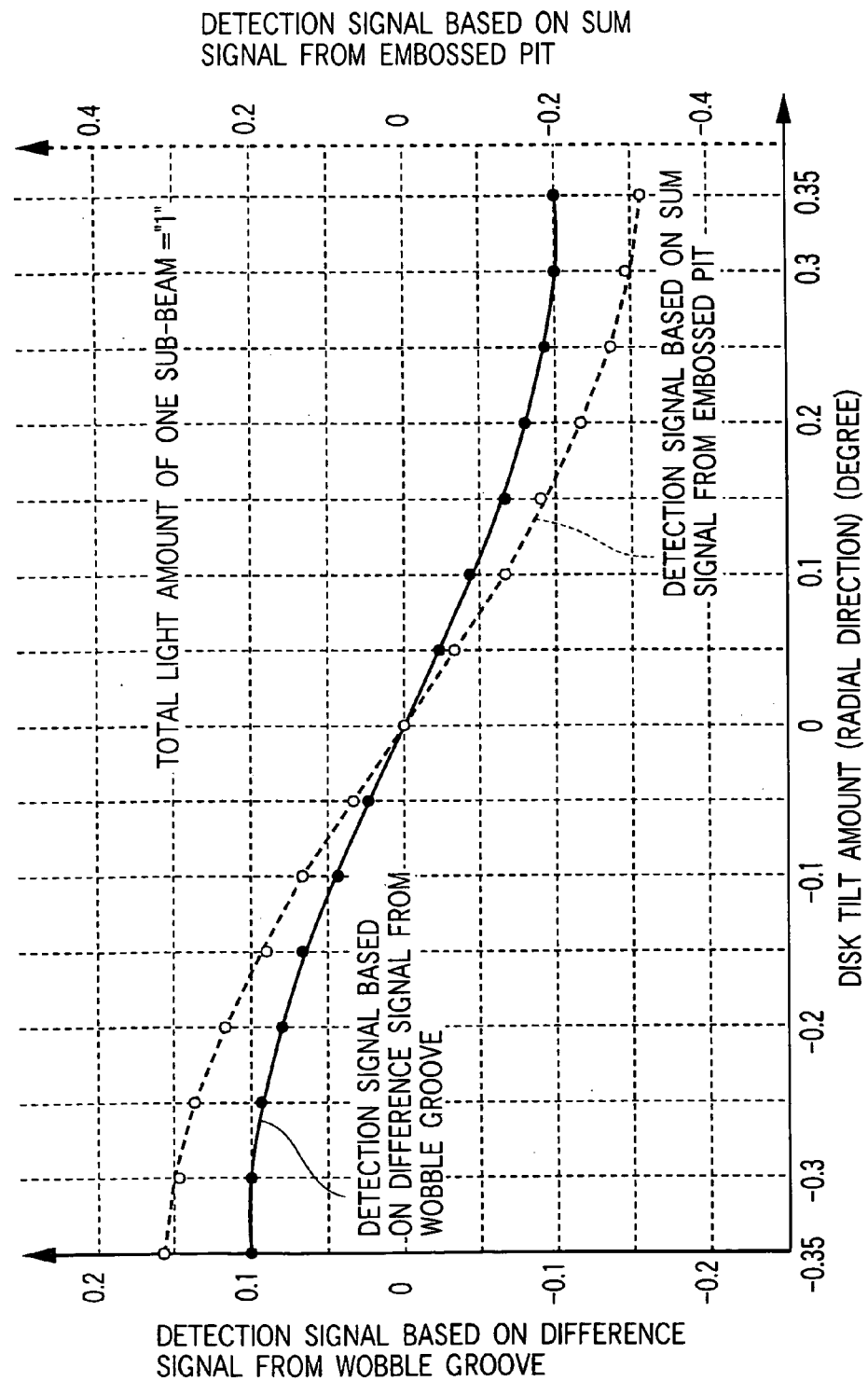
FIG. 16 is a graph showing an example of the relationship between the degree of warpage (radial tilt amount) of an information medium (optical disk) in the radial direction and the detection signal based on a wobble groove difference signal or the detection signal based on the sum signal of an embossed pit.

FIG. 16 is a graph showing an example of the relationship between the degree of warpage (radial tilt amount) of an information medium (disk) in the radial direction and the detection signal based on a difference signal from a wobble groove or the detection signal based on a sum signal from an embossed pit. Referring to FIG. 16, the solid curve descending to the lower right represents the detection signal (recording/playback disk) based on the difference signal from the wobble groove, and the ordinate on the right side indicates its magnitude. The dashed curve descending to the lower right represents the detection signal (playback-only disk) based on the sum signal from the embossed pit, and the ordinate on the right side indicates its magnitude.

FIG. 16 shows an example of how the "detection signal based on the difference signal from the wobble groove" and "playback signal based on the embossed pit sum signal", which are obtained from sub-beams (1, 2), change in accordance with the tilt amount (radial tilt amount) of information medium (disk) 100 in the radial direction when no aberration (coma) is given to the sub-beams (1, 2).

Tilt servo system 700 using the changes shown in FIG. 15 can use the detection result obtained by sub-beam detection cell 93 or 95 without any change. Tilt servo system 700 using the changes shown in FIG. 16 uses the difference between the detection results obtained by sub-beam detection cells 93 and 95 (for a recording/playback disk having wobble grooves) or the sum of the detection results obtained by sub-beam detection cells 93 and 95 (for a playback-only disk having embossed pits). In this case, assuming that the total light amount of one sub-beam (the light amount of the main peak+the light amount of the slide lobe) is "1", a point where the difference (or sum) between the detection signals from sub-beam detection cells 93 and 95 becomes zero without any radial tilt of the disk is set at the starting point of radial tilt servo operation.

As described above, sub-beams (1, 2) are given in advance comae with opposite polarities by hologram element 20B in FIG. 13 or 14. For this reason, when a radial tilt occurs, the coma for one sub-beam is canceled out by the radial tilt, and the coma for the other sub-beam is increased. As a consequence, tilt servo system 700 obtains the "detection signal based on a difference signal from the wobble groove" or "playback signal based on a sum signal from the embossed pit" with a polarity and magnitude corresponding to the detection amount of tilt caused. When a control current corresponding to the "detection signal based on the difference signal from the wobble groove" or "playback signal based on the embossed pit sum signal" is supplied to radial tilt correction driving coil 72, servo operation is performed to cancel out the radial tilt.

The example shown in FIG. 16 indicates the following. In either case where a difference signal from a wobble groove is used for tilt detection or case where an embossed pit sum signal is used for tilt detection, the radial tilt detection signal characteristics of the information medium can be stably obtained over a wide range of ±0.35° or more. Therefore, normal information recording/playback can be performed by tilt servo system 700 in FIG. 13 or 14 which performs radial tilt servo operation using the changes shown in FIG. 16 even if a tilt of ±0.35° or more occurs in the radial direction of information medium (disk) 100.

Figure 17:
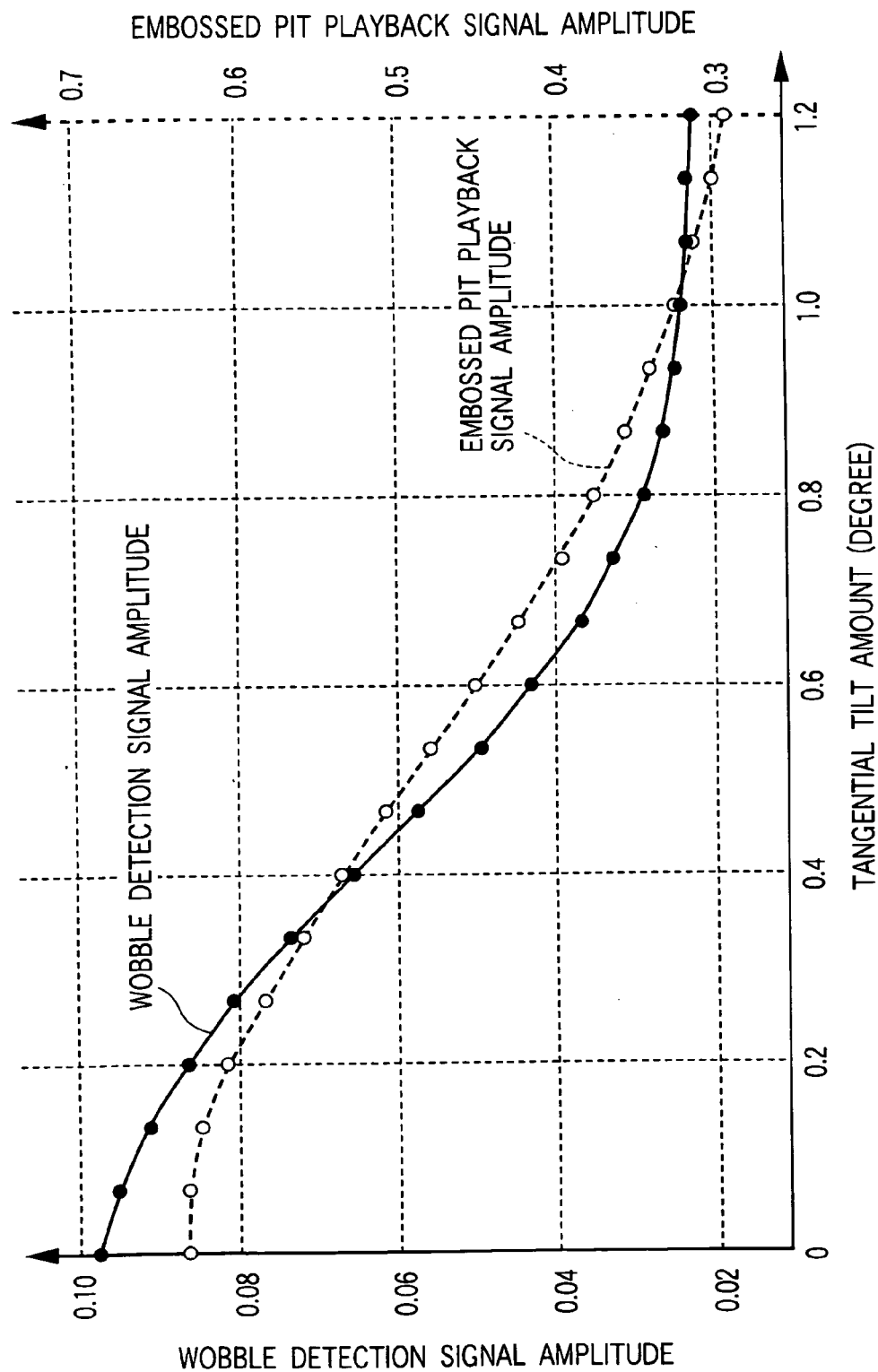
FIG. 17 is a graph showing an example of the relationship between the degree of warpage (tangential tilt amount) of an information medium (optical disk) in the circumferential direction and the wobble detection signal amplitude or embossed pit playback signal amplitude.

FIG. 17 is a graph showing an example of the relationship between the degree of warpage (tangential tilt amount) of an information medium (optical disk) in the circumferential direction and the wobble detection signal amplitude or embossed pit playback signal amplitude. Referring to FIG. 17, the solid curve descending to the lower right indicates the wobble detection signal amplitude (recording/playback disk), and the ordinate on the left side indicates its magnitude. The dashed line descending to the lower right indicates the embossed pit playback signal amplitude (playback-only disk), and the ordinate on the right side indicates its magnitude.

FIG. 17 shows an example of how the "detection signal amplitude from a wobble groove" and "embossed pit playback signal amplitude" which are obtained from sub-beams (3, 4) change with respect to the tilt amount (tangential tilt amount) of information medium (disk) 100 in the circumferential direction in a case wherein no aberration (coma) is given to the sub-beams (3, 4).

As described above, as the focused spot size decreases, the detection signal amplitude from a wobble groove of a recording track increases (in a recording/playback disk), and the playback signal amplitude from a recorded mark or embossed pit in the form of a recess/projection increases (in a playback-only disk). This phenomenon is also shown in FIG. 17. That is, as the tilt amount increases, the focused spot shape becomes elliptic and the spot size increases in the elongating direction. Therefore, as the tilt amount increases, the "detection signal amplitude from the wobble groove" and embossed pit playback signal amplitude" decrease. (The direction in which the tangential tilt amount increases in FIG. 17 may be regarded as the direction in which the focused spot size increases).

The example shown in FIG. 17 indicates the following. In either recording/playback disk or playback-only disk, as the tilt amount increases, the focused spot size increases, resulting in a reduction in corresponding detection signal. The degree of change in detection signal with a change in tilt amount varies depending on the magnitude of the tilt amount. In some range of changes in tilt amount (0.2° or less or 0.8° or more), the detection signal does not change much even with a change in tilt amount. In the other range of changes in tilt amount (about 0.3° to 0.7°), the detection signal changes with high sensitivity with a change in tilt amount.

To efficiently detect a change in tilt amount from a change in the above detection signal ("detection signal amplitude from wobble groove" and/or "embossed pit playback signal amplitude"), a portion exhibiting a high rate of change in detection signal with a change in tilt amount (a large gradient portion of the solid or dashed curve in FIG. 17) is preferably used. In the case shown in FIG. 17, to use a portion exhibiting a high rage of change in detection signal with a change in tilt amount, coma may be given to sub-beams (3, 4) in advance by using hologram element 20B in FIG. 13 or 14 such that signal detection is performed near 0.5° (the range of about ±0.4° with respect to 0.4° to 0.6° from a broad point of view).

Assume that a coma of about 0.4° to 0.6° (more specifically, about 0.5°) is given to sub-beams (3, 4) in advance by using hologram element 20B in FIG. 13 or 14. In this case, when the parallelism between the objective lens and the recording surface of the disk deteriorates, a relatively large tilt amount is detected accordingly. As a consequence, a control current of a magnitude and direction corresponding to this detected tilt amount is supplied from tilt servo system 700 to tangential tilt correction driving coil 74, thereby performing servo operation to restore the parallelism between the objective lens and the recording surface of the disk.

Tilt servo system 700 in FIG. 13 or 14 which performs such tangential tilt servo operation may be designed to perform normal information recording or playback even with, for example, a maximum tilt of ±0.3° in the tangential direction of information medium (disk) 100.

Figure 18:
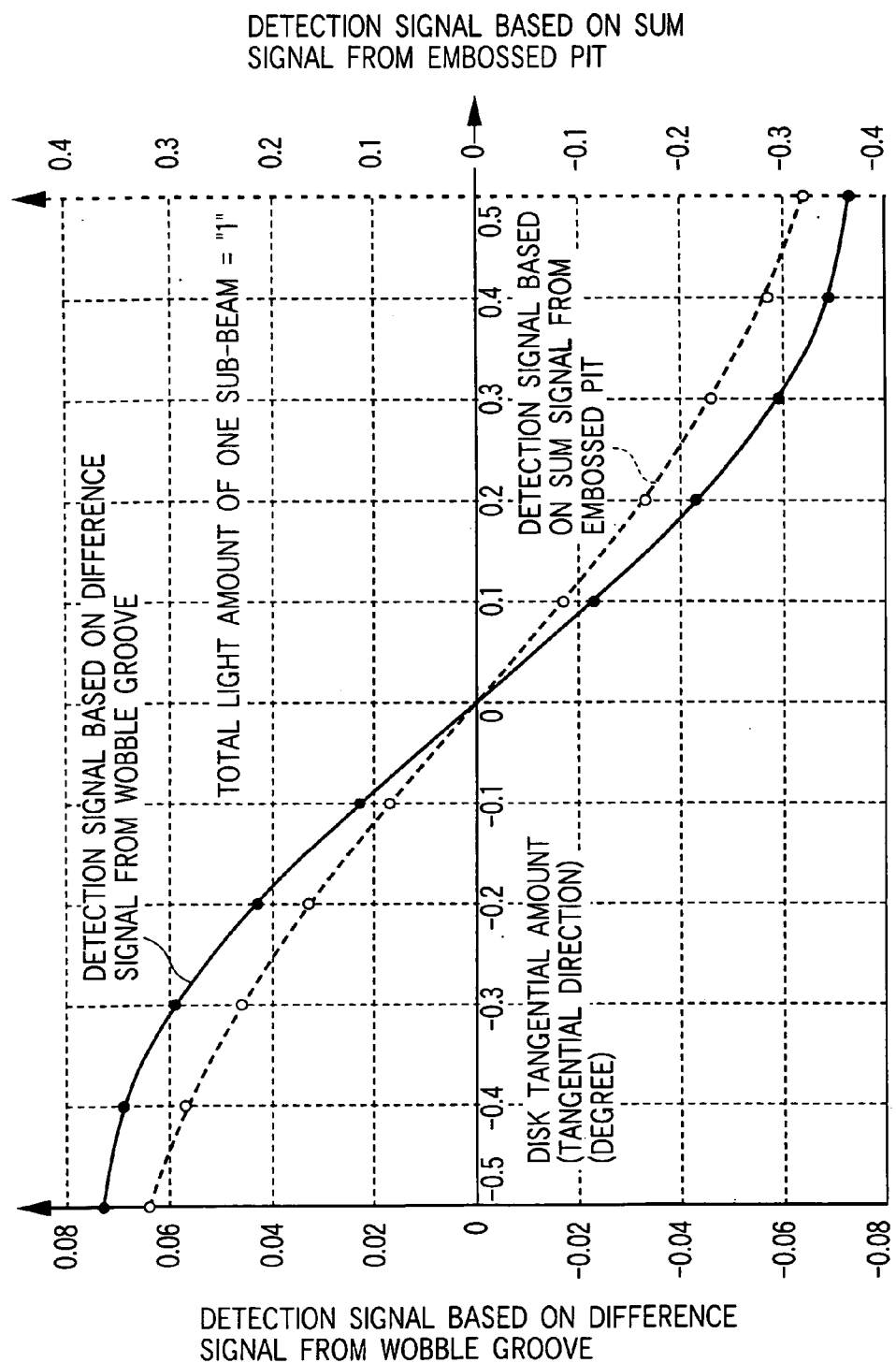
FIG. 18 is a graph showing an example of the relationship between the degree of warpage (tangential tilt amount) of an information medium (optical disk) in the circumferential direction and the detection signal based on a wobble groove difference signal or the detection signal based on the sum signal of an embossed pit.

FIG. 18 is a graph showing an example of the relationship between the degree of warpage (tangential tilt amount) of an information medium (disk) in the circumferential direction and the detection signal based on a difference signal from a wobble groove or the detection signal based on a sum signal from an embossed pit. Referring to FIG. 18, the solid curve descending to the lower right represents the detection signal (recording/playback disk) based on the difference signal from the wobble groove, and the ordinate on the right side indicates its magnitude. The dashed curve descending to the lower right represents the detection signal (playback-only disk) based on the sum signal from the embossed pit, and the ordinate on the right side indicates its magnitude.

FIG. 18 shows an example of how the "detection signal based on the difference signal from the wobble groove" and "playback signal based on the embossed pit sum signal", which are obtained from sub-beams (3, 4), change in accordance with the tilt amount (tangential tilt amount) of information medium (disk) 100 in the circumferential direction when no aberration (coma) is given to the sub-beams (3, 4).

Tilt servo system 700 using the changes shown in FIG. 17 can use the detection result obtained by sub-beam detection cell 97 or 99 without any change. Tilt servo system 700 using the changes shown in FIG. 18 uses the difference between the detection results obtained by sub-beam detection cells 97 and 99 (for a recording/playback disk having wobble grooves) or the sum of the detection results obtained by sub-beam detection cells 97 and 99 (for a playback-only disk having embossed pits). In this case, assuming that the total light amount of one sub-beam (the light amount of the main peak+the light amount of the slide lobe) is "1", a point where the difference (or sum) between the detection signals from sub-beam detection cells 97 and 99 becomes zero without any tangential tilt of the disk is set at the starting point of tangential tilt servo operation.

As described above, sub-beams (3, 4) are given in advance comae with opposite polarities by hologram element 20B in FIG. 13 or 14. For this reason, when a tangential tilt occurs, the coma for one sub-beam is canceled out by the tangential tilt, and the coma for the other sub-beam is increased. As a consequence, tilt servo system 700 obtains the "detection signal based on a difference signal from the wobble groove" or "playback signal based on a sum signal from the embossed pit" with a polarity and magnitude corresponding to the detection amount of tilt caused. When a control current corresponding to the "detection signal based on the difference signal from the wobble groove" or "playback signal based on the embossed pit sum signal" is supplied to tangential tilt correction driving coil 74, servo operation is performed to cancel out the tangential tilt.

The example shown in FIG. 18 indicates the following. In either case where a difference signal from a wobble groove is used for tilt detection or case where an embossed pit sum signal is used for tilt detection, the tangential tilt detection signal characteristics of the information medium can be stably obtained over a wide range of ±0.5° or more. Therefore, normal information recording/playback can be performed by tilt servo system 700 in FIG. 13 or 14 which performs tangential tilt servo operation using the changes shown in FIG. 18 even if a tilt of ±0.3° to ±0.5° or more occurs in the tangential direction of information medium (disk) 100.

No method has been known before the present invention, which can separately and accurately detect the tilt amounts of an information medium (disk) in biaxial directions, i.e., the radial direction and circumferential (tangential) direction before the present invention. Tilt amounts in the biaxial directions can be separately and accurately detected by using the principle of the embodiment of the present invention (the tilt detection or tilt servo system using coma) described with reference to FIGS. 11 to 18.

Figure 19:
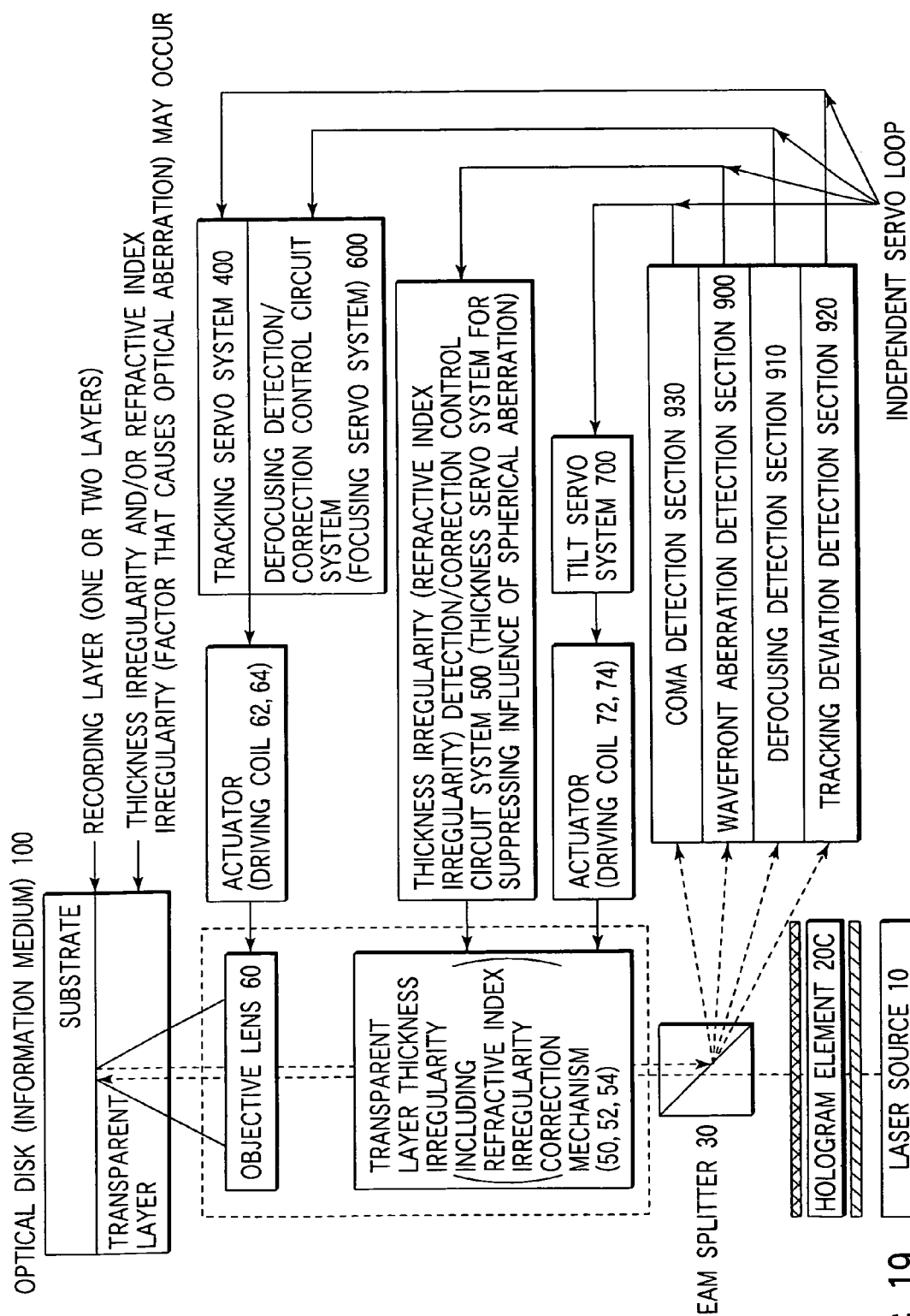
FIG. 19 is a block diagram showing a tracking servo system, thickness servo system, focusing servo system, and tilt servo system which are independent of each other and extracted from a combination of the arrangement in FIG. 6 and the arrangement in FIG. 13 or 14 (in this case, a single-sided treated hologram element 20A in FIG. 6 is replaced with double-sided treated hologram element 20C, and beam detection cells 92 to 99 in FIG. 13 or 14 are obliquely arranged like beam detection cells 92 to 96 in FIG. 6)

FIG. 19 is a block diagram showing a tracking servo system, thickness servo system, focusing servo system, and tilt servo system which are independent of each other in a case where the arrangement shown in FIG. 6 is combined with the arrangement shown in FIG. 13 or 14 (in this case, single-sided hologram element 20A in FIG. 6 is replaced with double-sided hologram element 20C, and beam detection cells 92 to 99 in FIG. 13 or 14 are arranged obliquely like beam detection cells 92 to 96 in FIG. 6).

In the above arrangement in FIG. 13 or 14, since the laser beam incident on hologram element 20B is collimated by collimator lens 40B, two types of (four) sub-beams 1 to 4 generated by the first and second holograms are focused on the surface of the recording layer of optical disk 100 linearly along the track direction (tangential direction). For this reason, detection cells 92 to 99 for the focused spots (including side lobes) of sub-beams 1 to 4 with main beam M being located at the middle point are also aligned.

If the laser beam incident on hologram element 20B is not collimated, as in the case (sub-beams A and B) shown in FIG. 6, the focused spots of sub-beams 1 to 4 are focused obliquely on the surface of the recording layer of optical disk 100 toward the track direction (tangential direction) (an example of an array of focused spots is not shown). In this case, detection cells 92 to 99 for the focused spots (including side lobes) of sub-beams 1 to 4 with main beam M being located at the middle point are also arranged obliquely (not shown).

When detection cells 92 to 99 corresponding to main beam M and sub-beams 1 to 4 are arranged obliquely in this manner, detection signals from two or more cells (cells 93 and 95 and/or cells 97 and 99) of detection cells 92 to 99 corresponding to main beam M and sub-beams 1 to 4 can be used for the same purpose as for the detection signals obtained by sub-beam detection cells 94 and 96 in FIG. 6. More specifically, a detection signal for thickness servo control, a crosstalk cancel (CTC) signal, a differential push-pull (DPP) signal for tracking servo control, and the like can be extracted from detection signals from two or more cells (e.g., detection signals from cells 93 and 95) of detection cells 92 to 99 which are obliquely arranged.

In other words, when detection cells 92 to 99 corresponding to main beam M and sub-beams 1 to 4 are arranged obliquely, the apparatus can have the function of performing tilt servo control (radial tilt servo control and/or tangential tilt servo control) as well as the function of the apparatus shown in FIG. 6 (tracking servo control, thickness servo control, focusing servo control, DPP, CTC, and the like). In this case, the tracking servo, thickness servo, focusing servo, and tilt servo systems can be formed as independent servo systems.

FIG. 19 shows an example of a system arrangement having the four types of servo systems described above. The detection output from defocusing detection section 910 constituted by main beam detection four-division cell 92 in FIG. 13 or 14 is sent as an independent servo loop to focusing servo system 600 having an arrangement like the one shown in FIG. 7. The detection output from defocusing detection section 910 formed by main beam detection four-division cell 92 (sub-beam detection two-division cells 1 and 2 or sub-beam detection two-division cells 3 and 4 when the differential push-pull method is used) is sent as an independent servo loop to tracking servo system 400 having an arrangement like the one shown in FIG. 7. The detection output from wavefront aberration (spherical aberration) detection section 900 constituted by sub-beam detection two-division cells 1 and 2 (or 3 and 4) is sent as an independent servo loop to thickness servo system 500 having an arrangement like the one shown in FIG. 7. The detection output from a coma detection section 930 formed by sub-beam detection two-division cells 1 and 2 and/or sub-beam detection two-division cells 3 and 4 is sent as an independent servo loop to tilt servo system 700 having an arrangement like the one shown in FIG. 14.

FIG. 20 is a view for explaining a method of inspecting the thickness irregularity amount of the transparent layer of an information medium by using a wavefront aberration analyzer (wavefront aberration analyzing unit). This method allows the use of an existing interferometer system (e.g., a zeigo interferometer). In this system, a wavefront aberration analyzer 1014 calculates root mean square RMS of a wavefront aberration factor from the optical pattern on target disk 100 (to be inspected) which is detected by CCD monitor 1012.

More specifically, a coherent laser beam from laser source 1000 is converted into a parallel laser beam by collimator lens 1002. Part of this parallel laser beam is incident on the recording layer (reflecting layer) of disk 100 through beam splitter 1004, optical system 1006 for suppressing optical aberrations, objective lens 1008, and the transparent protective layer of target disk 100. The laser beam is then reflected by the recording layer. The other part of the parallel laser beam is sent to mirror 1010 from beam splitter 1004 and reflected by it.

The spot size of the parallel laser beam obtained from laser source 1000 through collimator lens 1002 is increased up to the pupil diameter of objective lens 1008. The wavefront aberration of objective lens 1008 is managed within 0.02 $\lambda$rms. In addition, optical system 1006 placed between beam splitter 1004 and objective lens 1008 is calibrated by a standard optical disk whose thickness is accurately managed to a specified value (0.1 mm in this case) such that the total wavefront aberration of the optical system is managed within 0.01 $\lambda$rms (management values of 0.01 $\lambda$rms and 0.02 $\lambda$rms are sample values of wavefront aberrations, and hence other wavefront aberration values may be arbitrarily used). In addition, a blue laser whose wavelength $\lambda$ is, for example, 405±10 nm is used as laser source 1000, and an objective lens whose numerical value NA is, for example, 0.85±0.01 is used as objective lens 1008 ($\lambda$=405 nm and NA=0.85 are merely examples, and hence other values may be arbitrarily used as $\lambda$ and/or NA).

The laser beam reflected by the recording layer (reflecting layer) of disk 100 is guided to the light-receiving surface (not shown) of CCD monitor 1012 through the transparent layer of disk 100, objective lens 1008, optical system 1006, and beam splitter 1004. Meanwhile, the laser beam reflected by mirror 1010 is also sent to the light-receiving surface (not shown) of CCD monitor 1012 through beam splitter 1004. The laser beam (influenced by the optical aberration caused by the optical system and disk transparent layer) reflected by the recording layer (reflecting layer) of disk 100 interferes with the laser beam reflected by mirror 1010 to produce an interference fringe pattern reflecting the influence of the optical aberration. This interference fringe pattern is projected onto the light-receiving surface of CCD monitor 1012.

The interference fringe pattern (optical pattern) projected on the light-receiving surface of CCD monitor 1012 is analyzed by wavefront aberration analyzer 1014. Spherical aberration components due to the thickness irregularity and/or refractive index irregularity of the disk transparent layer are extracted from the analysis result and output. The data output from wavefront aberration analyzer 1014 in this manner is the rms value of spherical aberration including the influence of aberrations in the double-path with respect to the transparent layer of disk 100. A noncontact, nondestructive inspection can be made on the thickness irregularity of the transparent protective layer of target disk 100 by converting the double-path data (the rms value of spherical aberration) obtained in this case into single-path data (a method of conversion to single-path data will be described later with reference to FIG. 21).

Although the system in FIG. 20 requires accurately calibrated optical system 1006 and objective lens 1008 with a small aberration, proven existing devices can be used as CCD monitor 1012, wavefront aberration analyzer 1014, and the like. This makes it possible to construct a highly reliable system at a relatively low cost.

Figure 21:
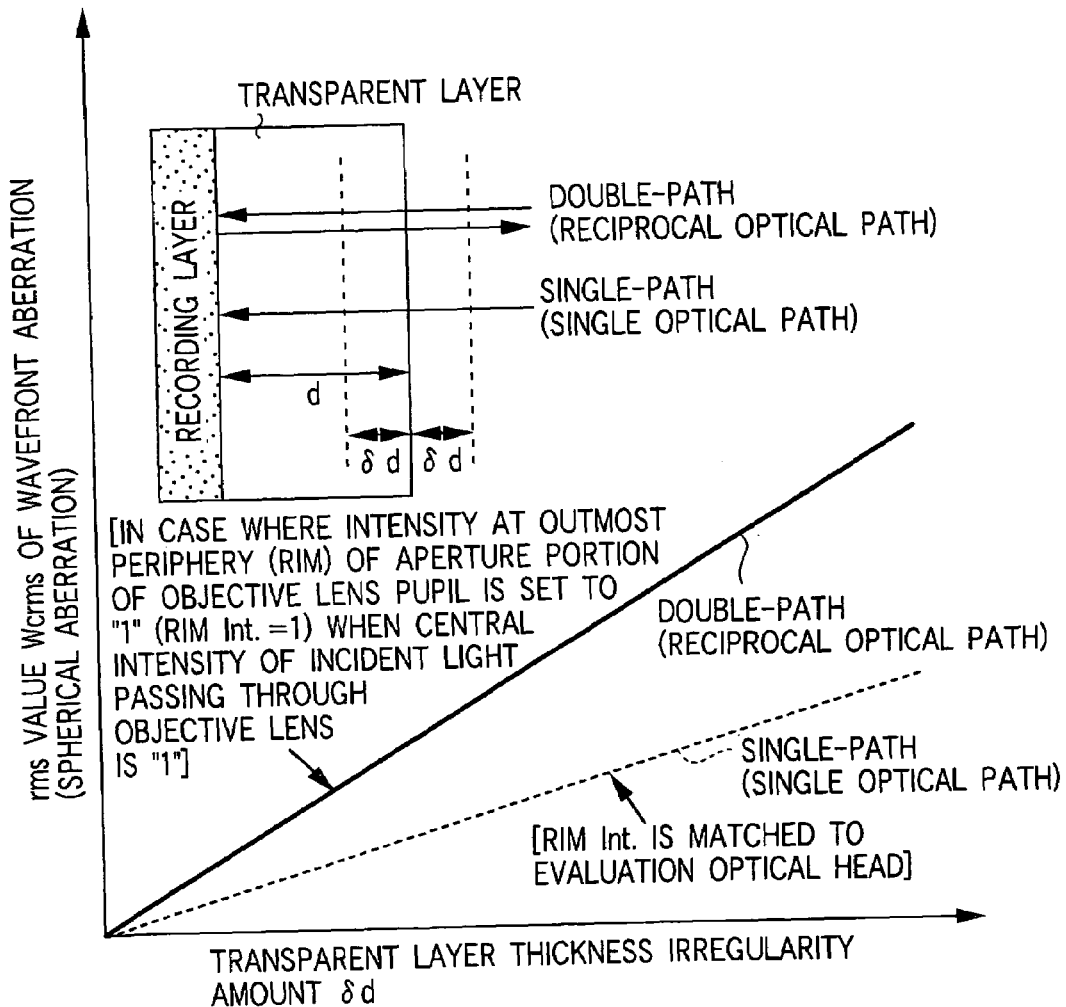
FIG. 21 is a graph showing the relationship between the rms value (Wcrms) of wavefront aberration (spherical aberration) obtained by the inspection method shown in FIG. 20 and thickness irregularity amount δd of a medium transparent layer.

FIG. 21 is a graph showing the relationship between the rms value (Wcrms) of wavefront aberration (spherical aberration) obtained by the inspection method in FIG. 20 and thickness irregularity amount $\delta$d of the medium transparent layer. The output data from wavefront aberration analyzer 1014 in FIG. 20 is obtained from the laser beam that has made a double trip to the disk transparent layer, and has a relationship like that indicated by the solid curve (double-path) in FIG. 21. Substitution of predetermined values into refractive index n and numerical aperture NA in equation (8) given above yields $\delta$d=k·Wcrms (k is a proportional constant). The dashed curve (single-path) in FIG. 21 represents the relationship of $\delta$d=k·Wcrms.

Referring to FIG. 21, the solid curve with the large gradient indicates an example of the relationship between Wcrms and $\delta$d in the double-path (reciprocal optical path of the laser beam passing through the disk transparent layer) when the rim intensity is set to "1" (RIM Int.=1). In this case, the rim intensity "1" (RIM Int.=1) indicates a case where the intensity of light at the outmost periphery of the aperture portion of the objective lens pupil becomes "1" when the central intensity of incident light passing through the objective lens is "1". That is, the rim intensity "1" (RIM Int.=1) indicates a case where light with uniform intensity is incident on the overall objective lens pupil.

The dashed curve with the small gradient indicates an example of the relationship between Wcrms and $\delta$d in the single-path (a single optical path of the laser beam passing through the disk transparent layer) when the rim intensity is adjusted according to an optical head for evaluation. Referring to FIG. 21, if the conditions remain unchanged, the gradient of the dashed curve corresponding to the single-path becomes ½ that of the solid curve corresponding to the double-path. Therefore, the data obtained by wavefront aberration analyzer 1014 in the case of the double-path can be easily converted into data in the single-path (by only reducing the double-path data to ½).

Letting "A" be the diameter (Aperture) of the objective lens pupil and "W" be the "e−2 width" when the central intensity of incident light passing through the objective lens is "1" (the width of a portion where the light intensity becomes "exp(−2)", i.e., 0.135334 . . . when the central intensity of a focused spot is "1"), "A/W" can be used in the same manner as the rim intensity (RIM Int.). This "A/W" will be referred to as a beam filling ratio.

When light exhibiting a uniform intensity distribution from the center of the objective lens to its periphery is incident on the objective lens (RIM Int.=1), "e−2 width"

increases. As a consequence, the value of beam filling ratio "A/W" approaches "0". In contrast to this, as "e−2 width" decreases, the value of "A/W" increases. If the "e−2 width" of light passing through the objective lens pupil is decreased to increase the value of "A/W", since the intensity at the rim (RIM) position of the objective lens pupil decreases, the rim intensity (RIM Int.) also decreases. Since there is a correspondence between beam filling ratio "A/W" and the rim intensity (RIM Int.) as described above, for example, an evaluation optical head with "A/W"=0.7 can be matched with the dashed curve in FIG. 21.

The thickness irregularity (δd) of the disk transparent layer can be calculated from the solid curve in FIG. 21 on the basis of the output data from wavefront aberration analyzer 1014 in FIG. 20. The actual spherical aberration in the single-path can be obtained from the dashed curve in FIG. 21. The spherical aberration of the optical head to be used can be obtained from the rms value of the actual spherical aberration.

The transparent protective layer of disk 100 to be actually mass-produced may include refractive index irregularity due to materials (polycarbonate and the like) forming the transparent layer as well as thickness irregularity. For this reason, the aberrations of the disk transparent layer can be influenced by refractive index irregularity as well as thickness irregularity. In the description made with reference to FIGS. 20 and 21, however, in order to avoid complexity, aberrations due to transparent layer thickness irregularity are assumed in consideration of the influence of refractive index irregularity (or regarding that no refractive index irregularity is present).

The thickness irregularity value of the disk transparent layer obtained by the method shown in FIGS. 20 and 21 does not necessarily indicate only thickness irregularity in disks to be actually mass-produced. However, since certain errors are expected in disks to be actually mass-produced, the method of inspecting (measuring) transparent layer thickness irregularity in consideration of the influence of refractive index irregularity (or regarding that no refractive index irregularity is present) is satisfactorily practical. From the viewpoint of managing the overall aberration influences due to variations in mass-produced disks within a predetermined value, the method in FIGS. 20 and 21 which allows management of thickness irregularity of transparent layers in consideration of the influence of refractive index irregularity can be very effective.

The "method of detecting the thickness irregularity of a medium transparent layer by detecting wavefront aberration", which uses the arrangement shown in FIG. 20 and the relationship in FIG. 21 can be summarized as follows. The spherical aberration of the medium transparent layer in the double-path is detected from the output from wavefront aberration analyzer 1014 in FIG. 20 (wavefront aberration or data obtained by extracting a spherical aberration component from the wavefront aberration). The Wcrms value of the detected spherical aberration (or wavefront aberration) is matched with the single-path line in FIG. 21 (or the double-path data is converted into single-path data), thus obtaining the thickness irregularity (and/or the refractive index irregularity of the medium transparent layer) of the medium transparent layer.

Figure 22:
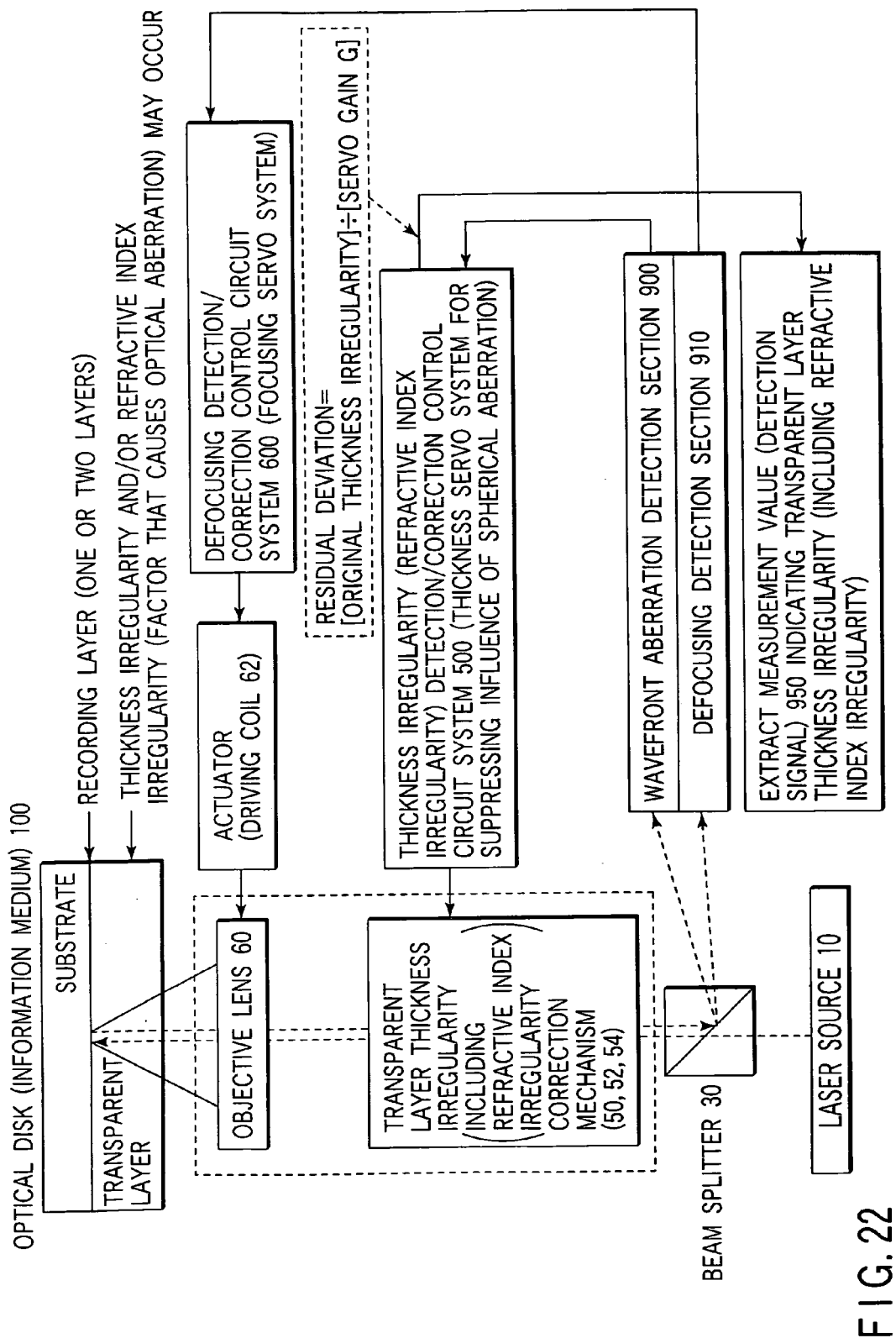
FIG. 22 is a view for explaining an arrangement for extracting measurement value 950 corresponding to thickness irregularity amount δd of a medium transparent layer from the thickness servo system independent of the remaining servo systems.

FIG. 22 is a view for explaining an arrangement for extracting measurement value 950 corresponding to thickness irregularity amount δd of the medium transparent layer from the thickness servo system independent of other servo systems. Referring to FIG. 20 described above, the thickness irregularity and/or refractive index irregularity of the medium transparent layer is obtained from the analysis result obtained by wavefront aberration (spherical aberration) analyzer 1014. In contrast to this, the thickness irregularity and/or refractive index irregularity of the medium transparent layer can be obtained from the residual deviation in thickness servo control implementing an independent servo system. FIG. 22 shows the arrangement of this system.

The arrangement in FIG. 22 is the same as that in FIG. 10 except for a portion for extracting thickness irregularity measurement value 950. For this reason, all the contents described with reference to FIG. 10 can be applied to the arrangement in FIG. 22 except for the portion for extracting thickness irregularity measurement value 950. The same reference numerals as in FIG. 10 denote the same parts in FIG. 22, and a description thereof will be simplified.

The residual deviation that is left in thickness servo system 500 with gain G after the servo operations of focusing servo system 600 and thickness servo system 500 are stabilized is equivalent to the value obtained by dividing the thickness irregularity and/or refractive index irregularity of the medium transparent layer (only the thickness irregularity when the refractive index irregularity is to be neglected) by servo gain G (i.e., residual deviation=original thickness irregularity÷servo gain G). For this reason, the thickness irregularity of the medium transparent layer (the thickness irregularity and refractive index irregularity of the medium transparent layer when the refractive index irregularity is not neglected) can be obtained from residual deviation×servo gain G by using thickness irregularity measurement value (thickness irregularity detection signal; current or voltage value) 950 from thickness servo system 500 included in the arrangement shown in FIG. 22 (more specifically, FIGS. 6 and 7).

From another viewpoint, the residual deviation amount in thickness servo control for managing the thickness irregularity (and/or refractive index irregularity) of the medium transparent layer within a predetermined value can be determined or defined by the following method:

determining the residual deviation amount with the rms value of wavefront aberration (e.g., within 0.07 λrms); and defining the residual deviation (current or voltage value) from δd after aberration correction (δd obtained from FIG. 21 or equation (8)).

According to a method different from the method used in the system shown in FIG. 20, the thickness irregularity of the medium transparent layer obtained from thickness irregularity measurement value 950 corresponds to δd obtained from equation (8) or the single-path line in FIG. 21. More specifically, in managing the wavefront aberration (or spherical aberration) of the medium transparent layer within a specific value (e.g., 0.07 λrms), the following two methods are available: a method of managing δd obtained from the arrangement in FIG. 20 and the relationship in FIG. 21 (or the relationship represented by equation (8)) within the specific value (0.07 λrms); and a method of managing the thickness irregularity measurement value (residual deviation×servo gain G) obtained from the arrangement in FIG. 22 within the specific value (0.07 λrms).

Either or both of these methods can be used. For example, the apparatus in FIG. 20 performs a 100% inspection (or sampling inspection) on mass-produced disks first, and then the apparatus in FIG. 22 performs sampling (or 100% inspection) on the mass-produced disks. According to the method in FIG. 20, since disks need not be rotated, thickness irregularity management can be performed in a static state.

According to the method in FIG. 22, since disks are rotated, thickness irregularity management can be performed in a dynamic state.

Figure 23:
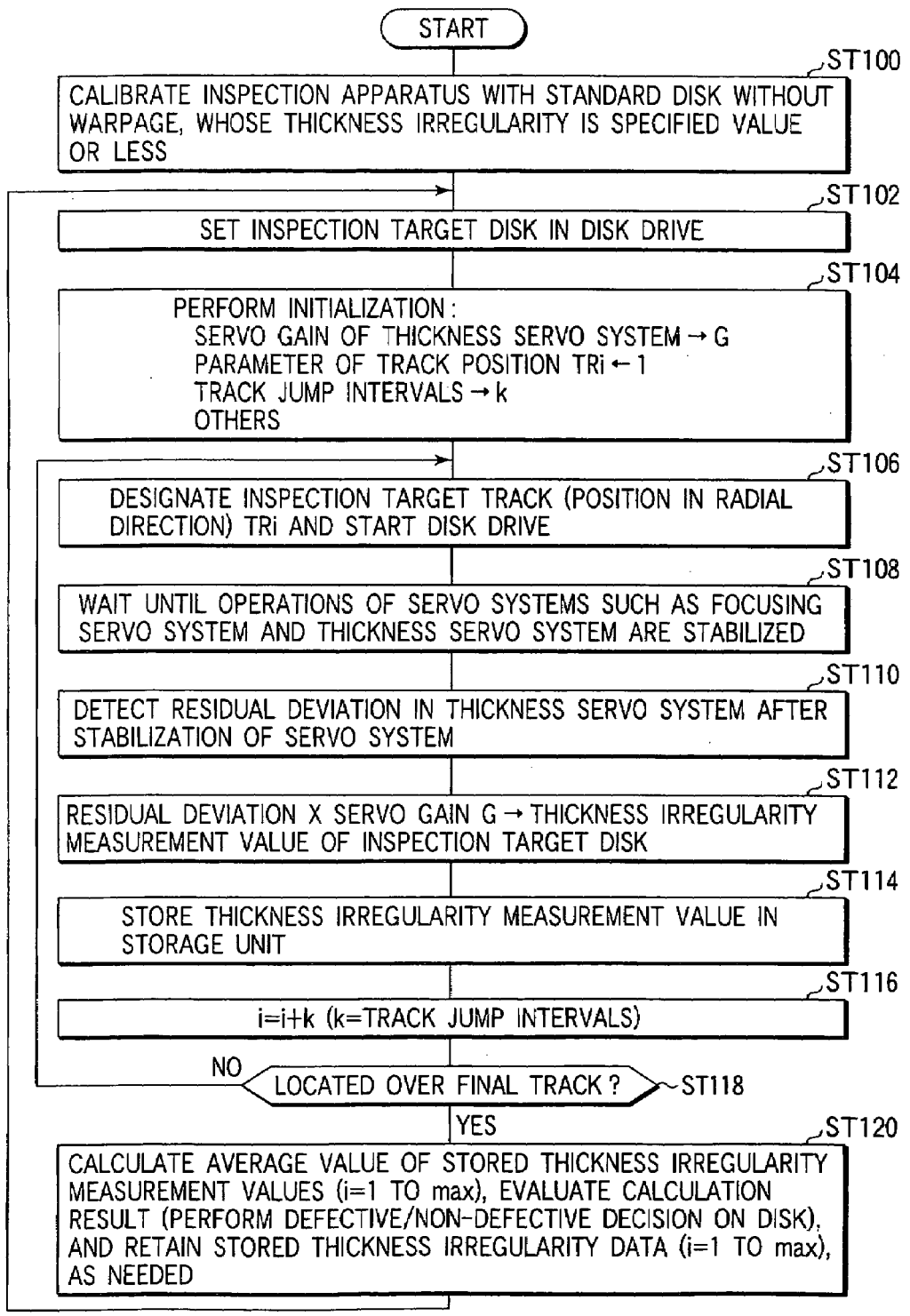
FIG. 23 is a flow chart for explaining a procedure for nondestructively inspecting the thickness irregularity of the transparent layer of an inspection target disk by using thickness irregularity measurement value 950 in FIG. 22 and performing defective/non-defective decision on the thickness irregularity of the transparent layer of the target disk.

FIG. 23 is a flow chart for explaining a procedure for nondestructively inspecting the thickness irregularity of the transparent layer of an inspection target disk by using thickness irregularity measurement value 950 in FIG. 22, and performing defective/non-defective decision about the thickness irregularity of the transparent layer of the target disk.

The procedure in this flow chart can be executed by a combination of a disk drive having an arrangement like the one shown in FIG. 6, 10, or 22 and a computer (personal computer or the like) (not shown).

A standard disk in which the thickness irregularity of the transparent protective layer is equal to or less than a specified value (e.g., the reference thickness of the transparent layer is 0.1 mm, and its thickness irregularity falls within 0.01 λrms) and which is substantially free from warpage in the radial and circumferential directions is set in an inspection apparatus (having a thickness servo system for suppressing the influence of the thickness irregularity of the transparent layer), and the apparatus is calibrated (step ST100).

After this calibration, an inspection target disk (100) having a transparent layer which can be accompanied by thickness irregularity (δd) is set in the disk drive of the inspection apparatus (step ST102). The inspection apparatus is then initialized (step ST104). In this initialization, servo gain G of the thickness servo system (500) of the inspection apparatus is set to a specific value (G=2 to 10000), parameter i of track position TR1 which the optical head is to trace is set to the initial value "1", and track jump intervals k for determining the intervals at which the optical head moves in the radial direction is set to a specific value (if, for example, k=10, a track jump is made at 10-track intervals). Other necessary initialization items are set, if any, in step ST104.

Inspection target track TRi (i=1 at first) is designated to start the disk drive (step ST106). As a consequence, the target disk rotates at a predetermined rotational speed corresponding to designated track position TRi, and the optical head traces track TRi to detect the state of reflected light from an embossed pit (in the case of a playback-only disk) or wobble groove (in the case of a recording/playback disk).

When the photodetector detects the state of the reflected light from the optical head, focusing servo control, thickness servo control, tracking servo control, and the like, which have been described with reference to FIG. 6 and the like, operate, and these servo operations quickly converge to stable states. After the servo operations converge to stable states in this manner (step ST108), for example, the residual deviation in thickness servo control is detected from thickness irregularity measurement value 950 in FIG. 22 (step ST110).

By calculating the product (residual deviation×G) of the residual deviation detected in this manner and the servo gain set in step ST104, the thickness irregularity of the transparent layer of the target disk (at current track TRi) is obtained (step ST112). The transparent layer thickness irregularity measurement value at current track TRi obtained in this manner is stored in the storage unit in the computer (not shown) (step ST114).

When the storage of the transparent layer thickness irregularity measurement value at current track TRi (i=1 at first) of the target disk is completed in the above manner, new inspection target track TRi (i=i+k) is designated (step ST116). If i=1 and k=10 at first, then i=11 in this case. If new inspection target track TRi (i=i+k) is located over the final track (NO in step ST118), the processing loop in steps ST106 to ST116 is executed again. This processing loop in steps ST106 to ST116 is repeated until new inspection target track TRi (i=i+k) is located over the final track.

If new inspection target track TRi (i=i+k) is located over the final track (YES in step ST118), the data of the transparent layer thickness irregularity measurement values on the all tracks of the target disk (although a sampling inspection is performed at k-track intervals) are stored in the storage unit (not shown).

The average value, maximum peak value, and the like of the data of the transparent layer thickness irregularity measurement values stored in this manner are calculated. Evaluation of the calculation results (i.e., defective/non-defective decision on the target disk) is then performed by decision items, e.g., checking whether the calculated average value is equal to or less than the specified value in management for transparent layer thickness irregularity, and/or checking whether the maximum peak value is equal to or less than the upper limit value in terms of a transparent layer thickness irregularity standard. In addition, the data of the transparent layer thickness irregularity measurement values stored in the storage unit (together with the evaluation results, as needed) are backed up in a hard disk or DVD-RAM disk (not shown), as needed (step ST120).

In the above manner, inspections of one target disk and the storage processing of inspection results are completed. If any disk to be inspected is left, the flow returns to step ST102 to repeat the processing in steps ST102 to ST120.

Note that the calibration processing in step ST100 need not always be performed for each inspection target disk. When the processing in FIG. 23 is to be used for thickness irregularity management of mass-produced disks (defective/non-defective decision on disks), the calibration processing in step ST100 may be performed once every time a predetermined number of (e.g., 10,000) disks are subjected to measurement processing (steps ST102 to ST120), or a predetermined period of time (e.g., one hr) as a continuous measurement processing time elapses.

By using the nondestructive inspection method in FIG. 23, the thickness irregularity of the transparent protective layers of mass-produced disks can be managed under actual operating conditions (in a state where a target disk set in the disk drive is rotated/driven, and the servo systems of the drive are activated). In addition, since a nondestructive inspection is performed, all disks that are determined as non-defective products after the inspection can be shipped out as merchandise.

Figure 24:
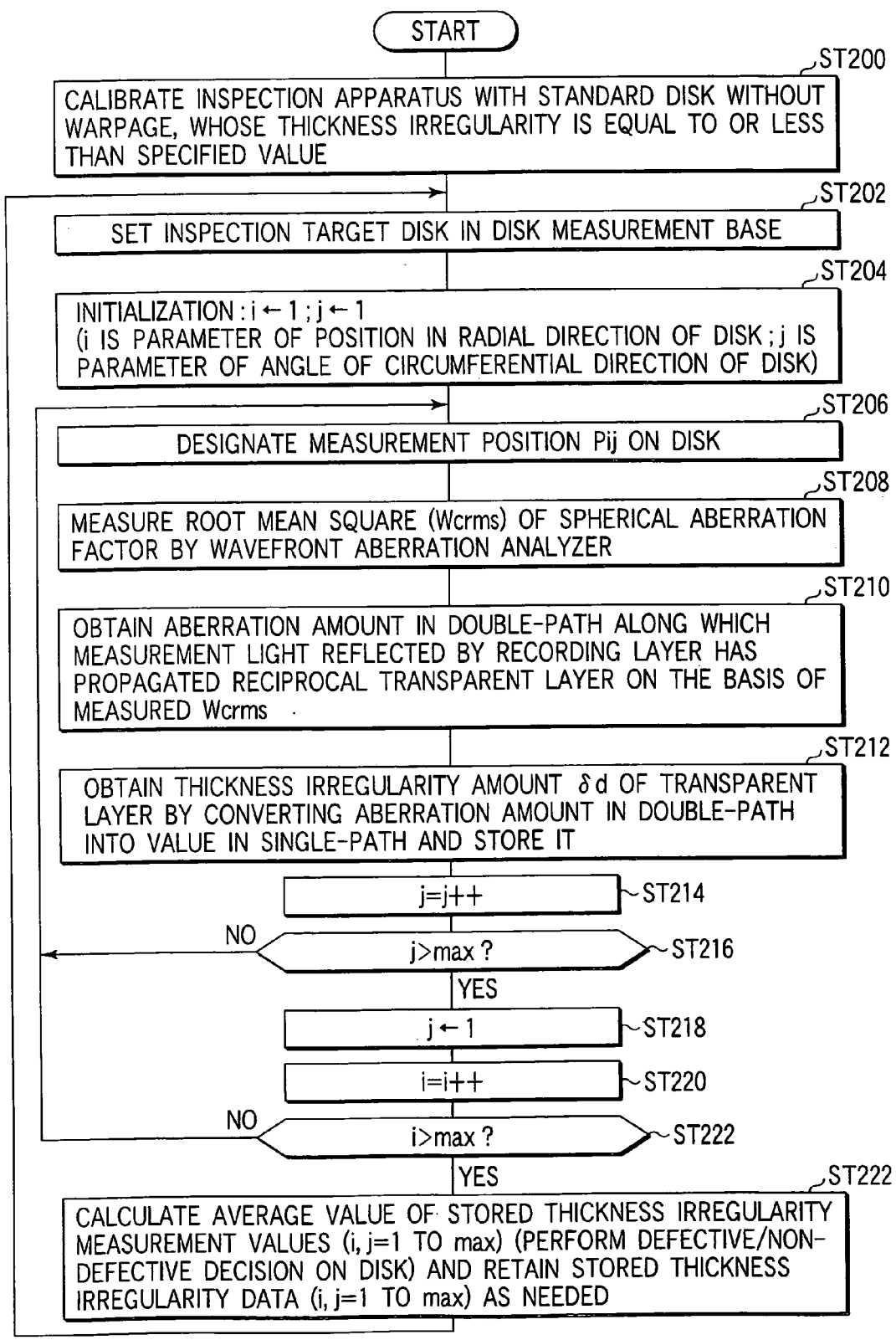
FIG. 24 is a flow chart for explaining a procedure for nondestructively inspecting the thickness irregularity of the transparent layer of an inspection target disk by using the thickness irregularity inspection method in FIG. 20 and performing defective/non-defective decision on the thickness irregularity of the transparent layer of the target disk.

FIG. 24 is a flow chart for explaining a procedure for nondestructively inspecting the thickness irregularity of the transparent layer of an inspection target disk by using the thickness irregularity inspection method in FIG. 20, and performing defective/non-defective decision about the thickness irregularity of the transparent layer of the target disk. The procedure in this flow chart can be executed by a combination of a wavefront aberration analyzing unit having an arrangement like the one shown in FIG. 20 and a computer (e.g., an MPU incorporated in analyzer 1014 in FIG. 20) (not shown).

A standard disk in which the thickness irregularity of the transparent protective layer is equal to or less than a specified value (e.g., the reference thickness of the transparent layer is 0.1 mm, and its thickness irregularity falls within 0.01 λrms) and which is substantially free from warpage in the radial and circumferential directions is set in an inspection apparatus, and the apparatus is calibrated (step ST200).

In this calibration processing, optical system 1006 for controlling an optical aberration in accordance with the original aberration amount of objective lens 1008 is adjusted to optimal conditions.

After this calibration, an inspection target disk (100) having a transparent layer which can be accompanied by thickness irregularity ($\delta d$) is set in the disk drive of the inspection apparatus (step ST202). The inspection apparatus is then initialized (step ST204). In this initialization, position parameter i in the radial direction of the disk and position parameter j in the circumferential direction of the disk are set to initial values (i=1; j=1) to specify a position on the disk at which a laser beam from the optical head is focused.

Subsequently, inspection target position Pij (i=1; j=1 at first) is designated, and a laser beam from the optical head is focused at the position (step ST206). The state of reflected light from inspection target position Pij is projected onto CCD monitor 1012 in FIG. 20. This projection state is analyzed by wavefront aberration analyzer 1014, and the root square mean (Wcrms) of spherical aberration factors is measured from the analysis result (step ST208). An aberration amount in a double-path along which measurement light is reflected by the recording layer of the medium and double-trips to the medium transparent layer is obtained from Wcrms measured in this manner (step ST210). The obtained aberration amount in the double-path is converted into an aberration in a single-path, and transparent layer thickness irregularity $\delta d$ is obtained from the converted value according to the relationship in FIG. 21 (the relationship represented by equation (8)) given above). Transparent layer thickness irregularity $\delta d$ obtained in this manner is stored in the storage unit in the computer (not shown) (step ST212).

When the storage of the transparent layer thickness irregularity measurement value of the target disk at inspection target position Pij is completed in this manner, new inspection target position Pij (i=1; j=2 in this case) is designated (step ST214). If new inspection target position Pij (i=1; j=2) is not located over the final position (jmax) on the target disk with i=1 (NO in step ST216), the processing loop in steps ST206 to ST214 is executed again. The processing loop in steps ST206 to ST214 is repeated until new inspection target position Pij is located over the final position (i=1; j=jmax) with i=1.

If inspection target position Pij is located over the final position (jmax) on the target disk in the circumferential direction with i=1 (YES in step ST216), position parameter j in the circumferential direction is reset to 1 (step ST218), and position parameter i in the radial direction is incremented by one (i=2 in this case) (step ST220). The processing loop in steps ST206 to ST214 is executed again at new position Pij (i=2; j=1). This processing loop is repeated until new inspection target position Pij is located over the final position (i=2; j=jmax) with i=2. In the same manner, subsequently, the processing loop in steps ST206 to ST220 is repeated while i is incremented (step ST220) until inspection target position Pij is located over the final position (imax) on the target disk in the radial direction (NO in step ST222).

If inspection target position Pij is located over the final position (imax) on the target disk in the radial direction (YES in step ST222), acquisition/storage of wavefront aberration data (data of transparent layer thickness irregularity measurement values) over the entire surface of the recording layer of the target disk is completed. The average value, maximum peak value, and the like of the data of the transparent layer thickness irregularity measurement values stored in the storage unit (not shown) are calculated. Evaluation of the calculation results (i.e., defective/non-defective decision on the target disk) is then performed by decision items, e.g., checking whether the calculated average value is equal to or less than the specified value in management for transparent layer thickness irregularity, and/or checking whether the maximum peak value is equal to or less than the upper limit value in terms of a transparent layer thickness irregularity standard. In addition, the data of the transparent layer thickness irregularity measurement values stored in the storage unit (together with the evaluation results, as needed) are backed up in a storage medium such as a hard disk or DVD-RAM disk (not shown), as needed (step ST222).

In the above manner, inspections of one target disk and the storage processing of inspection results are completed. If any disk to be inspected is left, the flow returns to step ST202 to repeat the processing in steps ST202 to ST222.

Note that in the processing in steps ST214 to ST222, increment parameters i and j may be interchanged. That is, i is used as a parameter in steps ST214 to ST218, and j is used as a parameter in steps ST220 to ST222. In addition, the calibration processing in step ST200 need not always be performed for each inspection target disk. The calibration processing in step ST200 may be performed once every time a predetermined number of (e.g., 10,000) disks are subjected to measurement processing (steps ST202 to ST222), or a predetermined period of time (e.g., one hr) as a continuous measurement processing time elapses.

By using the nondestructive inspection method in FIG. 24, the thickness irregularity of the transparent protective layers of target disks can be inspected without rotating/ driving each target disk. For this reason, the inspection (defective/non-defective decision on thickness irregularity) time for each of mass-produced disks can be shortened, contributing to a reduction in media cost. In addition, since in this inspection method, a nondestructive inspection is performed, all disks that are determined as non-defective products after the inspection can be shipped out as merchandise.

Figure 25:
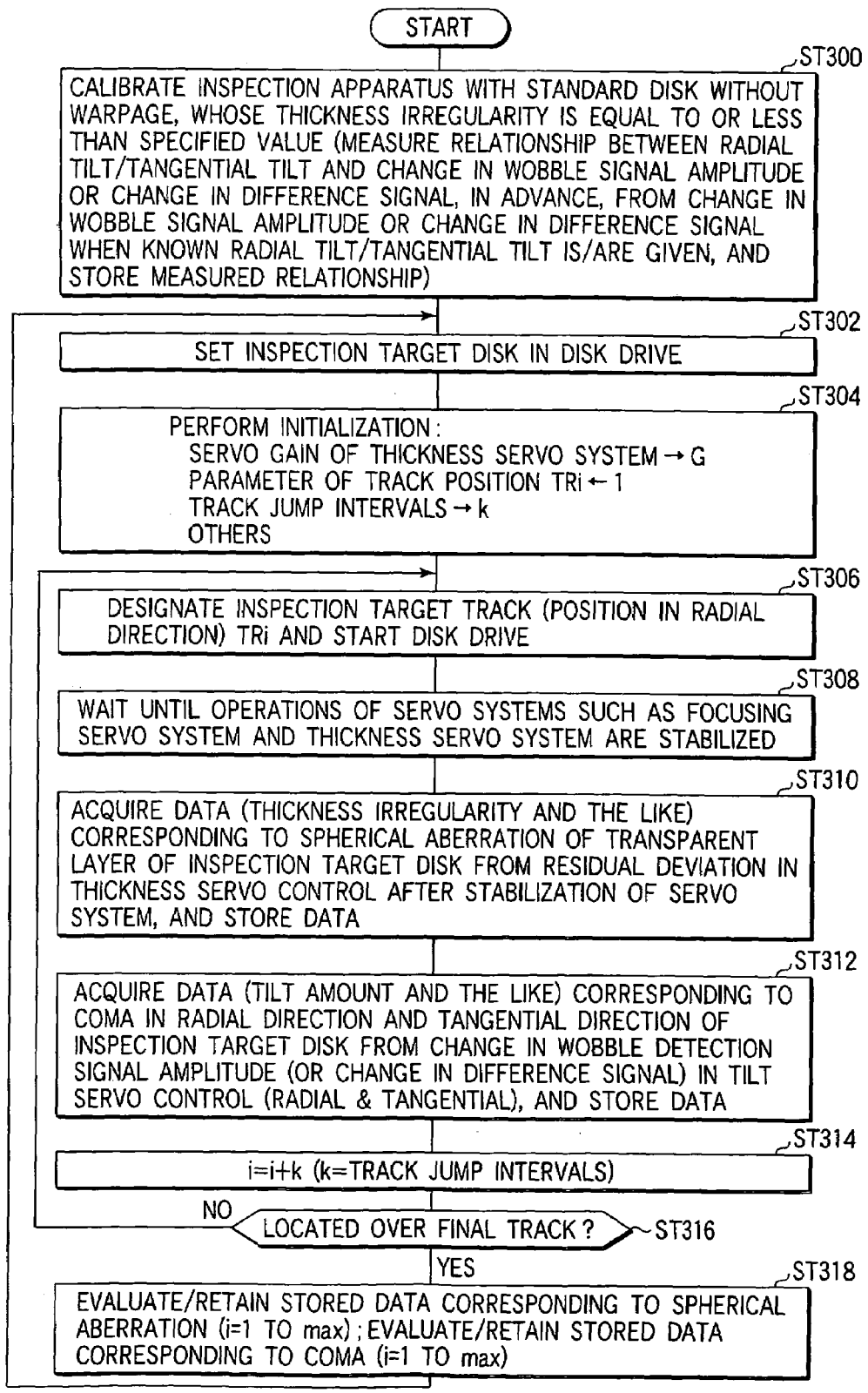
FIG. 25 is a flow chart for explaining a procedure for nondestructively inspecting the thickness irregularity of the transparent layer of an inspection target disk from a residual deviation value (data corresponding to spherical aberration) in the thickness servo system in FIG. 19, and also nondestructively inspecting the warpage state of a target disk from the detection signal (data corresponding to coma) in the tilt servo system in FIG. 19.

FIG. 25 is a flow chart for explaining a procedure for nondestructively inspecting the thickness irregularity of the transparent layer of an inspection target disk from the residual deviation (data corresponding to spherical aberration) in the thickness servo system in FIG. 19, and also nondestructively inspecting the warpage of the target disk from the detection signal (data corresponding to coma) obtained by the tilt servo system in FIG. 19.

The procedure in this flow chart can be executed by a combination of a disk drive having an arrangement like the one shown in FIG. 13, 14, or 19 and a computer (personal computer or the like) (not shown).

A standard disk in which the thickness irregularity of the transparent protective layer is equal to or less than a specified value (e.g., the reference thickness of the transparent layer is 0.1 mm, and its thickness irregularity falls within 0.01 λrms) and which is substantially free from warpage in the radial and circumferential directions is set in an inspection apparatus (having a thickness servo system for suppressing the influence of the thickness irregularity of the transparent layer and a tilt servo system for suppressing the influence of the warpage of the disk), and the apparatus is calibrated (step ST300).

In this calibration processing, even if the warpage of the standard disk itself in use is at a negligible level, when a tilt variation that cannot be neglected is caused in the measurement system owing to a horizontal shift of a disk clamp portion on the drive side, the corresponding portion is also measured in advance as correction data for the measurement system. More specifically, the correspondence between a radial tilt amount and/or tangential tilt amount and a wobble signal amplitude change or its difference signal change is measured in advance from a wobble signal amplitude change or its difference signal change detected when several known radial tilt amount and/or known tangential tilt amounts are provided while a standard disk is loaded in the drive, and the measured data is stored. When the tilt amount of an inspection target disk is to be evaluated by a measurement system including a tilt factor, the stored correspondence data (e.g., the data shown in FIGS. 15 to 18) is used to remove the influence of a tilt caused in the measurement system from the tilt amount of the target disk.

After the above calibration processing, an inspection target disk (100) having a transparent layer that may accompany thickness irregularity (δd) and warpage (warpage in the radial direction and/or warpage in the circumferential direction) is set in the disk drive of the inspection apparatus (step ST302). The inspection apparatus is then initialized (step ST304). In this initialization, servo gain G of the thickness servo system (500) of the inspection apparatus is set to a specific value (G=2 to 10000), parameter i of track position TRi which the optical head is to trace is set to the initial value "1", and track jump intervals k for determining the intervals at which the optical head moves in the radial direction is set to a specific value (if, for example, k=10, a track jump is made at 10-track intervals). Other necessary initialization items (servo gains for the radial tilt servo system and/or tangential tilt servo system and the like) are set, if any, in step ST304.

Inspection target track TRi (i=1 at first) is designated to start the disk drive (step ST306). As a consequence, the target disk rotates at a predetermined rotational speed corresponding to designated track position TRi, and the optical head traces track TRi to detect the state of reflected light from an embossed pit (in the case of a playback-only disk) or wobble groove (in the case of a recording/playback disk).

When the photodetector detects the state of the reflected light from the optical head, focusing servo control, thickness servo control, tracking servo control, radial tilt servo control, tangential tilt servo control, and the like, which have been described with reference to FIGS. 6, 13, and 14 and the like, operate, and these servo operations quickly converge to stable states.

After the servo operations converge to stable states in this manner (step ST308), for example, the residual deviation in thickness servo control is detected from thickness irregularity measurement value 950 in FIG. 22 (step ST310). By calculating the product (residual deviation×G) of the residual deviation detected in this manner and the servo gain set in step ST304, the thickness irregularity of the transparent layer of the target disk (at current track TRi) is obtained (step ST310). The transparent layer thickness irregularity measurement value at current track TRi obtained in this manner is stored in the storage unit in the computer (not shown) (step ST310).

In addition, after the servo operations converge to the stable stages (step ST308), data corresponding to comae in the radial direction and/or tangential direction of the target disk (tilt amounts in the radial direction and/or tangential direction) are obtained from the relationship between the tilt amount and a detection signal in the tilt servo system, i.e., a wobble detection signal amplitude change (or its difference signal change) used in tilt servo control (see FIGS. 15 to 18) (step ST312).

The obtained data are corrected, as needed, by the data of "the correspondence between the tilt amount and the wobble signal amplitude change or its difference signal change which are detected when several known tilts are provided while the standard disk is loaded in the drive" which is stored in advance in the calibration processing in step ST300. The corrected data corresponding to comae in the radial direction and/or tangential direction (tilt amounts in the radial direction and/or the tangential direction) are stored in the storage unit in the computer (not shown) (step ST312).

When the storage of the transparent layer thickness irregularity measurement value and measurement values of radial tilt amount/tangential tilt amount at current track TRi (i=1 at first) of the target disk is completed in the above manner, new inspection target track TRi (i=i+k) is designated (step ST314). If i=1 and k=10 at first, then i=11 in this case. If new inspection target track TRi (i=i+k) is located over the final track (NO in step ST316), the processing loop in steps ST306 to ST314 is executed again. This processing loop in steps ST306 to ST314 is repeated until new inspection target track TRi (i=i+k) is located over the final track.

If new inspection target track TRi (i=i+k) is located over the final track (YES in step ST316), the data of the transparent layer thickness irregularity measurement values and measurement values of radial tilt amount/tangential tilt amount on all the tracks of the target disk (although sampling inspection is performed at k-track intervals) are stored in the storage unit (not shown).

The average value, maximum peak value, and the like of the data of the transparent layer thickness irregularity measurement values and radial tilt amount/tangential tilt amount stored in this manner are calculated. Evaluation of the calculation results (i.e., defective/non-defective decision on the target disk) is then performed by decision items, e.g., checking whether the calculated average value is equal to or less than the specified value in management for transparent layer thickness irregularity or radial tilt amount/tangential tilt amount, and/or checking whether the maximum peak value is equal to or less than the upper limit value in terms of a transparent layer thickness irregularity standard or radial tilt amount/tangential tilt amount. In addition, the data of the transparent layer thickness irregularity measurement values and radial tilt amount/tangential tilt amount stored in the storage unit (together with the evaluation results, as needed) are backed up in a storage medium such as a hard disk or DVD-RAM disk (not shown), as needed (step ST318).

In the above manner, inspections of one target disk and the storage processing of inspection results are completed. If any disk to be inspected is left, the flow returns to step ST302 to repeat the processing in steps ST302 to ST318.

The calibration processing in step ST300 need not always be performed for each inspection target disk. The calibration processing in step ST300 may be performed once every time a predetermined number of (e.g., 10,000) disks are subjected to measurement processing (steps ST302 to ST318), or a predetermined period of time (e.g., one hr) as a continuous measurement processing time elapses.

By using the nondestructive inspection method in FIG. 25, not only the thickness irregularity of the transparent protective layers of mass-produced disks but also the warpage of the disks in the radial direction and/or circumferential direction can be managed at once.

Figure 26:
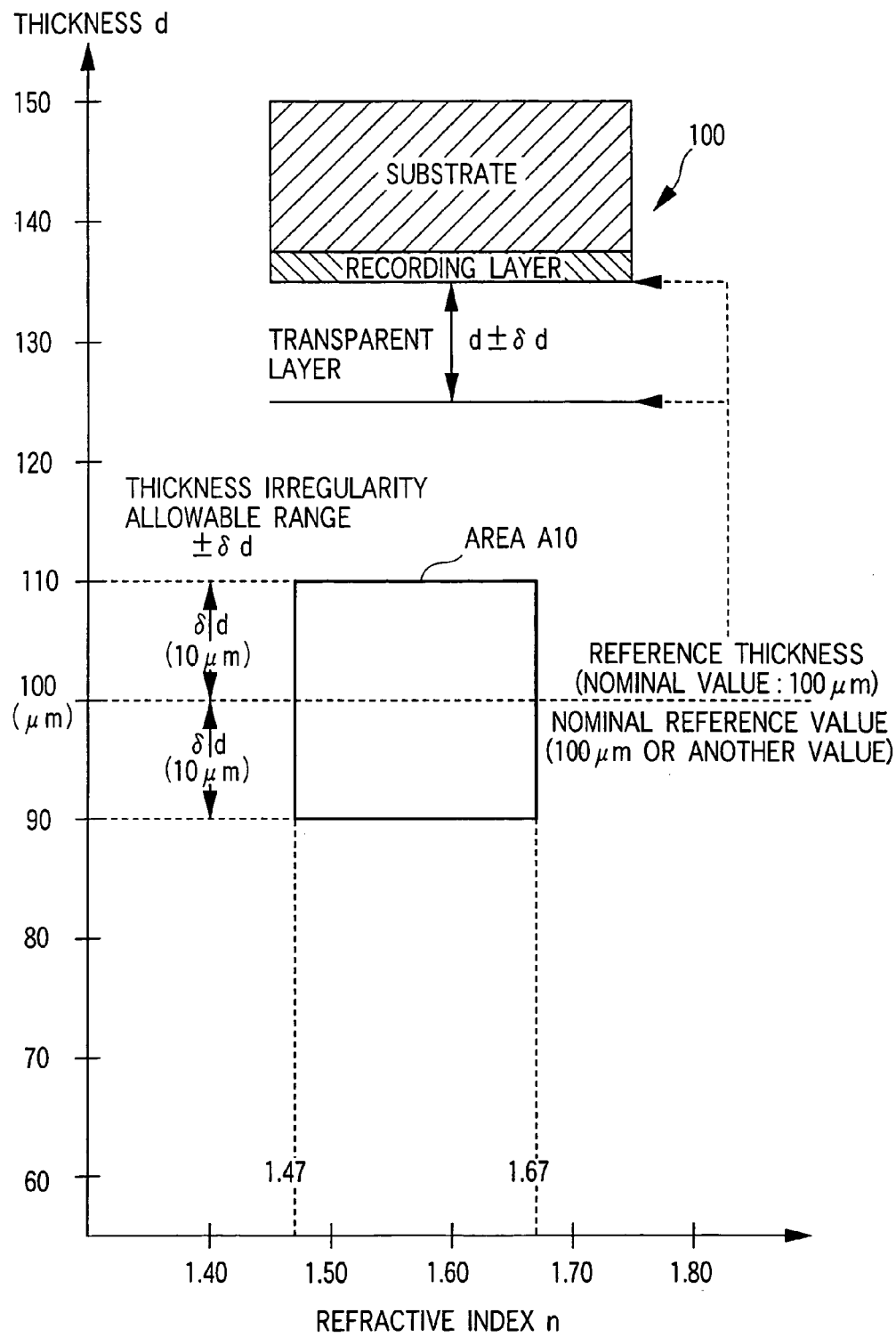
FIG. 26 is a view for explaining a transparent layer thickness irregularity allowable range (example 1) that is set when a transparent layer protecting the recording layer of a single-sided single-layer information medium is made of a material (polycarbonate, acrylic, a carton, or the like) whose refractive index falls within the range of 1.47 to 1.67.

FIG. 26 is a graph for explaining a transparent layer thickness irregularity allowable range (example 1) in a case where a transparent layer protecting the recording layer of an single-sided single-layer information medium is made of a material (polycarbonate, acrylic resin, carton, or the like) whose refractive index falls in the range of 1.47 to 1.67. In this single-sided single-layer information medium, a transparent protective layer is formed on the surface of the recording layer, and a substrate is provided on the lower surface side of the recording layer. This substrate need not always be transparent. Obviously, a transparent substrate may be used, and a label or the like that shields a laser beam may be printed or formed on the surface of the substrate.

FIG. 26 shows that thickness irregularity (variation) δd of the transparent layer is allowed up to ±10 μm when refractive index n of the transparent layer falls in the range of 1.47 to 1.67 in a case where the reference thickness of a medium transparent layer is a nominal value of 100 μm (0.1 mm). Note that the reference value (nominal value) of the transparent layer thickness, 100 μm, is an example, and a value other than 100 μm may be selected as this reference value.

For example, materials corresponding to a rectangular range in FIG. 26 (area A1 where the refractive index range extends from 1.47 to 1.67, and the thickness range extends from 90 μm to 110 μm) are:
  polycarbonate with refractive index n=1.62 at wavelength of 405 nm;
  carton with refractive index n=1.52 at wavelength of 405 nm; and
  acrylic resin (or ultraviolet curing resin/UV curing resin) with refractive index n=1.56 at wavelength of 405 nm.

In a single-sided single-layer information medium (recordable/playable optical disk), reflectance R of an embossed reflecting layer or non-recorded layer is about 15% to 25%. Reflectance R of a recording layer on which information has already been recorded is about 1%. Transmittance T of the recording layer of a single-sided single-layer medium is set to, for example, 0%. That is, in a single-sided single-layer information medium, all light components other than reflected light components (15% to 25%) are absorbed (i.e., absorbance A=75% to 85%).

Figure 27:
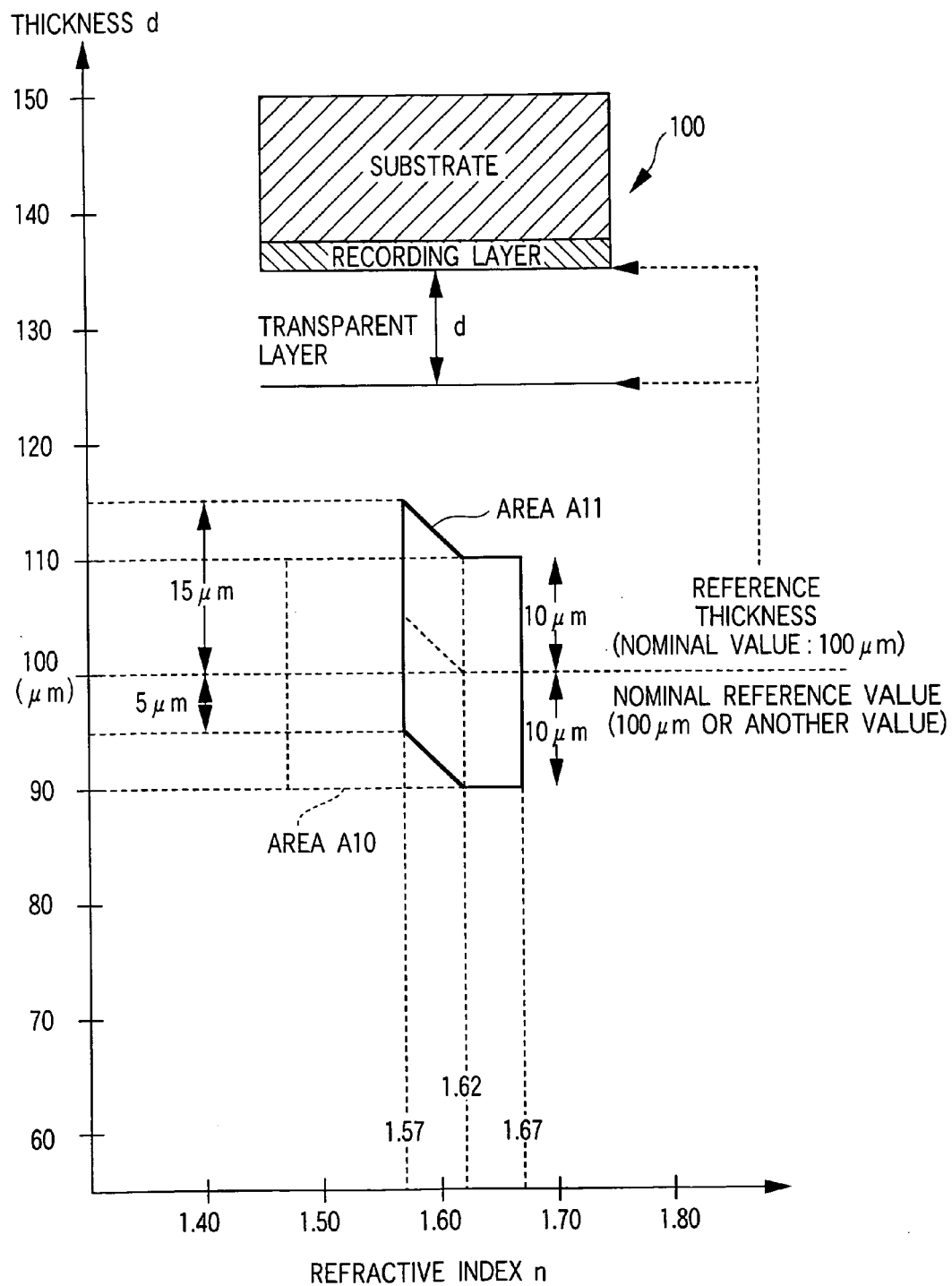
FIG. 27 is a view for explaining a transparent layer thickness irregularity allowable range (example 2) that is set when a transparent layer protecting the recording layer of a single-sided single-layer information medium is made of a material (polycarbonate or the like) whose refractive index falls within the range of 1.57 to 1.67.

FIG. 27 is a graph for explaining a transparent layer thickness irregularity allowable range (example 2) in a case where a transparent layer protecting the recording layer of an single-sided single-layer information medium is made of a material (polycarbonate or the like) whose refractive index falls in the range of 1.57 to 1.67.

FIG. 27 shows that in a case where the reference thickness of a medium transparent layer is a nominal value of 100 μm (0.1 mm), when refractive index n of the transparent layer falls in the range of 1.57 to 1.67, thickness irregularity (variation) δd of the transparent layer is allowed up to ±15 μm/−5 μm on the side where the refractive index is lower than the median value (1.62±0.05) of refractive index, and up to ±10 μm on the side where the refractive index is higher than the median value of refractive index. Note that the reference value (nominal value) of the transparent layer thickness, 100 μm, is an example, and a value other than 100 μm may be selected as this reference value.

Assume that a transparent layer is as thin as 0.1 mm. In this case, as a method of defining a transparent layer thickness irregularity allowable range, the method of defining it with rectangular area A10 as shown in FIG. 26 can be effectively used from a practical viewpoint. In a stricter sense, however, as the refractive index is decreased while the lower limit of the allowable thickness irregularity of the transparent substrate remains unchanged (e.g., 90 μm), the wavefront aberration amount (spherical aberration) increases (see FIG. 2B) as in the case where the thickness is decreased. In consideration of suppression of the influence of an increase in aberration with this decrease in refractive index (equivalent to a decrease in the thickness of the transparent layer in terms of the amount of aberration caused), a plot obliquely ascending to the left on the low-refractive-index side is drawn. On the high-refractive-index side, the degree of influence of an increase in aberration due to an increase in refractive index (equivalent to an increase in the thickness of the transparent layer in terms of the amount of aberration caused) is smaller than that on the low-refractive-index side (in an extreme case, the influence of an increase in aberration when the thickness decreases from 100 μm by 90 μm to 10 μm, i.e., 1/10 is larger than that when the thickness increases from 100 μm by 90 μm to 190μ, i.e., 1.9 times). Considering this phenomenon in addition to a practical viewpoint, a rectangular plot will suffice on the high-refractive-index side. Area A11 in FIG. 27 is a hexagonal transparent layer thickness irregularity allowable range determined in this manner.

Figure 28:
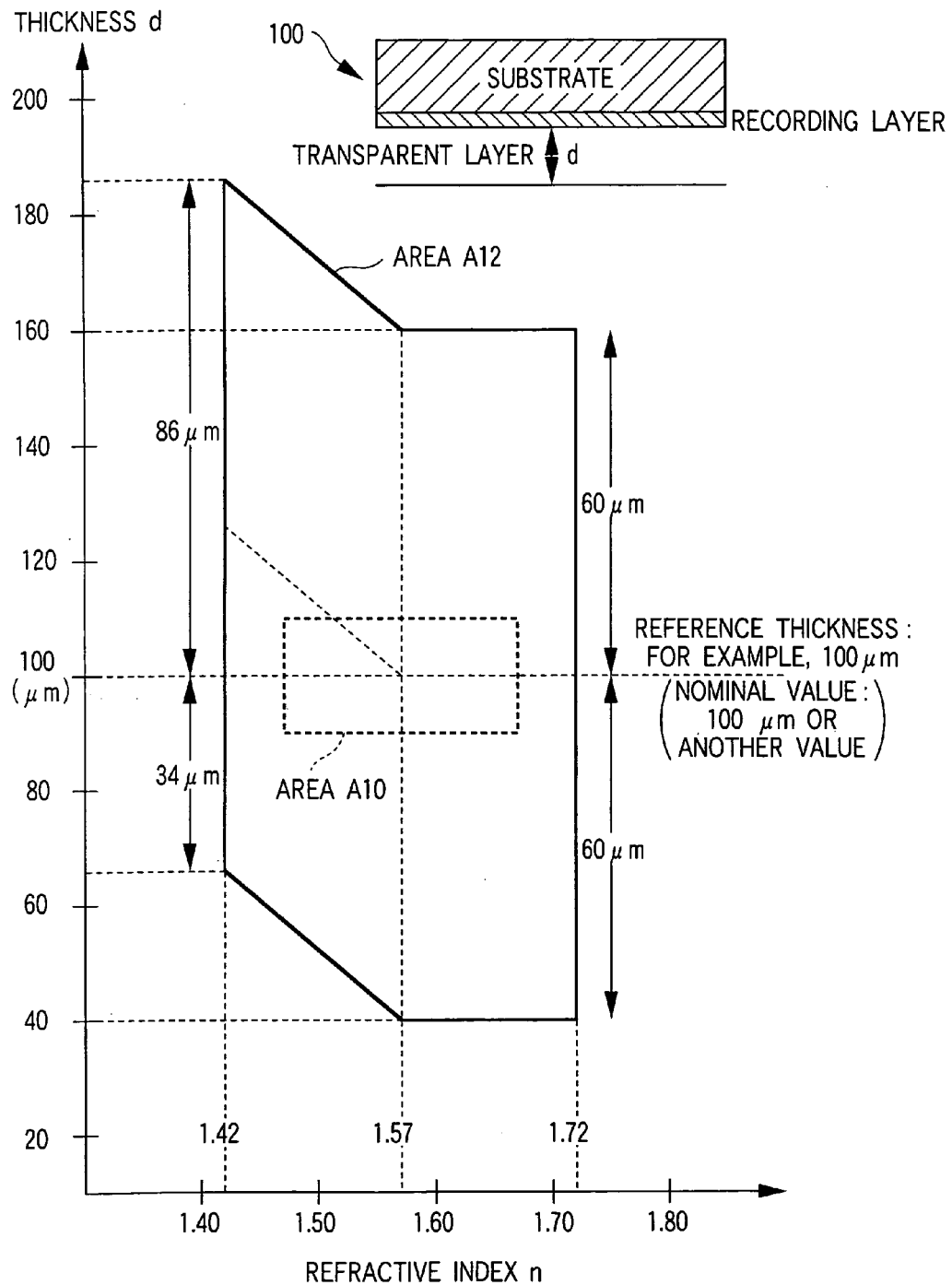
FIG. 28 is a view for explaining a transparent layer thickness irregularity allowable range (example 3) that is set when a transparent layer protecting the recording layer of a single-sided single-layer information medium is made of a material whose refractive index falls within the range of 1.42 to 1.72.

FIG. 28 is a graph for explaining a transparent layer thickness irregularity allowable range (example 3) in a case where a transparent layer protecting the recording layer of an single-sided single-layer information medium is made of a material whose refractive index falls in the range of 1.42 to 1.72.

FIG. 28 shows that in a case where the reference thickness of a medium transparent layer is a nominal value of 100 μm (0.1 mm), when refractive index n of the transparent layer falls in the range of 1.42 to 1.72, thickness irregularity (variation) δd of the transparent layer is allowed up to +86 μm/−34 μm on the side where the refractive index is lower than the median value (1.57) of refractive index, and up to ±60 μm on the side where the refractive index is higher than the median value of refractive index. Note that the reference value (nominal value) of the transparent layer thickness, 100 μm, is an example, and a value other than 100 μm may be selected as this reference value.

The reason why area A12 indicating a transparent layer thickness irregularity in FIG. 28 allowable range becomes hexagonal is the same as that in the case shown in FIG. 27. In addition, the width of thickness irregularity in the transparent layer thickness irregularity allowable range in FIG. 28 is large (+86μ to −60 μm) for the following reason. Even if large thickness irregularity occurs, the influence of this large thickness irregularity can be suppressed to a level where no practical problem arises as long as servo gain G of thickness servo system 500 shown in, for example, FIG. 6 is high.

In an apparatus (optical disk drive or recorder/player having this drive) using the information medium (single-sided single-layer recordable/playable optical disk) in FIGS. 26 to 28, when an objective lens having large numerical aperture NA (e.g., 0.85) is used, a trouble may be caused in actual recording and/or playback operation unless the thickness irregularity of the medium transparent layer is suppressed low (about 5 μm). If, however, a thickness servo mechanism with sufficient servo gain G is used for this apparatus, since the influence of thickness irregularity is reduced as servo gain G increases, normal recording and/or playback operation can be performed even if transparent layer thickness irregularity is slightly large. Therefore, the transparent layer thickness irregularity in the case shown in FIG. 26 is allowed up to 10 μm; that in the case shown in FIG. 27 is allowed up to 15μ; and that in the case shown in FIG. 28 is allowed up to about 90 μm.

Figure 29:
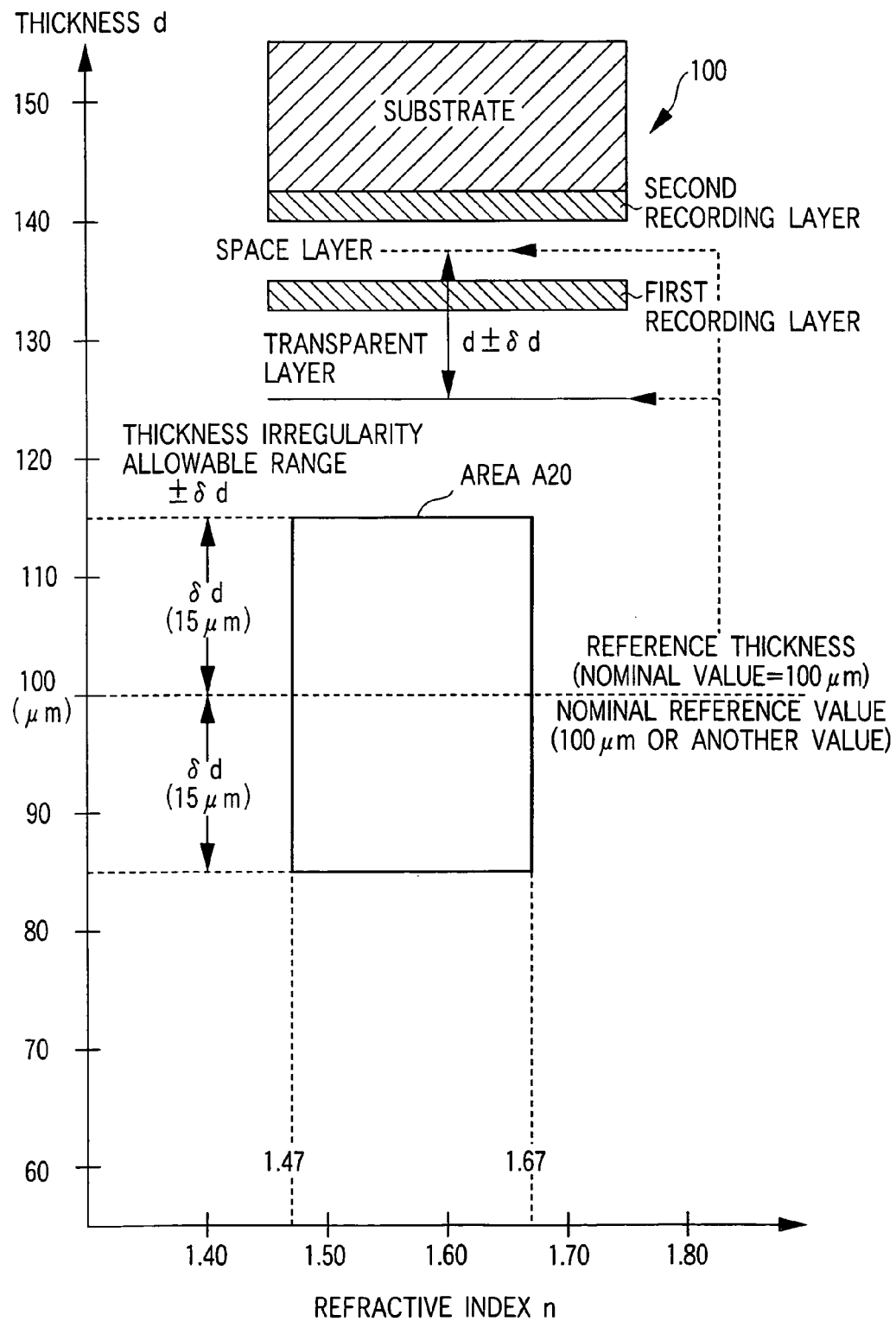
FIG. 29 is a view for explaining a transparent layer thickness irregularity allowable range (example 4) that is set when a transparent layer protecting the recording layer of a single-sided dual-layer information medium is made of a material (polycarbonate, acrylic, a carton, or the like) whose refractive index falls within the range of 1.47 to 1.67.

FIG. 29 is a graph for explaining a transparent layer thickness irregularity allowable range (example 4) in a case where a transparent layer protecting the recording layer of an single-sided dual-layer information medium is made of a material (polycarbonate, acrylic resin, carton, or the like) whose refractive index falls in the range of 1.47 to 1.67. In this single-sided dual-layer information medium, first and second recording layers are joined to each other through a transparent space layer, a transparent protective layer is formed on the surface of the first recording layer, and a substrate is formed on the lower surface side of the second recording layer. This substrate need not always be transparent. Obviously, a transparent substrate may be used, and a label or the like that shields a laser beam may be printed or formed on the surface of the substrate.

FIG. 29 shows that thickness irregularity (variation) δd of the transparent layer is allowed up to ±15 μm when refractive index n of the transparent layer falls in the range of 1.47 to 1.67 in a case where the reference thickness of a medium transparent layer is a nominal value of 100 μm (0.1 mm). It is recognized that the transparent layer thickness irregularity (±15 μm) of a single-sided dual-layer medium (FIG. 29) is larger than the transparent layer thickness irregularity (±10 μm) of a single-sided single-layer medium (FIG. 26) (by 5 μm). This is because the influence of the thickness irregularity of the space layer (±5 μm in this case), which is not present in the single-sided single-layer medium, is estimated. Note that the space layer itself is managed within, for example, about 20 μm±10 μm. Note that the reference value (nominal value) of the transparent layer thickness, 100 μm, is an example, and a value other than 100 μm may be selected as this reference value.

For example, materials corresponding to a rectangular range in FIG. 26 (area A20 where the refractive index range extends from 1.47 to 1.67, and the thickness range extends from 85 μm to 115 μm) are:

polycarbonate with refractive index n=1.62 at wavelength of 405 nm;

carton with refractive index n=1.52 at wavelength of 405 nm; and acrylic resin (or ultraviolet curing resin/UV curing resin) with refractive index n=1.56 at wavelength of 405 nm.

In a single-sided dual-layer information medium (recordable/playable optical disk), when the first recording layer as the first layer on the upper surface side and the second recording layer as the second layer on the lower surface side are non-recorded layers, reflectances R of these layers are about 4.2%. In a single-sided dual-layer medium, reflectance R of the embossed layer is also set to about 4.2%. When information is recorded on the first and second recording layers, reflectances R of these layers become, for example, about 10.8% to 11.3%. Transmittance T of the first recording layer of the single-sided dual-layer medium is set to about 60%, and it's absorbance A is set to about 30% (R+T+A=100%).

Figure 30:
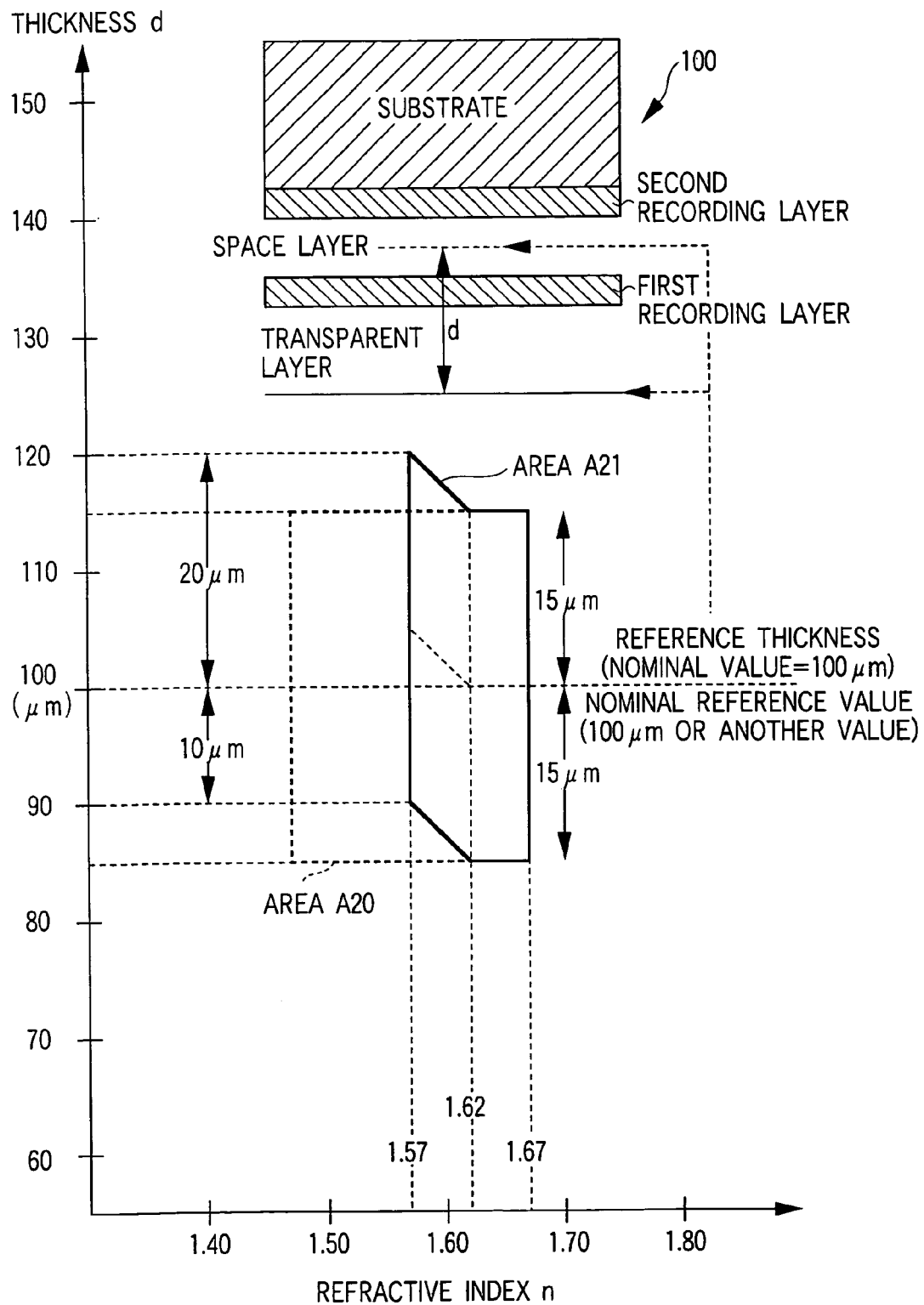
FIG. 30 is a view for explaining a transparent layer thickness irregularity allowable range (example 5) that is set when a transparent layer protecting the recording layer of a single-sided dual-layer information medium is made of a material (polycarbonate) whose refractive index falls within the range of 1.57 to 1.67.

FIG. 30 is a graph for explaining a transparent layer thickness irregularity allowable range (example 5) in a case where a transparent layer protecting the recording layer of an single-sided dual-layer information medium is made of a material (polycarbonate or the like) whose refractive index falls in the range of 1.57 to 1.67.

FIG. 30 shows that in a case where the reference thickness of a medium transparent layer is a nominal value of 100 μm (0.1 mm), when refractive index n of the transparent layer falls in the range of 1.57 to 1.67, thickness irregularity (variation) δd of the transparent layer is allowed up to +20 μm/−10 μm on the side where the refractive index is lower than the median value (1.62±0.05) of refractive index, and up to ±15 μm on the side where the refractive index is higher than the median value of refractive index. Note that the reference value (nominal value) of the transparent layer thickness, 100 μm, is an example, and a value other than 100 μm may be selected as this reference value.

The reason why the thickness irregularity range (±15 μm) of the single-sided dual-layer medium in FIG. 30 is larger than the thickness irregularity range (±10 μm) of the single-sided single-layer medium shown in FIG. 27 is that the influence (±5 μm) of the thickness irregularity of the space layer is considered for the single-sided dual-layer medium in FIG. 30. The reason why area A21 indicating the transparent layer thickness irregularity allowable range in FIG. 30 becomes hexagonal is the same as in the case shown in FIG. 27.

Figure 31:
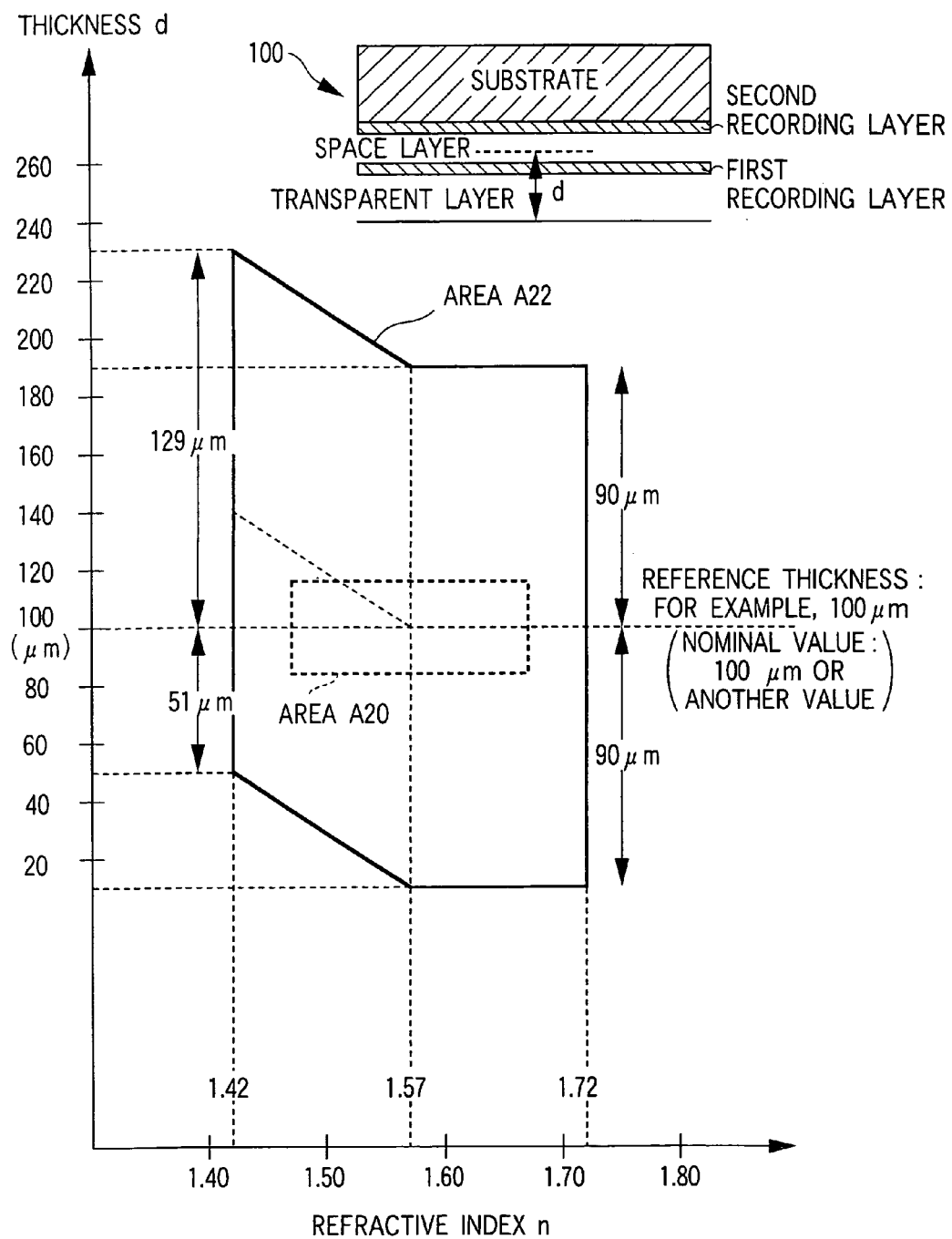
FIG. 31 is a view for explaining a transparent layer thickness irregularity allowable range (example 6) that is set when a transparent layer protecting the recording layer of a single-sided dual-layer information medium is made of a material whose refractive index falls within the range of 1.42 to 1.72.

FIG. 31 is a graph for explaining a transparent layer thickness irregularity allowable range (example 6) in a case where a transparent layer protecting the recording layer of an single-sided dual-layer information medium is made of a material whose refractive index falls in the range of 1.42 to 1.72.

FIG. 31 shows that in a case where the reference thickness of a medium transparent layer is a nominal value of 100 μm (0.1 mm), when refractive index n of the transparent layer falls in the range of 1.42 to 1.72, thickness irregularity (variation) δd of the transparent layer is allowed up to +129 μm/−51 μm on the side where the refractive index is lower than the median value (1.57) of refractive index, and up to ±90 μm on the side where the refractive index is higher than the median value of refractive index. Note that the reference value (nominal value) of the transparent layer thickness, 100 μm, is an example, and a value other than 100 μm may be selected as this reference value.

The reason why area A22 indicating a transparent layer thickness irregularity in FIG. 31 allowable range becomes hexagonal is the same as that in the case shown in FIG. 27. In addition, the width of thickness irregularity in the transparent layer thickness irregularity allowable range in FIG. 31 is large (+129μ to −90 μm) for the following reason. Even if large thickness irregularity occurs, the influence of this large thickness irregularity can be suppressed to a level where no practical problem arises as long as servo gain G of thickness servo system 500 shown in, for example, FIG. 6 is high.

In an apparatus (optical disk drive or recorder/player having this drive) using the information medium (single-sided dual-layer recordable/playable optical disk) in FIGS. 29 to 31, when an objective lens having, for example, numerical aperture NA of 0.85 is used, a trouble may be caused in actual recording and/or playback operation unless the thickness irregularity of the medium transparent layer is suppressed to about 5 μm. If, however, a thickness servo mechanism with sufficient servo gain G is used for this apparatus, since the influence of thickness irregularity is reduced as servo gain G increases, normal recording and/or playback operation can be performed even if transparent layer thickness irregularity greatly exceeds 5 μm. Therefore, the transparent layer thickness irregularity in the case shown in FIG. 29 is allowed up to 15 μm; that in the case shown in FIG. 30 is allowed up to 20μ; and that in the case shown in FIG. 31 is allowed up to about 130 μm.

Summary of Management Data for Single-Sided Single-Layer or Single-Sided Dual-Layer Disk As to the thicknesses of transparent layers, see FIGS. 26 to 31;

the thickness of the space layer of a single-sided dual-layer: 20±10 μm or less;

variations in the thickness of the space layer within one disk: ±10μ or less;

variations in the thickness of the space layer within one revolution of a disk: ±4 μm or less;

refractive index n of a substrate (polycarbonate): 1.62±0.05 or less;

the angular deviation (tilt) of reflected light: ±0.70° or less in the radial direction;

the angular deviation (tilt) of reflected light: ±0.30° or less in the circumferential direction; and the birefringence of a substrate: 10 nm at maximum.

A specific value of (±10 μm, ±4 μm) of variations in the thickness of the space layer of a single-sided dual-layer disk can be determined in accordance with the dynamic range of an aberration correction system (thickness servo system) and the influence of crosstalk between the first and second recording layers.

Others

Referring to FIGS. 26 to 31, the allowable variation range (abscissa) of refractive index n of a medium transparent layer can be finally determined on the basis of the allocation of operation margins to the overall apparatus (optical head and/or disk drive). In addition, the allowable variation range (ordinate) of the thickness of a medium transparent layer can be finally determined in consideration of the dynamic range of a spherical aberration correction system (thickness servo system) in operation, a servo response band, overall margin allocation, and the like.

Refractive index n (abscissa) and thickness irregularity δd (ordinate) in FIGS. 26 to 31 correspond to n and δd in mathematical expressions (4) to (9). Therefore, if, for example, the frame of area A10 in FIG. 26 (δd=±10 μm at n=1.47; δd=±10 μm at n=1.67) and numerical aperture NA (e.g., 0.85) of an objective lens to be used are determined, the range of rms values of wavefront aberration (ordinate Wcrms in FIG. 21) which guarantees that the thickness irregularity of a transparent layer and the range of variations in refractive index fall within area A10 in FIG. 26 is also obtained.

Assume that a transparent protective layer is formed by spin coating. In this case, as one of guidelines for the determination of a temperature, rotational speed, rotation time, the viscosity of a protective layer material, and the like in spin coating, quality control using a method of "managing the thickness of a layer between the protective layer and recording layer of a medium to a residual deviation of 0.07 λ or less after aberration control (thickness servo control)" can be used.

The present invention is not limited to each embodiment described above, and various changes and modifications of the embodiments can be made without departing from the spirit and scope of the invention.

The respective embodiments can be executed in combination with each other, if possible, as needed. Such a combination will produce its effect.

The embodiments described above include inventions in various phases, and various inventions can be obtained from proper combinations of a plurality of constituent elements disclosed in the present application. Even if, for example, one or a plurality of constituent elements are omitted from the overall constituent elements described in each embodiment, the arrangement obtained by omitting such constituent elements can still form an invention as long as at least one of the effects of the present invention can be obtained.

(A1) Since "setting of a thickness irregularity amount before thickness irregularity correction (thickness servo control)", "setting of a servo gain for thickness irregularity correction (thickness servo control)", "setting of a residual deviation amount", and the like can be systematically performed by using the aberration amount of spherical aberration component of wavefront aberration, a thickness irregularity correction servo circuit for an apparatus (an optical disk drive and a player or recorder using the drive) can be easily designed.

(A2) A residual deviation amount can be set by using the aberration amount of spherical aberration component of wavefront aberration. In an apparatus (an optical disk drive and a player or recorder using the drive), therefore, margin allocation can be systematically performed among other variation factors (variation factors in a tracking servo system, focusing servo system, tilt servo system, and the like). This greatly facilitates margin allocation design in the design of servo systems.

That is, variation factors such as an allowable defocusing amount and the allowable tilt amount of an information medium can be converted into wavefront aberration amounts (defocusing components, coma components, and the like), and hence margin allocation can be performed by allocating the respective wavefront aberration amounts.

(A3) The thickness irregularity range of a transparent layer can be defined on the basis of the characteristics of thickness irregularity correction (thickness servo control) in an apparatus (an optical disk drive and a player or recorder using the drive). When, therefore, an information medium in which the thickness irregularity of a transparent layer falls within this defined range, high reliability and stability can be ensured with respect to recording and playback characteristic.

(A4) In a conventional apparatus having no thickness irregularity correction (thickness servo control) function, the spherical aberration amount must be reduced in playback or recording operation. For this reason, the precision required for the thickness irregularity of the transparent layer of an information medium is very high (especially when NA exceeds 0.65).

It is, however, very difficult to manufacture an information medium while controlling the thickness irregularity of a transparent layer with high precision. As the precision required for thickness irregularity increases, the manufacturing yield of media decreases. As a consequence, the sales price of information media greatly rises.

In contrast to this, when an apparatus (an optical disk drive and a player or recorder using the drive) is made to have a thickness irregularity correction (thickness servo) function by the present invention, the thickness irregularity allowable amount of the transparent layer of an information medium greatly increases. As a consequence, the manufacturing yield of information media greatly increases, and hence the sales price of media can be greatly lowered.

(B1) Since the thicknesses of the transparent layers of information media can be nondestructively measured, the information media after measurement can be directly used as products. This makes it possible to increase the yield and decrease the sales price of information media.

(B2) The measurement precision for the thickness of the transparent layer of an information medium can be greatly increased.

(C1) Defining variations in the thickness of a transparent layer and variations in the refractive index of the transparent layer within predetermined ranges can optimize the design of servo systems in a playback system or recording/playback system.

(D1) Defining variations in the thickness of the transparent layer of a single-sided dual-layer disk and variations in the refractive index of the transparent layer within predetermined ranges can optimize the design of servo systems in a playback system or recording/playback system for the two recording layers below the transparent layer.

(D2) The use of thickness irregularity correction (thickness servo control) as a prerequisite will greatly reduce the thickness precision for the respective layers from the disk surface to the reflecting surface or recording surface of an information medium having a single-sided dual-layer structure. This makes it possible to greatly increase the manufacturing yield of information media and greatly lowering the price of information media.

(D3) The use of thickness irregularity correction (thickness servo control) as a prerequisite can guarantee playback or recording operation with high stability and high reliability even for an information medium having a single-sided dual-layer structure.

(E1) Thickness servo control with a servo loop independent of focusing servo control can reliably prevent a laser spot size from being increased by an aberration even if the focus is automatically adjusted to a best point by focusing servo control.

(F1) Even if a disk (information medium) suffers warping, since tilt servo control can be performed to keep the central optical axis of the objective lens vertical to the disk recording surface, an increase in laser spot size due to coma can be prevented.

(G1) Since differential push-pull (DPP) signals can be extracted from the optical system+circuit system for thickness servo control and/or tilt servo control, part of the optical system and circuit system for thickness servo control and/or tilt servo control can also be used for DPP. This makes it possible to reduce the total cost including the cost of DPP.

From another viewpoint, since an aberration detection optical system for thickness servo control and the like can be formed by using an optical system that has already been provided for another purpose (tracking servo control by the DPP method), the cost of an optical head as a product can be reduced.

In addition, the optical system for the optical head need not be further complicated for an aberration detection optical system. This contributes to a reduction in the size and weight of the optical head.

(G2) Since crosstalk cancel (CTC) signals can be extracted from the optical system+circuit system for thickness servo control and/or tilt servo control, part of the optical system and circuit system for thickness servo control and/or tilt servo control can be also be used for CTC. This makes it possible to reduce the total cost including the cost of CTC.

From another viewpoint, since an aberration detection optical system for thickness servo control and the like can be formed by using an optical system that has already been provided for another purpose (crosstalk suppression by the CTC method), the cost of an optical head as a product can be reduced.

In addition, the optical system for the optical head need not be further complicated for an aberration-detection optical system. This contributes to a reduction in the size and weight of the optical head.

(G3) Since differential push-pull (DPP) and crosstalk cancel (CTC) signals can be extracted from the optical system+circuit system for thickness servo control and/or tilt servo control, part of the optical system and circuit system for thickness servo control and/or tilt servo control can be also be used for DPP and CTC. Therefore, the apparatus arrangement including the DPP and CTC functions can be simplified. This makes it possible to attain a reduction in the size and weight of the apparatus (an optical head and disk drive or recorder/player) and a reduction in total cost.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A servo system used to play back information recorded on a recording layer or reflecting layer or to record/play back on/from a recording layer of an information medium having a disc shape and having the recording layer or reflecting layer covered with a transparent layer that can accompany thickness irregularity or refractive index irregularity, comprising:

a laser source configured to provide a laser beam of a wavelength $\lambda$;

an objective lens configured to send the laser beam from said laser source to the recording layer of said information medium and to receive a laser beam reflected from the recording layer;

a beam splitter configured to split the laser beam reflected from the recording layer via said objective lens so as to provide split laser beams;

a detector unit configured to receive the split laser beams and to generate signals corresponding to the received beams;

a tilt detection block configured to provide a tilt control signal from the signals generated by said detector unit, said tilt control signal being responsive to a component of coma of the laser beam reflected from the recording layer or said tilt control signal being responsive to an amplitude of wobbles associated with recording tracks on the recording layer of said information medium, and said tilt control signal representing at least one of radial and tangential tilts of the recording layer with respect to the objective lens;

a thickness irregularity detection block configured to provide a thickness irregularity control signal from the signals generated by said detector unit, said thickness irregularity control signal being responsive to a component of wavefront aberration of the laser beam reflected from the recording layer;

a focusing detection block configured to provide a focusing control signal from the signals generated by said detector unit;

a tracking detection block configured to provide a tracking control signal from the signals generated by said detector unit;

a tracking actuator configured to actuate said objective lens in response to the tracking control signal from said tracking detection block so as to constitute a tracking servo control for recording tracks on the recording layer of said information medium;

a focusing actuator configured to actuate said objective lens in response to the focusing control signal from said focusing detection block so as to constitute a focusing servo control for the recording layer of said information medium;

a tilt actuator provided along a laser beam path between the beam splitter and the recording layer, configured to reduce at least one of said radial and tangential tilts in response to the tilt control signal from said tilt detection block so as to constitute a tilt servo control;

a thickness irregularity correction unit, provided along said laser beam path, configured to reduce an optical aberration amount of the laser beam focused on the recording layer of said information medium in response to the thickness irregularity control signal from said thickness irregularity detection block so as to constitute a thickness servo control for the thickness irregularity or refractive index irregularity of said transparent layer; and an optical element configured to generate a +1st order light beam and a −1st order light beam from the laser beam of said laser source, wherein the +1st and −1st order light beams are beams of opposite polarities being given in advance, so that an optical aberration by which the light beam is focused to a position farther from the objective lens than the surface of the recording layer of said information medium and the optical aberration by which the light beam is focused to a position closer to the objective lens than the surface of the recording layer of said information medium are given opposite polarities, and sizes of separate light spots formed by the +1st and −1st order light beams depend on the thickness irregularity of said transparent layer.

2. The servo system of claim 1, wherein said tilt servo control is configured to use a plurality of sub-beams accompanying side lobes caused by coma.

3. The servo system of claim 1, wherein a residual deviation amount of the optical aberration is kept to not more than 0.07 $\lambda$rms×G where G is a servo gain of the thickness irregularity detection block.

4. The servo system of claim 3, wherein said tilt servo control is configured to use a plurality of sub-beams accompanying side lobes caused by coma.

5. An apparatus configured to adapt the servo system used to play back information recorded on a recording layer or reflecting layer or to record/play back on/from a recording layer of an information medium having a disc shape and having the recording layer or reflecting layer covered with a transparent layer that can accompany thickness irregularity or refractive index irregularity, the servo system comprising:

a laser source configured to provide a laser beam of a wavelength $\lambda$;

an objective lens configured to send the laser beam from said laser source to the recording layer of said information medium and to receive a laser beam reflected from the recording layer;

a beam splitter configured to split the laser beam reflected from the recording layer via said objective lens so as to provide split laser beams;

a detector unit configured to receive the split laser beams and to generate signals corresponding to the received beams;

a tilt detection block configured to provide a tilt control signal from the signals generated by said detector unit, said tilt control signal being responsive to a component of coma of the laser beam reflected from the recording layer or said tilt control signal being responsive to an amplitude of wobbles associated with recording tracks on the recording layer of said information medium, and said tilt control signal representing at least one of radial and tangential tilts of the recording layer with respect to the objective lens;

a thickness irregularity detection block configured to provide a thickness irregularity control signal from the signals generated by said detector unit, said thickness irregularity control signal being responsive to a component of wavefront aberration of the laser beam reflected from the recording layer;

a focusing detection block configured to provide a focusing control signal from the signals generated by said detector unit;

a tracking detection block configured to provide a tracking control signal from the signals generated by said detector unit;

a tracking actuator configured to actuate said objective lens in response to the tracking control signal from said tracking detection block so as to constitute a tracking servo control for recording tracks on the recording layer of said information medium;

a focusing actuator configured to actuate said objective lens in response to the focusing control signal from said focusing detection block so as to constitute a focusing servo control for the recording layer of said information medium;

a tilt actuator provided along a laser beam path between the beam splitter and the recording layer, configured to reduce at least one of said radial and tangential tilts in response to the tilt control signal from said tilt detection block so as to constitute a tilt servo control;

a thickness irregularity correction unit, provided along said laser beam path, configured to reduce an optical aberration amount of the laser beam focused on the recording layer of said information medium in response to the thickness irregularity control signal from said thickness irregularity detection block so as to constitute a thickness servo control for the thickness irregularity or refractive index irregularity of said transparent layer; and an optical element configured to generate a +1st order light beam and a −1st order light beam from the laser beam of said laser source, wherein the +1st and −1st order light beams are beams of opposite polarities being given in advance, so that an optical aberration by which the light beam is focused to a position farther from the objective lens than the surface of the recording layer of said information medium and the optical aberration by which the light beam is focused to a position closer to the objective lens than the surface of the recording layer of said information medium are given opposite polarities, and sizes of separate light spots formed by the +1st and −1st order light beams depend on the thickness irregularity of said transparent layer, wherein said tilt servo control is configured to use a plurality of sub-beams accompanying side lobes caused by coma.

6. The servo system of claim 1, wherein said tracking servo control, said focusing servo control, said tilt servo control, and said thickness servo control constitute four servo control loops being independent of one another, and a pair of said beam splitter and said detector unit is commonly used for the independent four servo control loops.

7. The servo system of claim 1, wherein the thickness servo control is configured to be performed according to a fact that a rate of change in a focused spot width of the laser beam on the recording layer reduces as the optical aberration amount of the laser beam focused on the recording layer reduces.

* * * * *

UNITED STATES PATENT AND TRADEMARK OFFICE
CERTIFICATE OF CORRECTION

PATENT NO.        : 7,224,645 B2                                              Page 1 of 1
APPLICATION NO.   : 10/847394
DATED             : May 29, 2007
INVENTOR(S)       : Hideo Ando et al.

It is certified that error appears in the above-identified patent and that said Letters Patent is hereby corrected as shown below:

On the title page, Item (30), the Foreign Application Priority Data has been omitted. Item (30) should read:

-- (30)        Foreign Application Priority Data

Nov. 24, 2000   (JP).....................................2000-358106 --

Signed and Sealed this

Fifteenth Day of April, 2008

JON W. DUDAS
*Director of the United States Patent and Trademark Office*